(12) United States Patent
Perkna et al.

(10) Patent No.: US 11,836,736 B2
(45) Date of Patent: Dec. 5, 2023

(54) APPARATUSES, COMPUTER-EXECUTED METHODS, AND COMPUTER PROGRAM PRODUCTS FOR REDUCED-RELIANCE APPLICATION ONBOARDING

(71) Applicant: Assurant, Inc., New York, NY (US)

(72) Inventors: Ronnie Blake Perkna, Smyrna, GA (US); Dan Gronsbell, Marietta, GA (US)

(73) Assignee: Assurant, Inc., New York, NY (US)

( * ) Notice: Subject to any disclaimer, the term of this patent is extended or adjusted under 35 U.S.C. 154(b) by 20 days.

(21) Appl. No.: 17/450,330

(22) Filed: Oct. 8, 2021

(65) Prior Publication Data

US 2022/0114598 A1    Apr. 14, 2022

Related U.S. Application Data

(60) Provisional application No. 63/089,387, filed on Oct. 8, 2020.

(51) Int. Cl.
*G06Q 30/01* (2023.01)

(52) U.S. Cl.
CPC .................................. *G06Q 30/01* (2013.01)

(58) Field of Classification Search
CPC .............................. G06Q 30/01; G06Q 30/00
See application file for complete search history.

(56) References Cited

U.S. PATENT DOCUMENTS

| 2011/0208629 | A1* | 8/2011 | Benefield | ............... | G06Q 40/00 |
| | | | | | 705/35 |
| 2016/0343072 | A1* | 11/2016 | Mohnot | ......... | G06Q 10/063112 |
| 2017/0026321 | A1* | 1/2017 | Ciavatta | .................. | H04L 51/04 |
| 2019/0342284 | A1 | 11/2019 | Vohra et al. | | |
| 2020/0234515 | A1 | 7/2020 | Gronsbell et al. | | |

OTHER PUBLICATIONS

Mahfoud et al., "Next Generation Vehicle Network: Web Enabled" (published in 2008 3rd International Conference on Information and Communication Technologies: From Theory to Applications, 2008, pp. 1-7) (Year: 2008).*
International Search Report and Written Opinion for PCT/US2021/054176 dated Jan. 27, 2022.
New Enabling Technologies in Digital Commerce Oct. 2014.

* cited by examiner

*Primary Examiner* — James M Detweiler
*Assistant Examiner* — Patrick Kim
(74) *Attorney, Agent, or Firm* — Alston & Bird LLP

(57) ABSTRACT

Embodiments of the present disclosure provide for reduced-reliance onboarding with respect to a service provider application, including but not limited to vehicle service provider applications. Embodiments provide a custom onboarding message that enables onboarding of at least one data object via access, by a user device, of the custom onboarding message with reduced-reliance. Example embodiments receive, from a provider system, acquisition data including at least user communication channel data usable for transmitting information to a user device associated with the customer, generating a subject data object comprising at least a portion of the subject information, attempting initiation of an custom onboarding message to be accessed by the user device associated with the customer, receiving an indication that the customer accessed the custom onboarding message via the user device, and updating data associated with the subject data object to indicate completion of onboarding.

27 Claims, 25 Drawing Sheets

WINDSHIELD

SUMMARY   FAQs   CLAIMS

25 MO
0   TIME   60 MO
REMAINING 81,000 ✎
ESTIMATED MILEAGE

| SUMMARY | SHARE |
|---|---|
| AGREEMENT NUMBER SQ152F22 | AGREEMENT HOLDER NAME |
| COVERAGE | ACTIVE |
| COVERAGE PLAN | WINDSHIELD |
| START DATE | OCTOBER 22, 2019 |
| END DATE | JANUARY 01, 2023 |
| TERM MONTHS | 60 |
| DEDUCTIBLE AT SELLING DEALER PER VISIT | 0.0 |
| VIN | VIN #### |
| CLAIMS SUPPORT | |
| ADMINISTRATOR PROVIDER NAME | ☏ |

VIEW FULL POLICY

FORD RAPTOR

REPORT A NEW CLAIM

TO START A CLAIM, PLEASE ANSWER A FEW QUESTIONS SO YOU CAN RECEIVE THE HELP YOU NEED. AFTER YOUR CLAIM IS REPORTED, HAVE YOUR REPAIRER CONTACT US TO COMPLETE YOUR CLAIM SUBMISSION.

IF YOU NEED TO STOP BEFORE YOU'VE COMPLETED THE PROCESS, WE WILL SAVE YOUR PROGRESS UNDER 'CLAIMS HISTORY'.

GET STARTED

FIG. 24

MILEAGE

PLEASE PROVIDE THE EXACT MILEAGE SHOWING ON YOUR VEHICLE'S DASHBOARD.

ENTER MILEAGE

NEXT

FIG. 25

DAMAGE TYPE

WHICH ONE OF THESE BEST DESCRIBES YOUR DAMAGE?

CRACK

CHIP

NEXT

NEED HELP?

DAMAGE

YOUR PLAN INCLUDES THE REPAIR OF A CRACK OR CHIP. IN SOME CASES, THE WINDSHIELD CANNOT BE REPAIRED AND MUST BE REPLACED. THIS CAN OCCUR IF A CRACK IS LONGER THAN A DOLLAR BILL, OR IF A CHIP IS MATERIAL AND HAS CAUSED STRUCTURAL DAMAGE. IN THIS CASE, IS MUST BE REPLACED.

CERTAIN PLANS INCLUDE WINDSHIELD REPLACEMENT, AS WELL. THE REPAIR PROVIDED CAN INSPECT THE DAMAGE AND DETERMINE THE BEST WAY TO REMEDY THE ISSUE.

NEXT

NEED HELP?

FIG. 26

GETTING THE VEHICLE REPAIRED

YOUR VEHICLE SHOULD BE TAKEN TO THE SELLING DEALER:

DEALER NAME

WHAT IF I'M TRAVELING OR MOVED?

NEXT

NEED HELP?

FIG. 27

CONTACT DETAILS

THE SERVICE PROVIDER COMES TO YOU TO COMPLETE REPAIRS.

BEST CONTACT NUMBER?
123-456-7890

WHERE DO YOU WANT THE VEHICLE REPAIRED?
ENTER ADDRESS

NEXT

NEED HELP?

YOU'RE ALL SET!

THIS INFORMATION AND STATUS UPDATES WILL BE POSTED TO YOUR 'CLAIMS HISTORY'.

IMPORTANT: A REPRESENTATIVE WILL CALL YOU TO SCHEDULE AN APPOINTMENT. THIS CAN TAKE UP TO 48 HOURS. TO VOID CONFUSION THAT COULD DELAY SERVICE, PLEASE DO NOT CALL UNTIL THIS TIME HAD PASSED.

SATELLITE AUTOGLASS

POLICY DETAILS

VIN        VIN ###
ID         ID ####
PROVIDER   PROVIDER NAME

HAVE ANY QUESTIONS? LEARN MORE

DONE

FIG. 30

DAMAGE LOCATION

WHAT PANEL(S) HAS DAMAGE?

○ HOOD
○ ROOF
○ TRUNK OR TAILGATE

DRIVER SIDE
○ FRONT FENDER
○ FRONT DOOR
○ BACK DOOR
○ REAR QUARTER PANEL

FIG. 31

TAKE A PICTURE OF YOUR MILEAGE

SINCE THE MILEAGE WITHIN 100 MILES OF EXPIRATION, PLEASE TAKE A PHOTO OF YOUR DASHBOARD VERIFYING THE MILEAGE.

TAKE A PICTURE

SAVE THIS IMAGE AND BE READY TO PROVIDE IT LATER UPON REQUEST.

○ I UNDERSTAND THAT IF I CANNOT PROVIDE THE IMAGE, THE CLAIM MAY NOT BE APPROVED.

NEXT

NEED HELP?

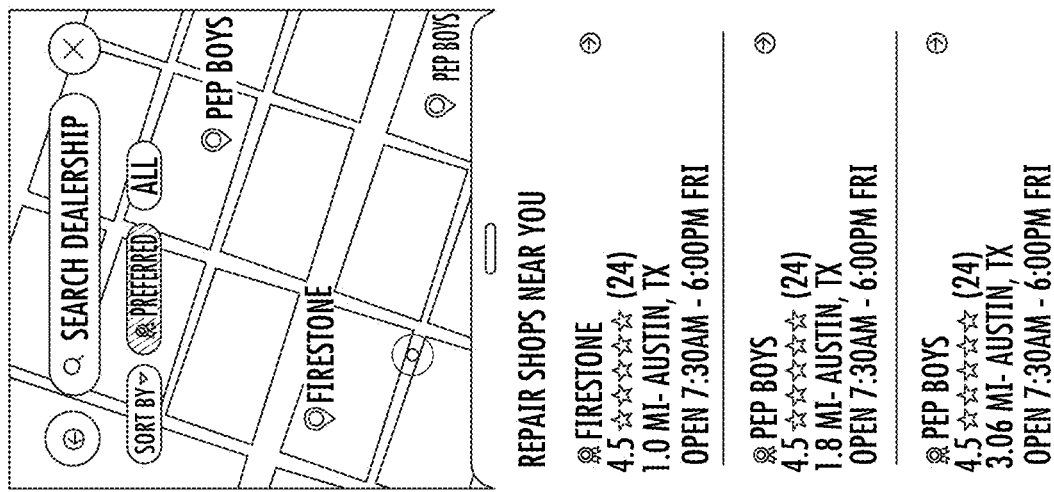
FIG. 34
FIG. 33
FIG. 32

US 11,836,736 B2

APPARATUSES, COMPUTER-EXECUTED METHODS, AND COMPUTER PROGRAM PRODUCTS FOR REDUCED-RELIANCE APPLICATION ONBOARDING

CROSS-REFERENCE TO RELATED APPLICATIONS

This application claims priority to U.S. Provisional Application No. 63/089,387, filed Oct. 8, 2020, the contents of which are incorporated by reference herein in their entirety.

TECHNOLOGICAL FIELD

Embodiments of the present disclosure generally relate to provisioning data to enable operation of a service application, and specifically to onboarding data to enable operation a service application utilizing reduced user interaction.

BACKGROUND

Systems maintained associated with the provision and/or distribution of goods or services, including the engagement of customers with providers of such goods and services, may be unreliable, inefficient, and ineffective in many ways. Attempting to onboard a customer to a service application system may encounter a number of difficulties in obtaining accurate, timely information, and seamlessly facilitating use of the service application for the customer and could instead result in a failure to onboard or retain the customer.

In some instances, computing systems associated with third parties that would ordinarily be required for onboarding a new customer to a service application, may be inadequate to provide rapid onboarding services, and data acquisition may otherwise be difficult or impractical when interoperation and communication between multiple, disparate computing systems is required.

Applicant has discovered problems with current implementations of service applications and service application onboarding. Through applied effort, ingenuity, and innovation, Applicant has solved many of these identified problems by developing embodied in the present disclosure, which are described in detail below.

BRIEF SUMMARY

In general, embodiments of the present disclosure provided herein for reduced-reliance service application onboarding and provision of service applications. Other implementations for reduced-reliance service application onboarding will be, or will become, apparent to one with skill in the art upon examination of the following figures and detailed description. It is intended that all such additional implementations be included within this description be within the scope of the disclosure, and be protected by the following claims.

In accordance with one example aspect of the present disclosure, a computer-implemented method is provided. The computer-implemented method may be implemented and/or otherwise executed via any of a myriad of computing devices, including device(s), apparatus(es), and/or system(s), described herein embodied in software, hardware, firmware, and/or a combination thereof. In one example computer-implemented method, the example computer-implemented method includes receiving, at a service onboarding system from a provider system, acquisition data comprising subject information and customer information associated with a customer, the customer information comprising at least user communication channel data usable for transmitting information to a user device associated with the customer. The example computer-implemented method further includes generating, at the service onboarding system, a subject data object comprising at least a portion of the subject information, wherein the subject data object associated with an indication of pending onboarding. The example computer-implemented method further includes attempting initiation of a custom onboarding message to be accessed by the user device associated with the customer. The example computer-implemented method further includes receiving, at the service onboarding system, an indication that the customer accessed the custom onboarding message via the user device, the indication associated with a user data object for the customer. The example computer-implemented method further includes updating, at the service onboarding system, data associated with the subject data object to indicate completion of onboarding.

Additionally or alternatively, in some embodiments of the example computer-implemented method, the example computer-implemented method further includes in response to determining a first communication channel associated with the user communication channel data is currently inaccessible: generating a machine-readable symbology associated with the subject data object; and transmitting, from the service onboarding system to the provider system via a second communication channel, the custom onboarding message comprising the machine-readable symbology to be presented via the provider system, where the indication that the customer accessed the custom onboarding message is received in response to the user device scanning the machine-readable symbology. Additionally or alternatively, in some such embodiments of the example computer-implemented method, the machine-readable symbology is presented via the provider system by causing the provider system to render a user interface comprising the machine-readable symbology. Additionally or alternatively, in some such embodiments of the example computer-implemented method, the machine-readable symbology is presented via the provider system by causing the provider system to print a physical medium comprising the machine-readable symbology.

Additionally or alternatively, in some embodiments of the example computer-implemented method, the example computer-implemented method further includes generating a customized onboarding link associated with the subject data object; and in response to determining a communication channel associated with the user communication channel data is currently accessible, transmitting, from the service onboarding system to the user device via the communication channel, the custom onboarding message comprising customized onboarding link associated with the subject data object, where the indication that the customer accessed the custom onboarding message is received in response to customer interaction with the customized onboarding link via the user device. Additionally or alternatively, in some such embodiments of the example computer-implemented method, the user communication channel data comprises a mobile phone number and the communication channel comprises a cellular communication channel associated with the mobile phone number, and wherein the custom onboarding message comprises a cellular communication message comprising the customized onboarding link.

Additionally or alternatively, in some embodiments of the example computer-implemented method, the example computer-implemented method further includes causing rendering, via the user device in response to receiving the indication that the customer accessed the custom onboarding message via the user device, of a user onboarding interface comprising a set of customer information input fields. Additionally or alternatively, in some embodiments of the example computer-implemented method, at least one of the set of customer information input fields automatically filled based on the customer information received from the service onboarding system.

Additionally or alternatively, in some embodiments of the example computer-implemented method, the example computer-implemented method further include associating the subject data object with a provider based on the acquisition data received from the provider system.

Additionally or alternatively, in some embodiments of the example computer-implemented method, accessing the custom onboarding message causes the user device to: determine whether a service application associated with the service onboarding system is installed to the user device; in a circumstance where the service application is determined not to be installed to the user device, access at least one application distribution platform to install the service application to the user device; and in a circumstance where the service application is determined to be installed to the user device, initiating the service application based on the subject data object.

Additionally or alternatively, in some embodiments of the example computer-implemented method, accessing the custom onboarding message causes the user device to: initiate a web-based service application associated with the service onboarding system, wherein the web-based service application is initiated based on the subject data object.

Additionally or alternatively, in some embodiments of the example computer-implemented method, the subject data object is associated with a data slug indicating the user data object associated with the subject data object is pending onboarding, and updating the data associated with the user data object to indicate has been fully onboarded includes disassociating the subject data object and the data slug.

Additionally or alternatively, in some embodiments of the example computer-implemented method, the service onboarding system and the provider system communicate via a first set of application programming interfaces, and the service onboarding system and the user device communicate via a second set of application programming interfaces.

In accordance with yet another aspect of the present disclosure, a second example computer-implemented method is provided. The second example computer-implemented method may be implemented and/or otherwise executed via any of a myriad of computing devices, including device(s), apparatus(es), and/or system(s), described herein embodied in software, hardware, firmware, and/or a combination thereof. In one example of the second example computer-implemented method, the second example computer-implemented method includes receiving, at a service onboarding system from a provider system, acquisition data comprising subject information and customer information associated with a customer. The second example computer-implemented method further includes generating, at the service onboarding system, a subject data object comprising at least a portion of the subject information. The example second computer-implemented method further includes associating the subject data object with a user data object generated comprising at least a portion of the customer information associated with the customer, wherein the subject data object is associated with an indication of pending onboarding. The second example computer-implemented method further includes generating a machine-readable symbology associated with the subject data object. The second example computer-implemented method further includes transmitting, from the service onboarding system to the provider system, a request to present a custom onboarding message comprising the machine-readable symbology. The second example computer-implemented method further includes receiving, at the service onboarding system, an indication that the customer accessed the custom onboarding message via a user device. The second example computer-implemented method further includes updating, at the service onboarding system, data associated with the user data object to indicate has been fully onboarded.

In accordance with yet another aspect of the present disclosure, a third example computer-implemented method is provided. The third example computer-implemented method may be implemented and/or otherwise executed via any of a myriad of computing devices, including device(s), apparatus(es), and/or system(s), described herein embodied in software, hardware, firmware, and/or a combination thereof. In one example of the third example computer-implemented method, the third example computer-implemented method includes receiving, at a user device, a custom onboarding message via the user device, the custom onboarding message associated with a subject data object maintained by a service onboarding system. The third example computer-implemented method further includes accessing the custom onboarding message via the user device. The third example computer-implemented method further includes in response to accessing the custom onboarding message, rendering, via the user device, a user onboarding interface comprising a set of customer information input fields. The third example computer-implemented method further includes in response to user input via the user onboarding interface, submitting user-inputted onboarding information to the service onboarding system to cause the service onboarding system to configure a user data object associated with the subject data object based on the user-inputted onboarding information.

In accordance with yet another aspect of the present disclosure, a fourth example computer-implemented method is provided. The fourth example computer-implemented method may be implemented and/or otherwise executed via any of a myriad of computing devices, including device(s), apparatus(es), and/or system(s), described herein embodied in software, hardware, firmware, and/or a combination thereof. In one example of the fourth example computer-implemented method, the fourth example computer-implemented method includes receiving, at a service onboarding system from a provider system, acquisition data comprising subject information. The fourth example computer-implemented method further includes generating, at the service onboarding system, a subject data object comprising at least a portion of the subject information, wherein the subject data object associated with an indication of pending onboarding. The fourth example computer-implemented method further includes generating a machine-readable symbology associated with the subject data object. The fourth example computer-implemented method further includes transmitting, from the service onboarding system to the provider system, the custom onboarding message comprising the machine-readable symbology to be presented via the provider system. The fourth example computer-implemented method further includes receiving, at the service onboarding system, an indication that the customer accessed the custom onboarding message via the user device, the indication associated with a user data object for the customer. The fourth example computer-implemented method further includes updating, at the service onboarding system, data associated with the subject data object to indicate completion of onboarding.

In accordance with yet another aspect of the present disclosure, an apparatus is provided. In one example of the apparatus, the example apparatus includes at least one processor and at least one non-transitory memory storing computer-coded instructions thereon. The memory, via the computer-coded instructions in execution with the at least one processor, configures the example apparatus to perform any one of the example computer-implemented methods described herein.

In accordance with yet another aspect of the present disclosure, a computer program product is provided. In one example of the example computer program product, the example computer program product includes at least one non-transitory computer-readable storage medium having computer program code thereon. The computer-readable storage medium in execution with the at least one processor is configured for performing any one of the example computer-implemented methods described herein.

BRIEF DESCRIPTION OF THE DRAWINGS

Figure 1:
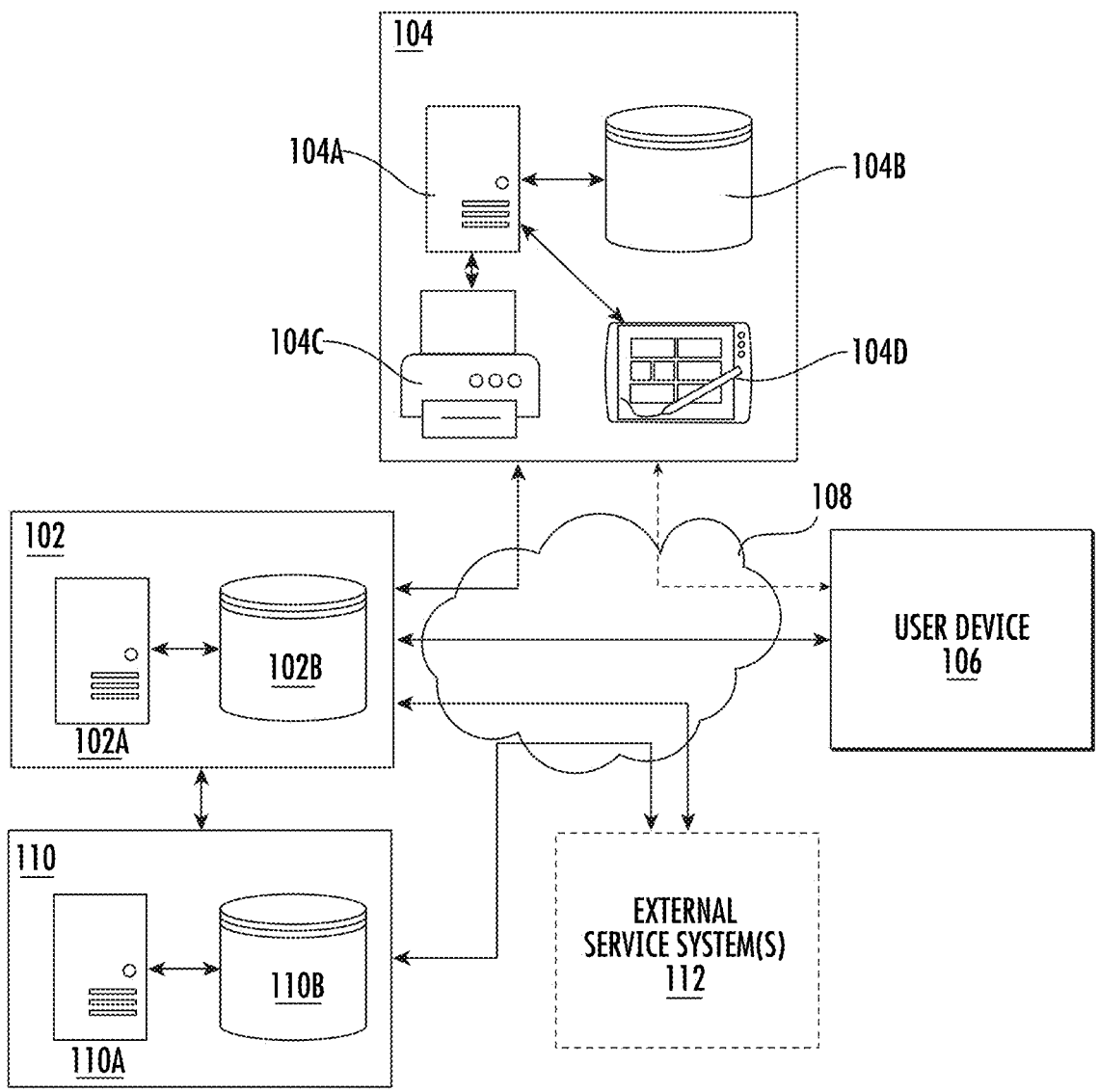
Figure 2:
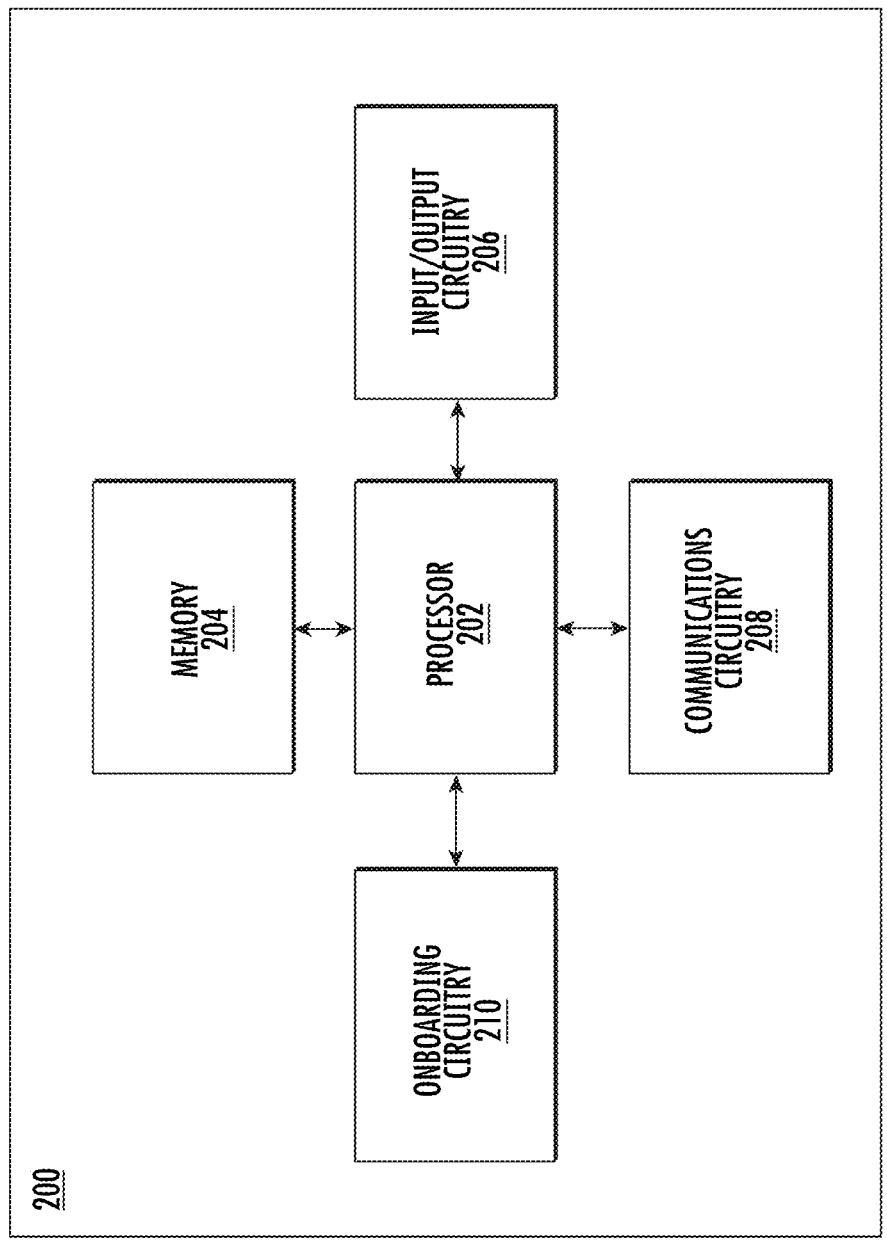
Figure 3:
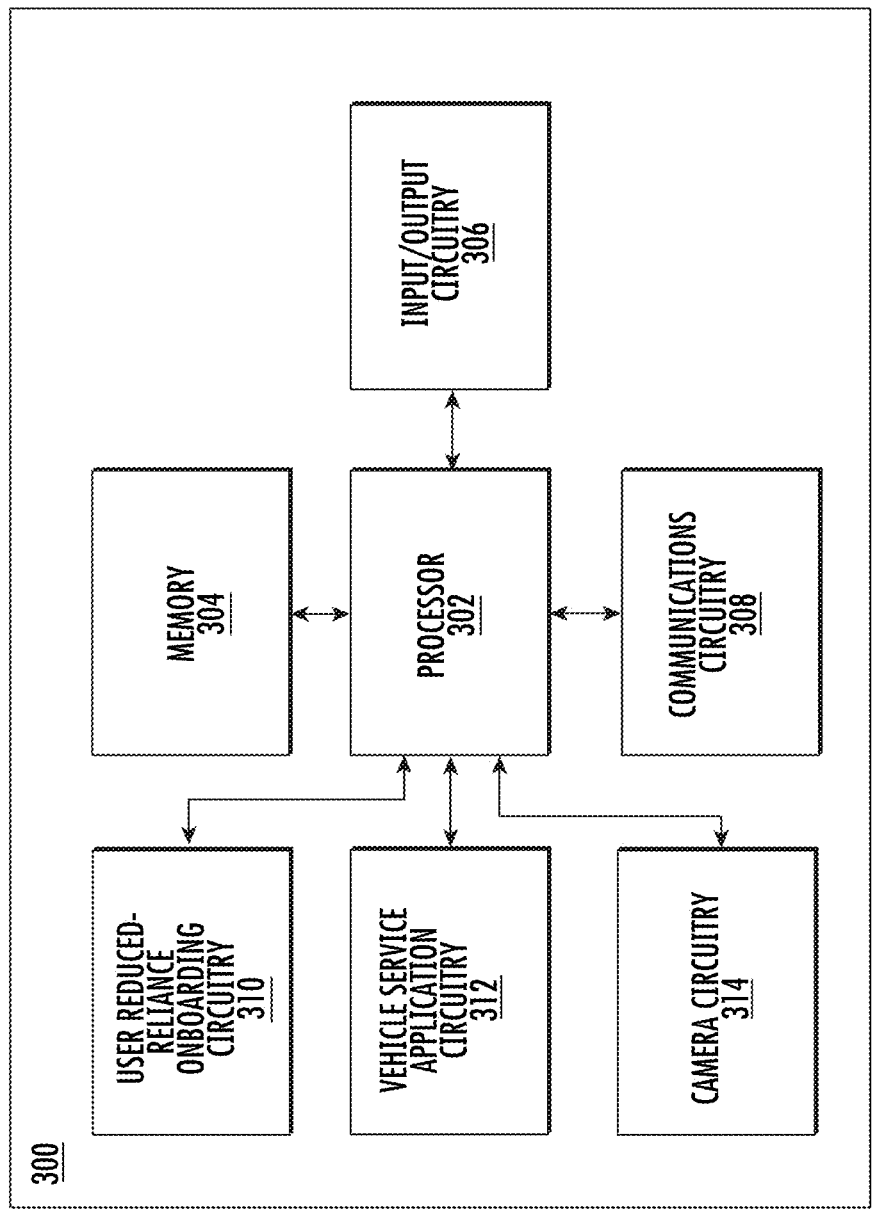
Figure 4:
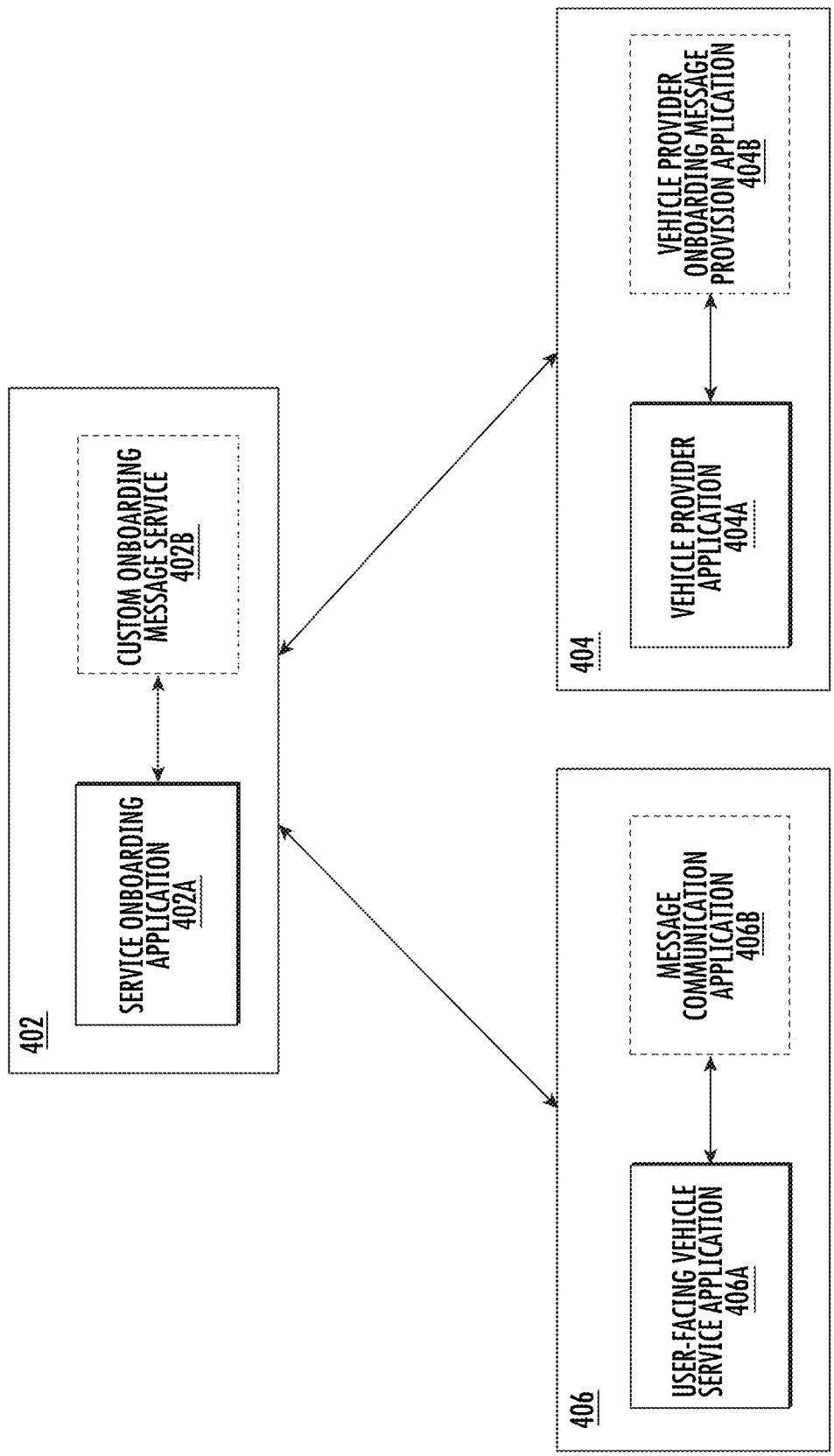
Figure 5A:
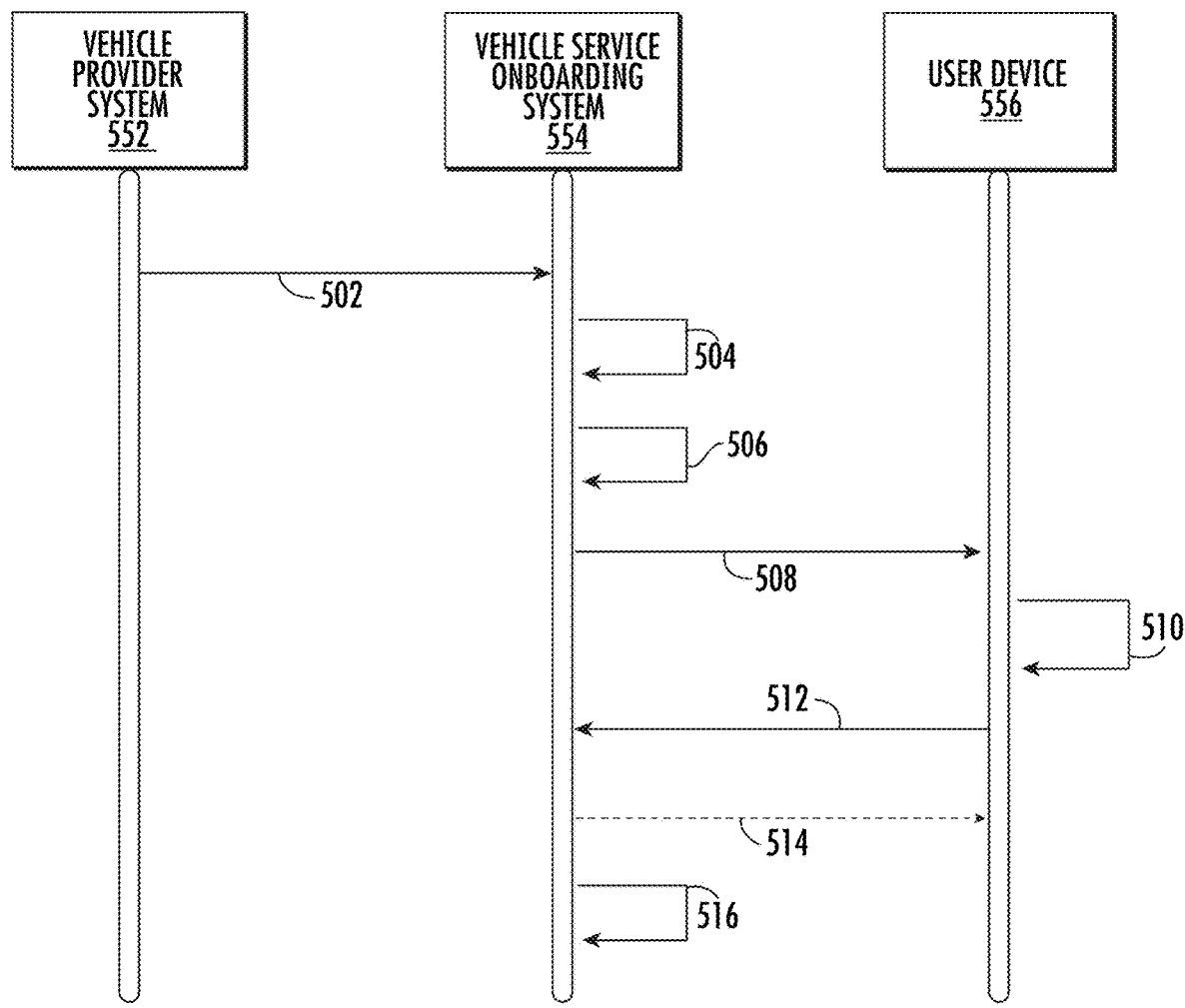
Figure 5B:
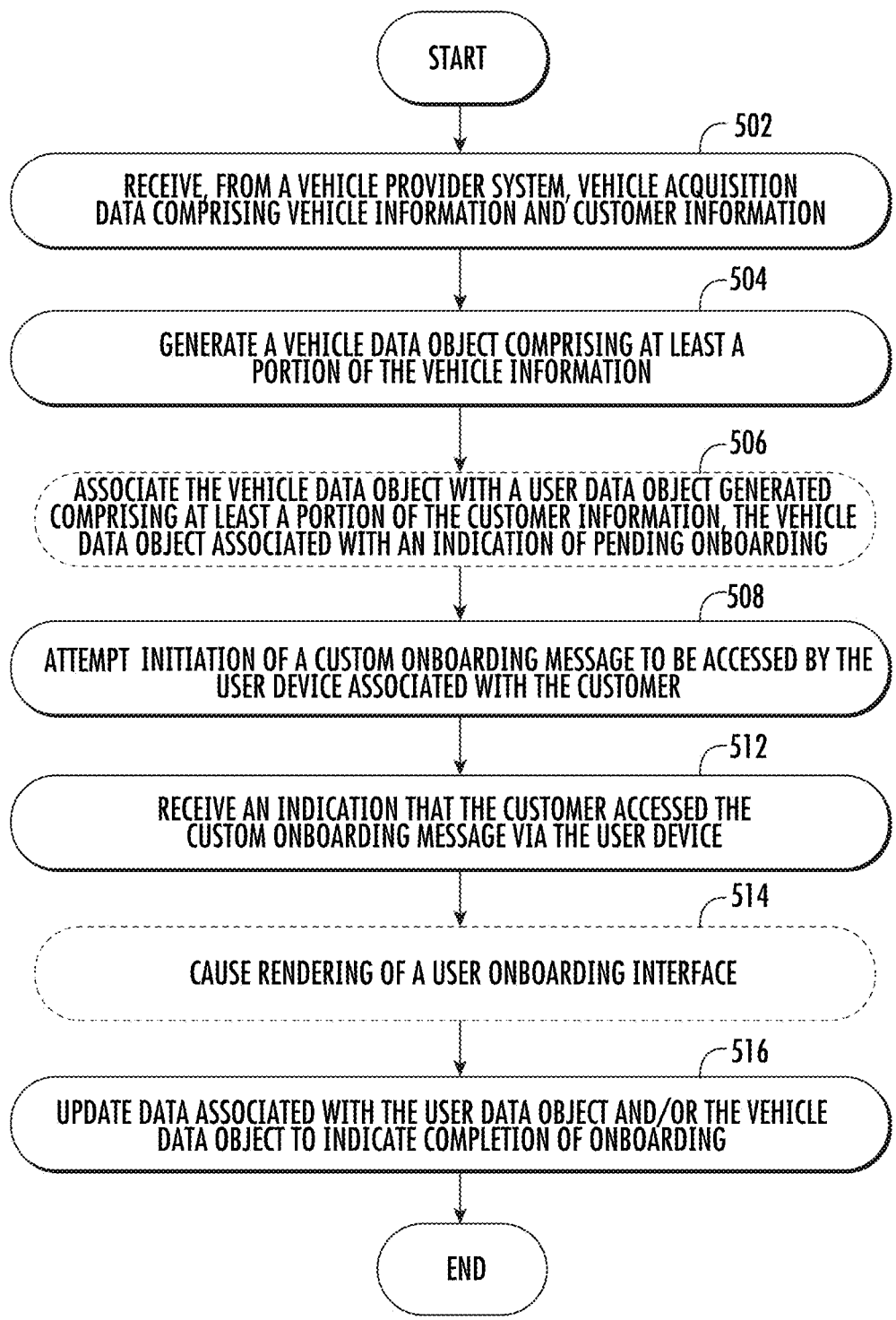
Figure 6:
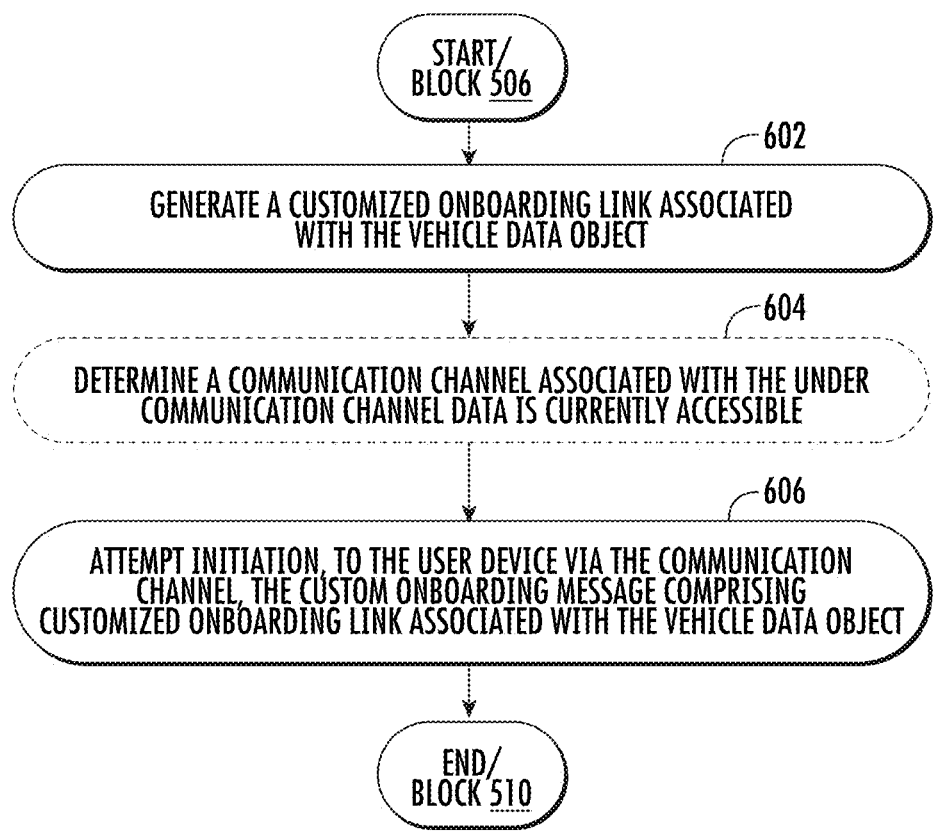
Figure 7A:
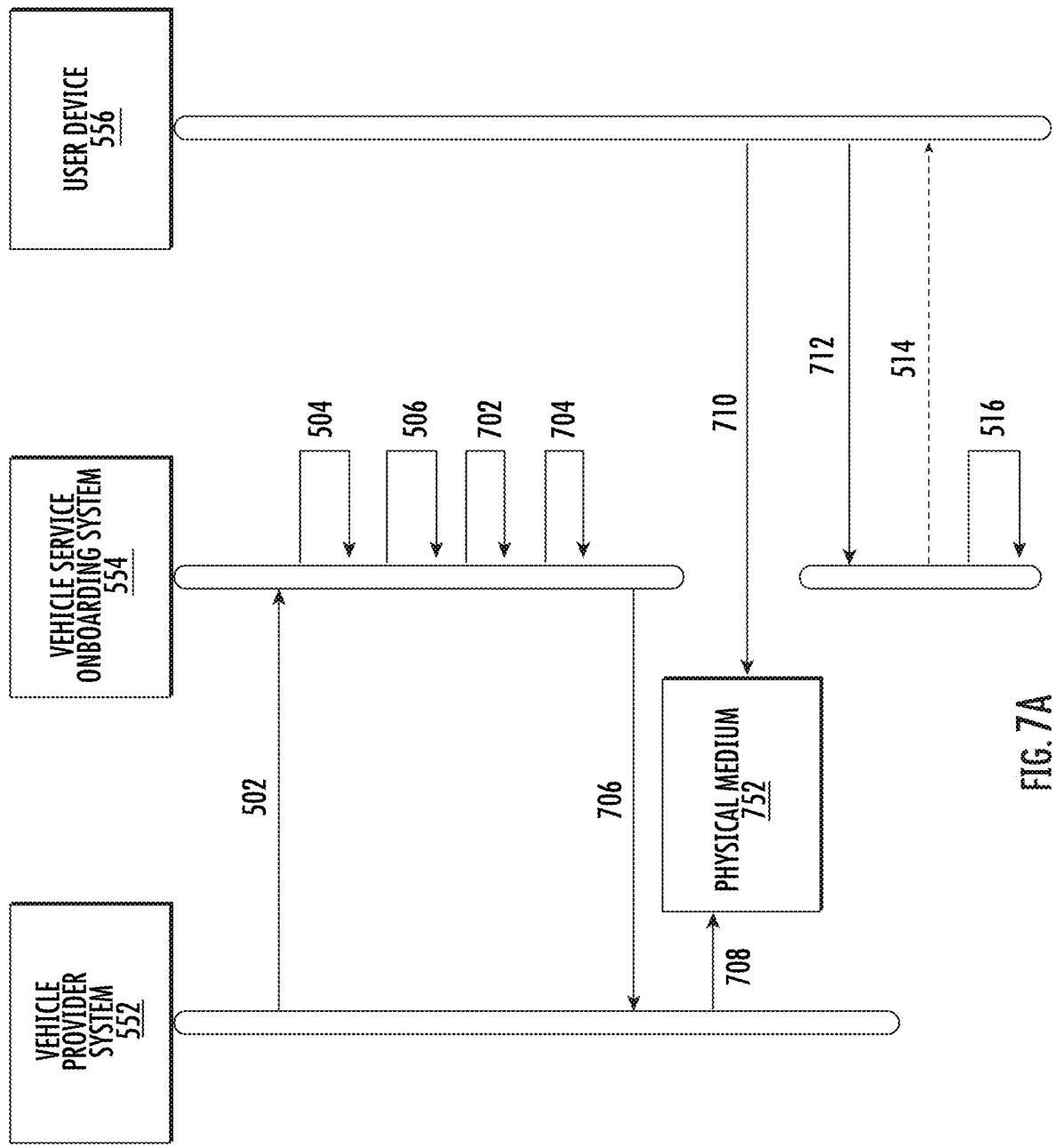
Figure 7B:
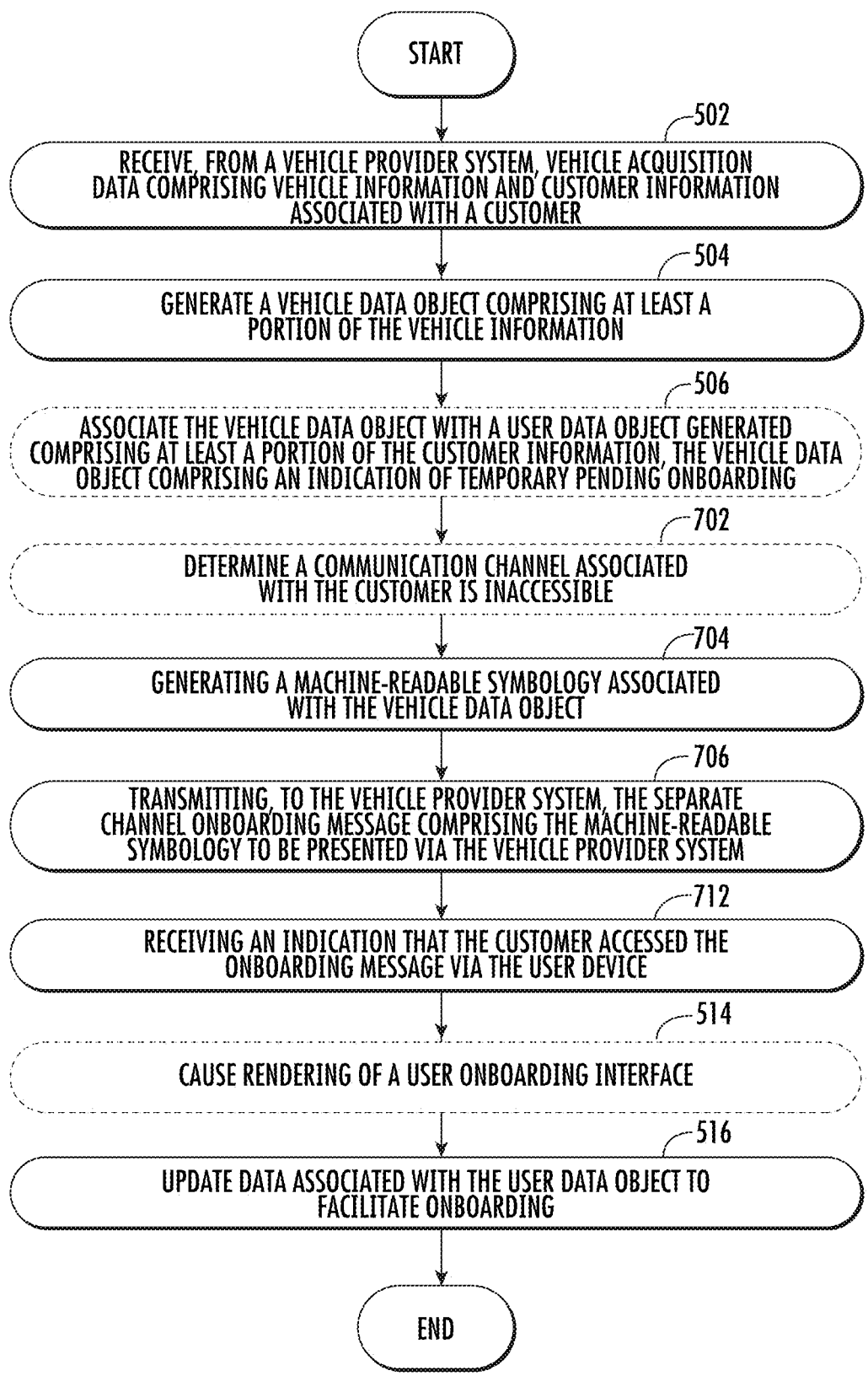
Figure 8:
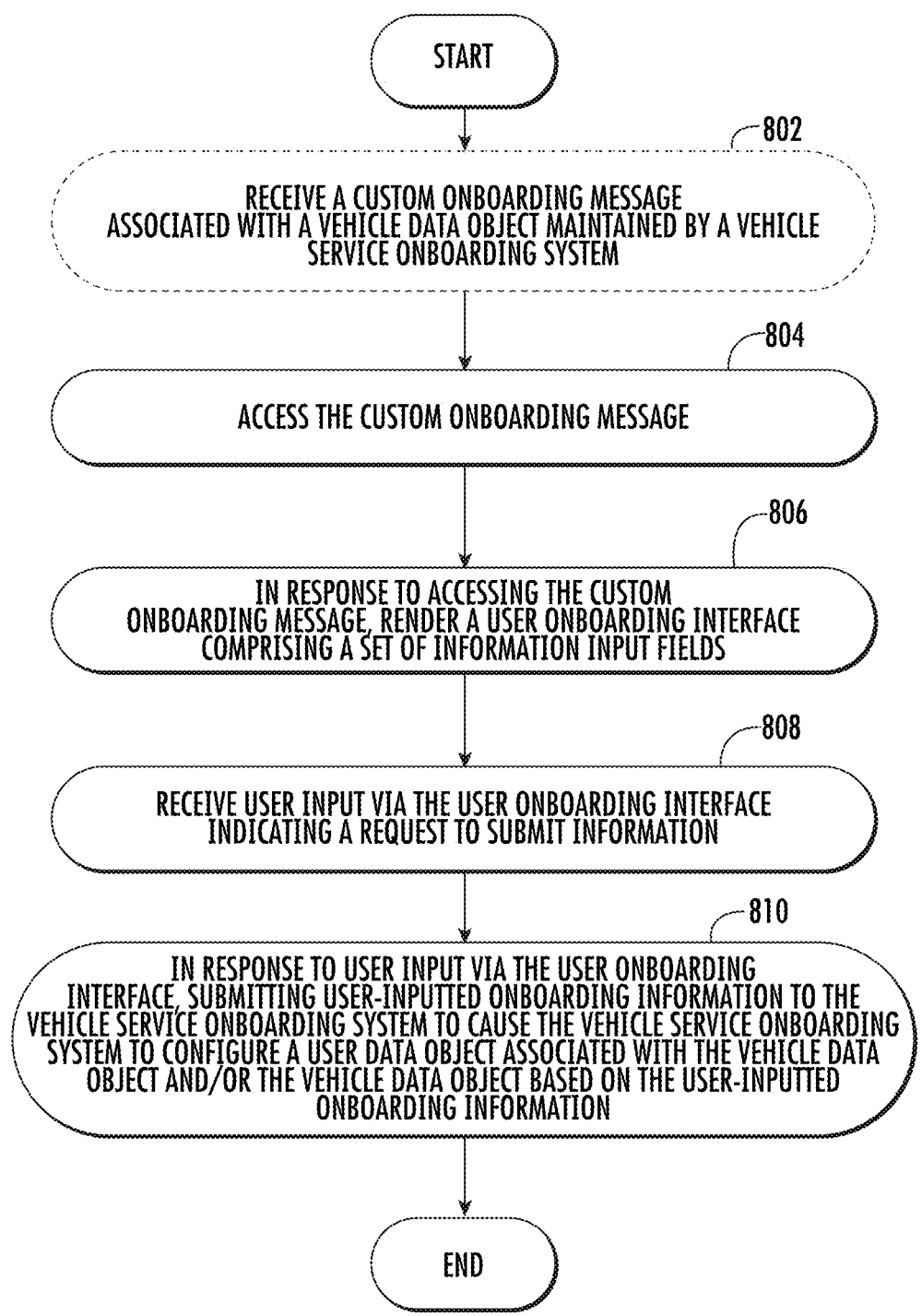
Figure 9A:
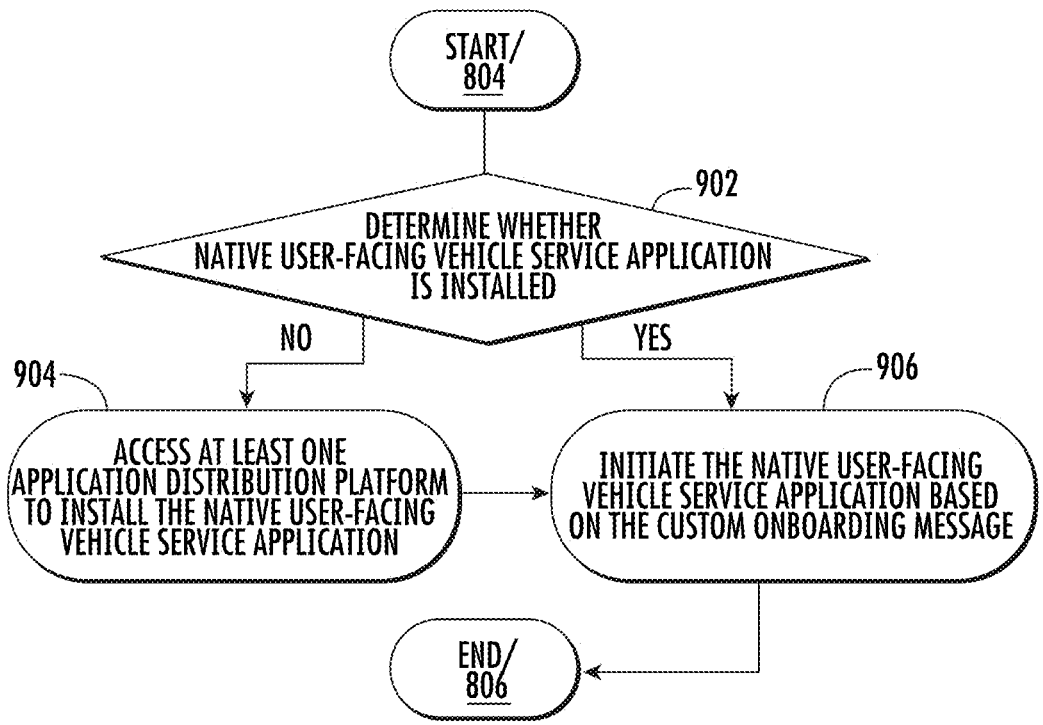
Figure 9B:
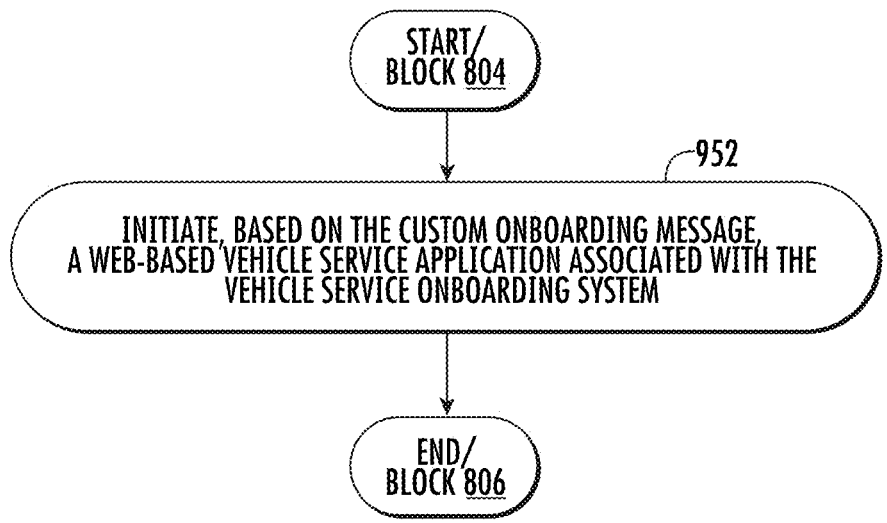
Figure 10:
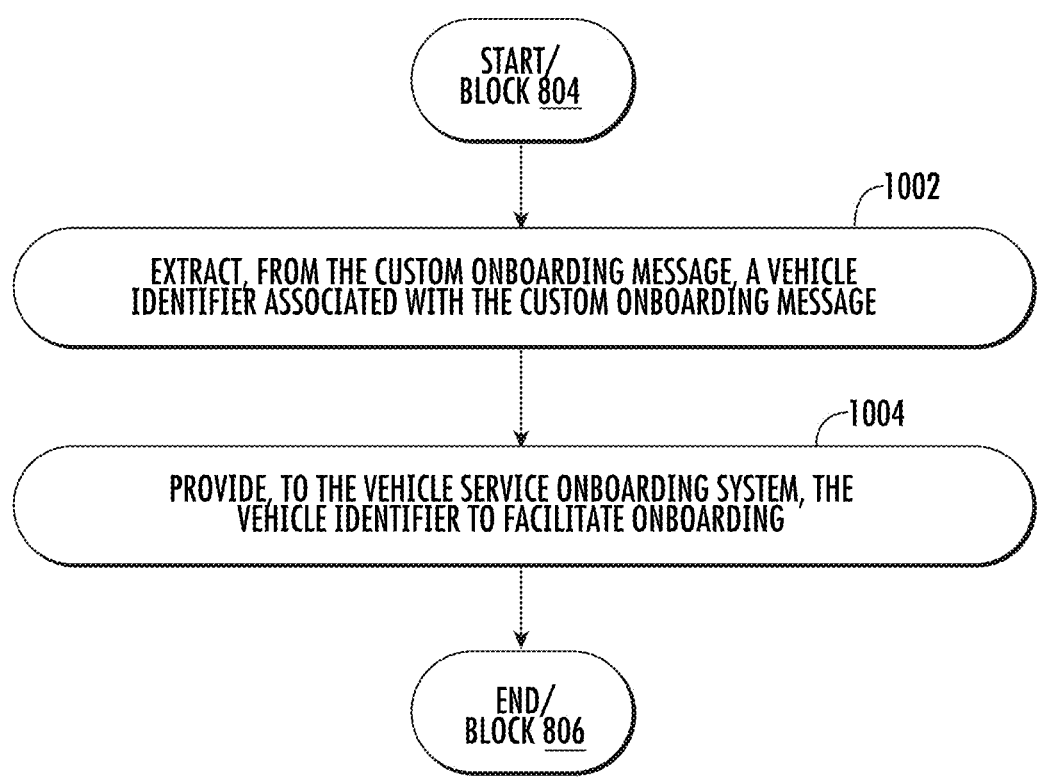
Figure 11:
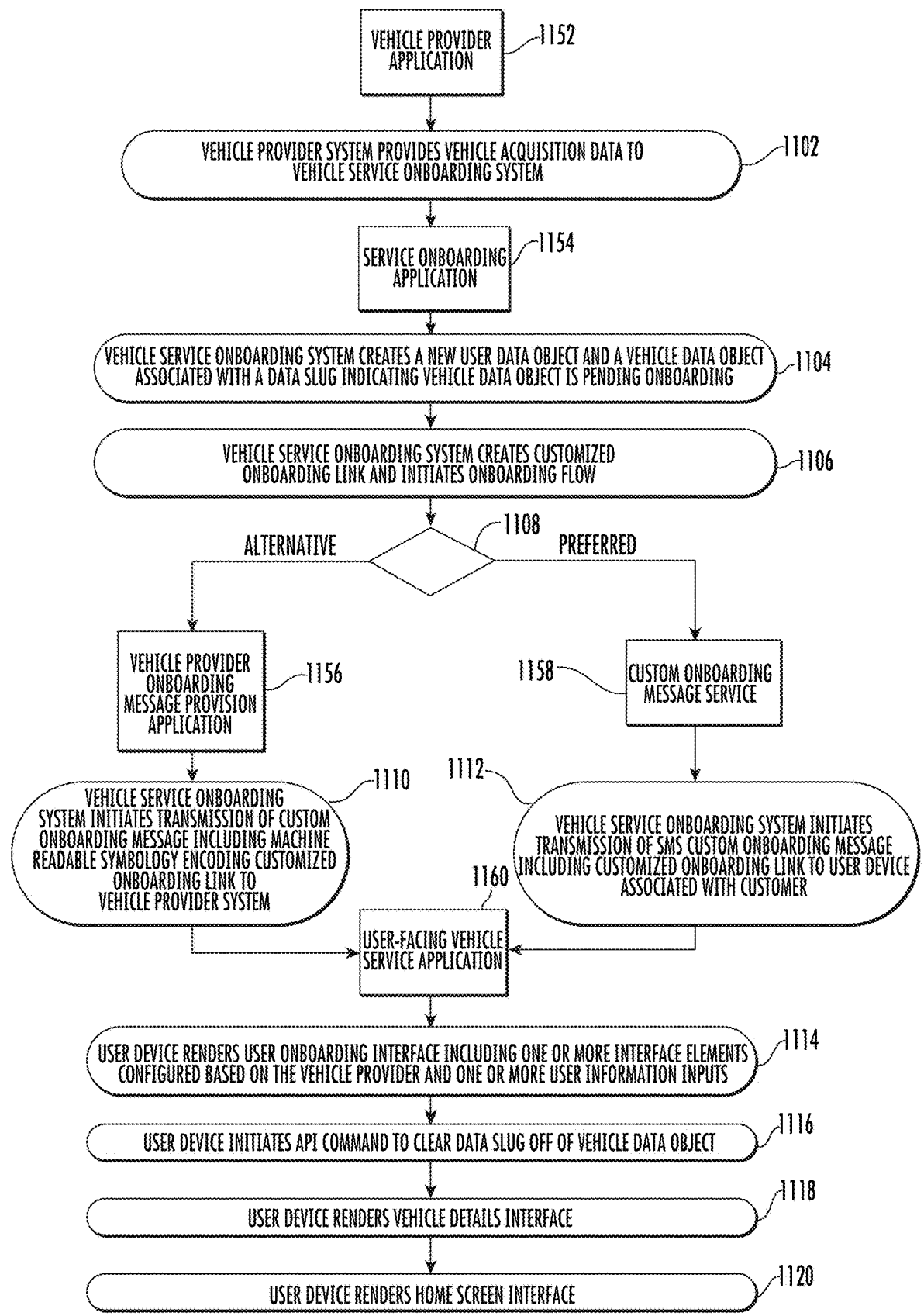
Figure 12:
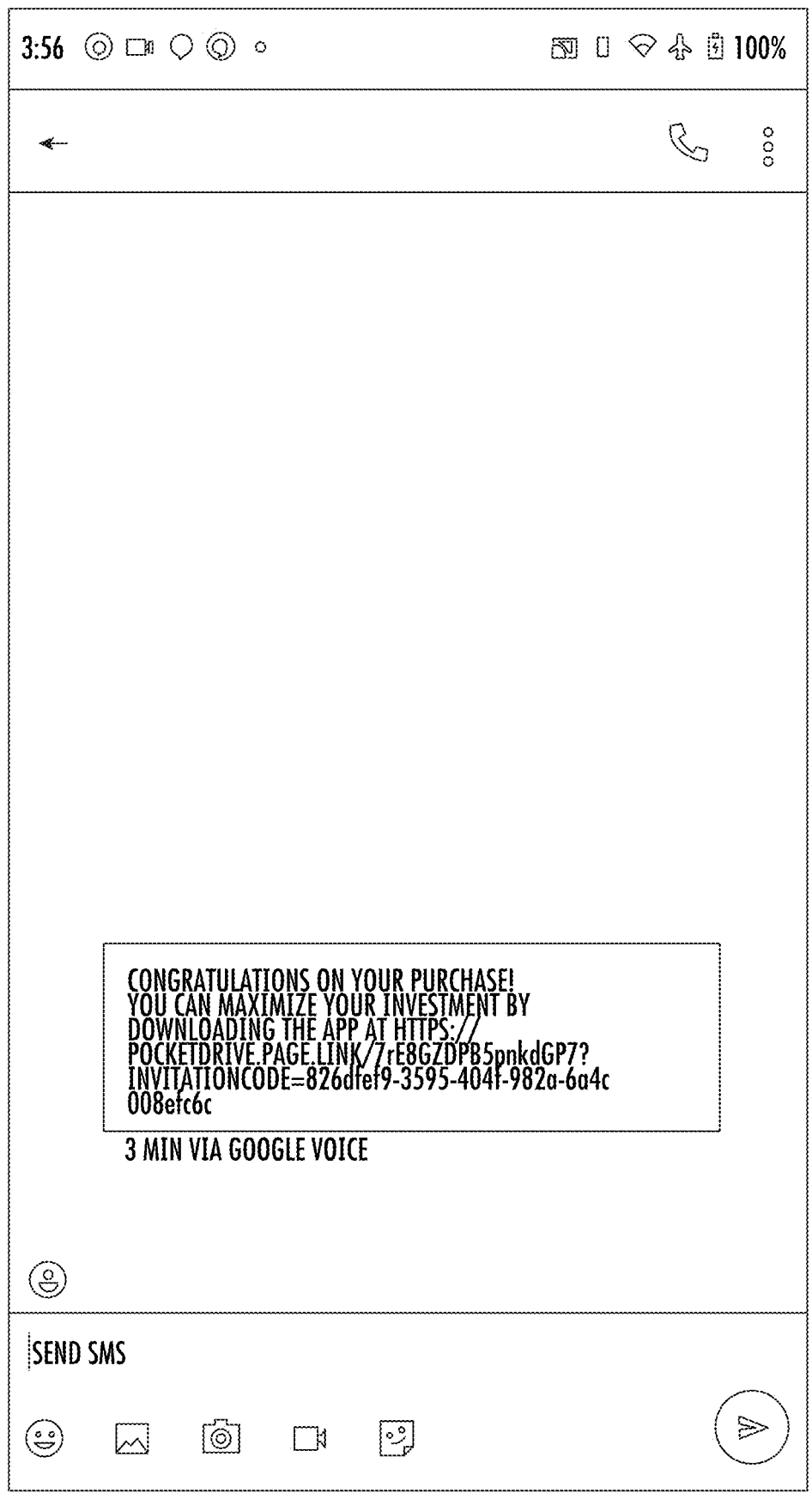
Figure 13:
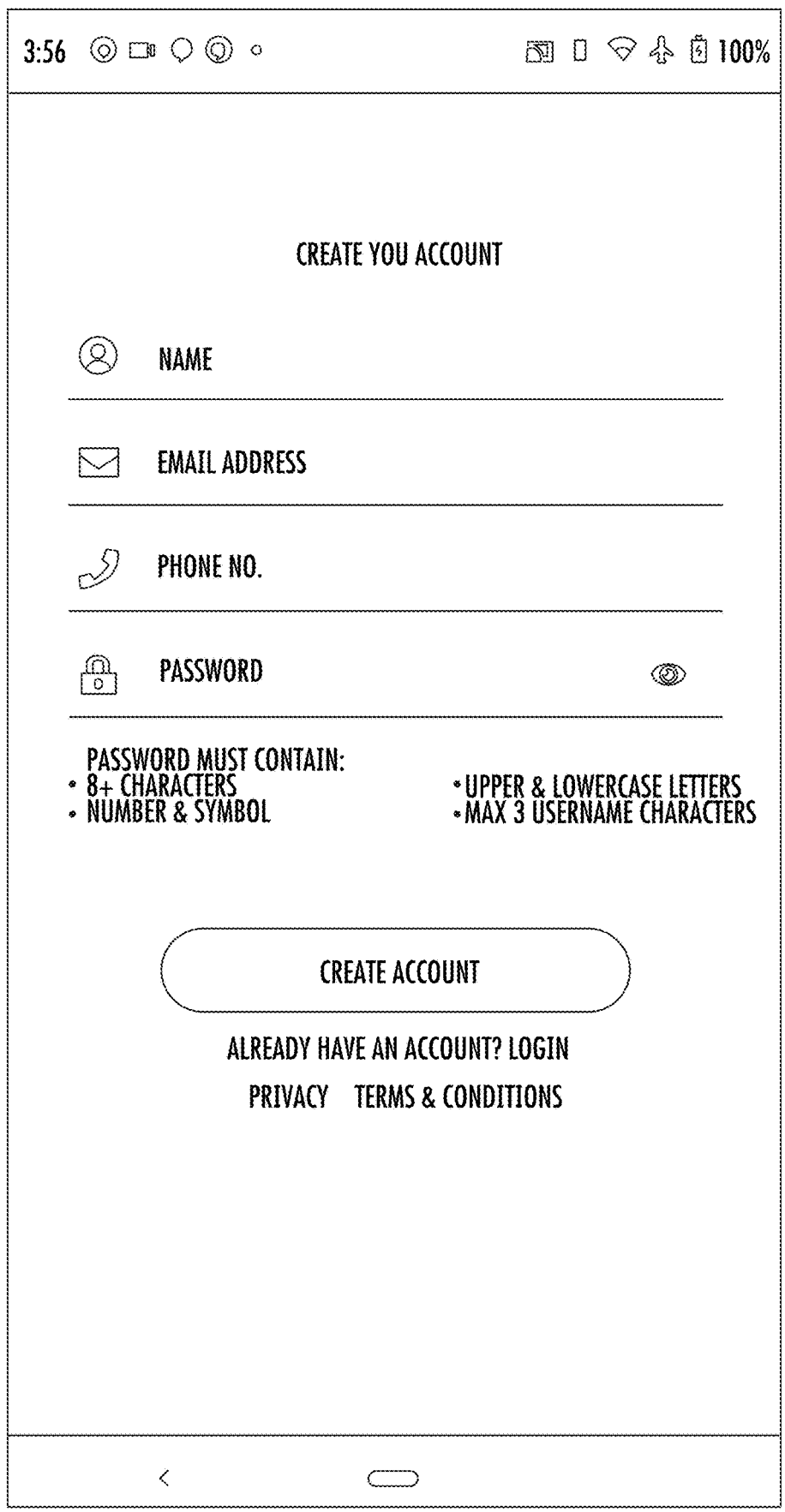

Having thus described the embodiments of the disclosure in general terms, reference now will be made to the accompanying drawings, which are not necessarily drawn to scale, and wherein:

FIG. 1 illustrates a block diagram of a vehicle service onboarding system that may be specially configured within which embodiments of the present disclosure may operate;

FIG. 2 illustrates a block diagram of an example vehicle service onboarding apparatus that may be specially configured to facilitate reduced-reliance vehicle service application onboarding in accordance with at least some example embodiments of the present disclosure;

FIG. 3 illustrates a block diagram of an example specially configured user device that may be specially configured to facilitate reduced-reliance vehicle service application onboarding in accordance with at least some example embodiments of the present disclosure;

FIG. 4 illustrates visualizations of example computing environments specially configured to facilitate reduced-reliance vehicle service application onboarding in accordance with at least some example embodiments of the present disclosure;

FIG. 5A illustrates a data flow diagram between computing devices performing operations for an example process of reduced-reliance vehicle service application onboarding in accordance with at least some example embodiments of the present disclosure;

FIG. 5B illustrates a flowchart depicting operations of an example process for reduced-reliance vehicle service application onboarding in accordance with at least some example embodiments of the present disclosure;

FIG. 6 illustrates a flowchart depicting operations of an example process for transmitting a custom onboarding message including a customized onboarding link over a particular communication channel in accordance with at least some example embodiments of the present disclosure;

FIG. 7A illustrates a data flow diagram between computing devices performing operations for an example process of reduced-reliance vehicle service application onboarding in accordance with at least some example embodiments of the present disclosure;

FIG. 7B illustrates a flowchart depicting operations of an example process for reduced-reliance vehicle service application onboarding in accordance with at least some example embodiments of the present disclosure;

FIG. 8 illustrates a flowchart depicting operations of a user device-performed process for reduced-reliance vehicle service application onboarding in accordance with at least some example embodiments of the present disclosure;

FIG. 9A illustrates a flowchart depicting operations of a user device-performed process for vehicle service application initialization in accordance with at least some example embodiments of the present disclosure;

FIG. 9B illustrates a flowchart depicting operations of a user device-performed process for vehicle service application initialization in accordance with at least some example embodiments of the present disclosure;

FIG. 10 illustrates a flowchart depicting operations of a user device-performed process for reduced-reliance vehicle service application onboarding via a custom onboarding message in accordance with at least some example embodiments of the present disclosure;

FIG. 11 illustrates a flowchart depicting operations performed by various computing devices of an example implementation of reduced-reliance vehicle service application onboarding in accordance with at least some example embodiments of the present disclosure;

FIG. 12 illustrates an example user SMS app with a customized onboarding message having a welcome message and a customized onboarding link in accordance with at least some example embodiments of the present disclosure;

FIG. 13 illustrates an example interface of a native user-facing vehicle service application in accordance with at least some example embodiments of the present disclosure; and FIGS. 14-35 illustrate example interfaces from a vehicle service application in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Service application systems may facilitate creation, tracking, receiving, sending, and/or other operations on data associated with a provider, customer, and/or subject, as well as facilitating communication and reconciliation between disparate computing systems. An onboarding process may be required before users and/or other computing systems are able to fully access and use the data. The onboarding process may include, by way of non-limiting example, gathering information associated with a provider, user, and/or subject to create data objects that may represent, grant access to, or be stored in association with the provider, user, and/or subject for use by the service application system. In some instances, the service application system may comprise a distinct computing system from the provider and customer;

however, the service application system may also not have first-hand access to the data needed for creating the data objects without onboarding information from the provider and/or customer.

Embodiments of the present disclosure relate to systems, methods, apparatuses, and related embodiments for providing onboarding of a service application between two or more disparate computing systems to reduce reliance on human input and facilitate continuity of communication between the customer and the service application system. In some embodiments, specific examples of service application systems and related devices, systems, algorithms, methods, and the like are described, such as a vehicle service application system; however, it should be understood by the person of ordinary skill in the art in light of the present disclosure that the specific examples are provided to illustrate non-limiting examples of the functionality of the underlying systems, methods, apparatuses, and related embodiments and the scope of the embodiments are not strictly limited to their context. For example, teachings described herein with respect to a vehicle service application system may be equally applied to and claimed as part of service application systems associated with any other customer-provider relationship. Likewise, reference herein to "vehicles" and the like may be substituted for any other subject that may be associated with a service application system.

In various embodiments, a vehicle service application system may include examples of the systems, methods, apparatuses, and related embodiments for providing onboarding of a service application between two or more disparate computing systems described herein. Vehicles are often transferred between and serviced by various parties. For example, customers regularly interact with vehicle providers, such as dealers, manufacturers, service technicians, and the like, for purposes of purchasing or otherwise obtaining, maintaining, servicing, or performing other actions associated with a vehicle and/or performing any number of other transactions. Often, vehicle providers lack robust information technology infrastructure, causing vehicle provider systems to often lack complete information associated with aspects of a vehicle and to lack the ability to effectively process information associated with the vehicle for coordination with third party service application systems, such as customer/purchaser information and vehicle information. Even where information technology infrastructures are adequate, factors such as market fragmentation and inconsistent protocols and onboarding procedures may make large scale, multi-provider systems impractical. Vehicle provider systems may maintain out-of-date information associated with a particular customer, for example, and/or entirely lack such information and lack the means to quickly and efficiently acquire such information. These problems may be exacerbated when time is of the essence, such as attempting to onboard a customer and vehicle to a vehicle service application while or immediately after the customer is on-site with the provider (e.g., purchasing a new vehicle, servicing an existing vehicle, or otherwise interacting with the provider).

In some embodiments, vehicle service applications and systems may be described that provide vehicle service applications associated with vehicle transactions, maintenance, ownership, and/or the like, which utilize various information to facilitate use of such application(s). Service applications may be programs embodied in software and/or hardware, such as a user mobile device, a cloud-based application, a downloadable program, or the like that enable a user (e.g., a vehicle owner) to maintain records, documents, and any other data associated with their vehicle in a convenient location. In some embodiments, the service application may provide connected services, such as offers and promotions for discounted services, maintenance and repair scheduling services, and the like.

To facilitate such functionality, onboarding associated with the service application is often required. However, vehicle providers (e.g., dealerships, manufacturers, and/or other entities that offer vehicles to customers) often do not have the appropriate IT infrastructure to facilitate robust intake of customer information. Additionally, employees of the vehicle provider that may otherwise input the necessary onboarding information are often incentivized to prioritize speed of completing the transaction to increase volume rather than ensuring all desirable customer information is collected and accurate. However, a user (e.g., a customer) on their own is often not incentivized to onboard with a vehicle service application, and/or may simply forget to do so. Thus, reliance on the vehicle provider to indicate when a transaction has occurred for purposes of prompting a user to onboard with the vehicle provider service is helpful and may improve data integrity and onboarding while facilitating easier computer system use for non-sophisticated users. Moreover, the ability for users to input data is often restricted due to other constraints, such that while it may be efficient to initiate the onboarding process with the provider, the users are often unwilling or unable to undertake the data input process required, and the data that is collected may be redundant, inaccurate, or excessive in such a manner that the onboarding process fails or is delayed. In this regard, while at least some reliance on data from a provider system may be advantageous for purposes of onboarding a customer to one or more service application(s), various embodiments discussed herein reduce reliance on manual input, memory, and coordination, while ensuring accurate and consistent data entry, hand-offs between third party systems, and timely and consistent onboarding. In such embodiments, the information received from the provider may be sufficiently complete or trustworthy to initiate onboarding, while reducing data input and interaction requirements at the point of sale, improving coordination between disparate computing systems, and facilitating timely onboarding with minimal manual input.

A vehicle service application may require a user to perform onboarding of data representing vehicle(s) in instances where the user has obtained a new vehicle(s), serviced a vehicle(s), or otherwise interacted with a provider, and/or onboarding of a user data object (e.g., a user account associated with the customer) in circumstances where a user has not previously onboarded such a user data object, in order to utilize the vehicle service application for accessing various functionality associated with the vehicle(s). Generally, conventional computing systems often rely on manual onboarding of data to configure an application. For example, absent the innovations discussed herein, a user and or vehicle provider may be required to manually create an account and manually enter the user's information and vehicle information before the vehicle service application is operational and without regard to the accuracy of the information or the competing requirements of the interacting users and computing systems. This manual interaction may be at least in part due to the deficiencies in the infrastructure of such vehicle provider systems, and the absence of any ability to rapidly interface with the vehicle service application system or vehicle service onboarding system for onboarding the user and/or vehicle quickly, intuitively, efficiently, and seamlessly.

Difficulties faced by the inventors in attempting to solve the problem of slow, inconsistent, or non-existent onboarding for a vehicle service application required identifying and solving a number of problems, examples of which are discussed herein. For example, systems associated with vehicle service applications have difficulty communicating with vehicle provider systems to receive any indication when a transaction with a customer occurs or onboarding is otherwise desired, and vehicle providers are rarely able to provide all of the data necessary for a complete onboarding in an accurate and timely manner suitable for the service application system. Moreover, without complete onboarding data or consistent communication with the vehicle provider, the systems associated with the vehicle service applications are unable to onboard the user and vehicle or must rely upon the user's own initiative to contact the system themselves, delaying or causing the failure of the onboarding process.

Additionally, manual onboarding by a single party to the transaction may be untrustworthy, and can lead to inaccurate data being maintained by the vehicle service application. For example, if a provider (e.g., dealer, service provider, or the like) were responsible for performing onboarding, the provider system may submit incorrect information, provide incomplete information, fail to connect or communicate with the vehicle service application systems, and/or neglect to provide any information or undertake the onboarding process. Similarly, if a customer (also referred to as a user with respect to a particular user device) were responsible for performing onboarding, the customer may not be aware of the vehicle service application entirely, may not be able to configure the service application, may provide incomplete information, may fail to connect or communicate with the vehicle service application systems, and/or may neglect to provide any information or undertake the onboarding process. In many instances, users associated with the vehicle provider or the customers may become frustrated and elect to forego participation with the vehicle service application rather than undertake a complex onboarding process or troubleshoot the data.

Various embodiments provided herein provide reduced-reliance service application onboarding, and may include a device/system agnostic onboarding process that enables any provider and any customer to be efficiently and intuitively onboarded into a service application system, even in instances in which the service application system is operated by a separate, third party computing system. In some embodiments, a limited set of information is received from a vehicle provider system, for example including at least a vehicle identifier and user communication channel data usable for transmitting information to a user device associated with a customer (also referred to as a "customer device") that obtained a vehicle. Such data is usable to initiate onboarding and provide a custom onboarding message to be accessed by the customer, either directly to the customer device or via a third party device accessible to the customer (e.g., a vehicle provider device). In some embodiments, the limited set of information may be transmitted from the vehicle provider system at or around the time the customer acquires the vehicle, receives maintenance on the vehicle, or otherwise interacts with the provider. In some embodiments, a provider may initiate the onboarding process after interaction with the customer or the application system may delay onboarding after receipt of the initial information from the provider (e.g., by waiting a predetermined time). The custom onboarding message may be dynamically generated and/or customizable to be associated with data representing a particular user (e.g., a user data object) and/or representing a particular subject, such as a vehicle (e.g., corresponding to a vehicle data object), that are associated with the information received from the vehicle provider system. In some embodiments, the system associated with the vehicle service application may create a user data object and associate the user data object with at least the vehicle. The custom onboarding message may then be sent to the user by referencing the user data object, which message may be sufficient to enable the user to claim the newly created account without needing a full onboarding process or any additional information beforehand. Moreover, the user data object may be pre-populated with data stored at the vehicle service application and/or provided by the vehicle provider to minimize manual input and synchronization issues. The pre-population may include reconciling existing user and subject/vehicle data objects when multiple providers engage with a customer using the service application system, such that if multiple providers each attempt to initiate onboarding for a customer, the service application system maintains a single user data object associated with the customer able to interact with both providers. For example, if a customer already has an account with the service application system upon initiation of onboarding, the customer may link the existing account to the provider and/or subject data object for which the new onboarding is sought without creating duplicate accounts. Moreover, the onboarding process is not delayed to await confirmation of the existing account and the onboarding process may create a user data object pending onboarding, which may later be linked with an existing account or replaced as discussed herein.

The custom onboarding message may be provided to the user, for example through various direct or indirect mechanisms as described herein, to enable access of the custom onboarding message via a corresponding user device. Upon access of the custom onboarding message via the user device, an initial onboarding process may be completed, which initial onboarding process may be sufficient to link the user device with the vehicle on the vehicle service application. This initial onboarding may enable further onboarding associated with the vehicle service application to be continued at the user's convenience while maintaining access to the application and data associated with the vehicle without requiring a full onboarding at the outset. In addition, the customer may receive access to the user data object pending onboarding that is ready to use upon acceptance by the user. In some embodiments, multiple mechanisms are implemented for providing a custom onboarding message, such that the reduced-reliance vehicle service application onboarding is not interrupted by inaccessibility of a particular communications between computing systems and/or devices.

Some embodiments facilitate automatic acquisition and/or automatic configuration of a user-facing vehicle service application on a user device. The user-facing vehicle service application may be utilized to facilitate reduced-reliance vehicle service application onboarding with respect to a corresponding vehicle service application accessible via the user-facing vehicle service application. In instances where a user device does not include a corresponding native user-facing vehicle service application, for example, obtaining the native user-facing vehicle service application from an appropriate source is initiated (e.g., from an iOS or Android app store). In some embodiments, alternatively or additionally, a user-facing application can be appropriately configured as a web-based user-facing vehicle service application. For example, in an instance where a user's mobile device does not include an "app" corresponding to a vehicle service application, upon interaction with a custom onboarding message the mobile device may automatically be directed to download a native user-facing vehicle service application that upon installation is automatically configured based on the custom onboarding message, and/or a browser application is automatically configured based on the custom onboarding message to access a certain web app. In some embodiments, this automatic configuration may at least include associating the user device and/or the user with the vehicle, such as by allowing the user to claim a ghost account (e.g., a user data object pending onboarding, which is not linked to a particular user or includes minimal user information transmitted by the vehicle provider) that was automatically created for the vehicle or otherwise link the vehicle to an existing account. In some embodiments, information associated with the vehicle provider may also be added to the account. In some embodiments, client-side data submission may be performed automatically with significantly reduced-reliance on manual entry at the point of vehicle acquisition and reduced barriers to onboarding without sacrificing accuracy or data trustworthiness (e.g., only requiring engagement with the custom onboarding message).

In this regard, embodiments of the present disclosure reduce the reliance on a vehicle provider system for onboarding while still enabling a customer to be prompted to perform such onboarding in a timely manner, and to do so efficiently. Thus, information from a vehicle provider system, which may not be complete or trustworthy in some instances, is utilized in a minimal capacity to provide a custom onboarding message to the customer (e.g., via a corresponding user device utilized by the customer) to effectively perform such onboarding associated with a particular transacted vehicle. Additionally or alternatively, in some embodiments where information is received from a vehicle provider system, at least some such information may be utilized to eliminate the one or more data entry steps that would otherwise be required by a customer to complete onboarding of a vehicle and/or a user associated with the vehicle service application. Additionally or alternatively, in some embodiments, by providing data for use in onboarding to the user device associated with the customer (e.g., a custom onboarding message) that is accessed via the user device, embodiments provide mechanisms for facilitating custom configuring of a user-facing vehicle service application for onboarding and/or use based on the reduced information received from the vehicle provider system.

By way of a non-limiting example, consider a user Andy that purchases a new vehicle provided by a vehicle provider Car Dealer. Car Dealer connects its customers with service provider App Provider to automatically enable customer(s) that purchase vehicles from Car Dealer to access functionality associated with ownership and/or maintenance of the newly purchased vehicle via a vehicle service application provided by App Provider. In this regard, the vehicle service application requires Andy to link the newly purchased vehicle to a user data object that represents Andy (or by proxy, Andy's mobile phone or other device) via the vehicle service application. Andy may or may not have an existing user data object stored with the App Provider. To facilitate Andy's use of the vehicle service application without requiring lengthy or complex data transfers at the time of purchase of the vehicle, and without requiring Andy or Car Dealer to provide significant information up front (e.g., by making it easy to onboard Andy and/or the newly purchased vehicle for use associated with functionality of the vehicle service application) and/or to improve the user experience associated with onboarding for use via the vehicle service application (e.g., by reducing the interactions required by Andy and/or an employee of Car Dealership), reduced-reliance vehicle service onboarding is utilized as described herein that receives minimal initial information and allows Andy to quickly claim the vehicle and begin utilizing the functionality of the app.

For example, a user of Car Dealership may input details of the transaction between Andy and Car Dealership into a vehicle provider system of Car Dealership. Such data may include information that uniquely identifies the vehicle transferred to Andy, and may, in some instances, include at least some unconfirmed information about Andy (e.g., name, age, address, phone number, email address, and/or the like). The vehicle provider system may provide vehicle acquisition data including the vehicle information and, if obtained, Andy's unverified information to a vehicle service onboarding system associated with the vehicle service application provided by App Provider. The vehicle service onboarding system may perform various data generation and/or association operations to create a subject data object, such as a vehicle data object, representing the newly purchased vehicle. In some embodiments, the data object may already exist in the App Provider's system and may be retrieved or otherwise recalled based on the vehicle acquisition data. The vehicle service onboarding system utilizes Andy's telephone number from the vehicle acquisition data received from the vehicle provider system of Car Dealer to transmit a text message embodying a custom onboarding message to Andy's mobile phone. Alternatively, in a circumstance where a text cannot be successfully transmitted to Andy's mobile phone or Andy's mobile phone number (or other communication information, such as email) is not available or sent as part of the initial information from Car Dealership to the App Provider, a custom onboarding message is transmitted to the vehicle provider system for presenting to Andy via a physical medium, such that Andy can utilize the physical medium (e.g., a printout, a code displayed on a screen of the vehicle provider, or the like representing the custom onboarding message or a portion of information thereof) to access the custom onboarding message via his mobile phone.

The custom onboarding message includes a customized onboarding link based on the corresponding subject data object such as the vehicle data object that, at least upon access, enables Andy to claim the vehicle data object and/or otherwise link the vehicle data object to a user data object accessible by Andy (e.g., a user data object representing Andy's account). In this manner, rather than requiring Andy and/or Car Dealership to create a new account and add Andy's and the vehicle information in real time, a ghost account is created for the vehicle upon receiving minimal initial information from the Car Dealer, and a custom onboarding message is provided to enable Andy to claim and customize the account either later or in real time at the Car Dealership. In some embodiments, Andy may claim the ghost account linked to the vehicle and replace temporary or missing information with his or her own information. In an example, the customized onboarding link causes an "app" installed on Andy's mobile phone to open a particular interface, which enables such onboarding by Andy. The interface may include one or more input(s) that are associated with the user data object and/or vehicle data object associated with or embodied by the vehicle acquisition data, at least a portion of which may, in some embodiments, be automatically filled based on the vehicle acquisition data received from the vehicle provider system of Car Dealer. In some embodiments, Andy may add or update one or more of the inputs, if necessary, and submit the user-inputted information for use by the vehicle service onboarding system in updating the vehicle data object and/or the user data object associated therewith to complete onboarding of such data object(s). In some embodiments, the system may pre-load the account with Car Dealership information, such as listing Car Dealership as the preferred dealer for vehicle maintenance.

After completing onboarding at least sufficiently to claim the account, Andy may access the vehicle service application associated with the vehicle service onboarding system of App Provider to access vehicle ownership and/or vehicle maintenance functionality provided by the vehicle service application based on the subject data object(s), for example vehicle data object(s), being linked to the user data object (e.g., information about a vehicle linked to a particular user's account) via the described onboarding. For example, the vehicle service application may track Andy's mileage and/or enable Andy to input the mileage for each vehicle associated with the user data object. Alternatively or additionally, the vehicle service application may enable Andy to subscribe to vehicle protection program(s) and/or make claims associated with such vehicle protection program(s) for each vehicle associated with the user data object. It should be appreciated that the vehicle service application may be configured to provide any of a myriad of functionality in light of the present disclosure. In this regard, Andy may continue to utilize the vehicle service application for any number of vehicle(s) with reduced-reliance by Andy and/or the user of the vehicle provider system to onboard the vehicle service application for use.

The above-described embodiments and examples are equally applicable in other contexts, which are fully contemplated by the disclosure herein. For example, a provider such as a tool manufacturer, servicer, or dealer looking to engage customers may seek to onboard the customer to a service application system using the same onboarding processes described herein, in which a customer engages with the provider and the provider transmits a user data object and/or tool data object to onboard the customer to a tool service application. In another example embodiment, a mobile phone manufacturer, seller, or servicer may seek to onboard a customer to a service application system associated with the customer's mobile phone using the same onboarding processes described herein.

In some embodiments, the systems, methods, apparatuses, and related embodiments may likewise be applicable to information and other tangible and intangible products and services of various providers. For example, a marketing provider may engage with customers using substantially the same type of service application, in which the marketer seeks to engage and onboard the customer to a marketing service application facilitated by a service provider. The marketing provider may likewise transmit a user data object and/or marketing data object (e.g., services purchased by or of interest to the customer) to onboard the customer to the marketing service application for tracking information associated with the customer's marketing efforts. In another example, an insurance provider may engage with customers using a service application, for which the provider initiates onboarding of the customer to a service application upon receipt of a claim, an indication of a claim, or interest or use of any provider service from the customer. The service application may also link two or more providers with the customer within the same service application framework (e.g., a vehicle dealer, repair service provider, and protection product provider). The embodiments described herein relating to a "vehicle" service application are provided to give the aforementioned context for an example environment in which the service application and associated systems, methods, apparatuses, and related embodiments operate but should not be construed as necessarily limiting the generality of the systems, methods, apparatuses, and related embodiments disclosed.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "customer" refers to a person, business, corporation, and/or other identifiable entity that transacts and/or otherwise interacts with a provider. In some embodiments, for example, a customer may engage with a provider, such as by servicing or buying goods, such as a vehicle via any of a myriad of transaction types, including without limitation a sale, a gift, a lease or other temporary possession, a fleet purchase, a transfer, and/or another provision and/or service of the good to the customer.

The term "customer information" refers to one or more data value(s) for properties that identify a particular customer, and/or are associated with the customer. Non-limiting examples of customer information include a first name, a last name, a phone number, an email, a natural person identifier (e.g., a social security number), and/or an entity identifier.

The term "user device" refers to one or more computing devices embodied in hardware, software, firmware, and/or a combination thereof, for use by a particular customer or agent associated therewith. Non-limiting examples of a user device include a mobile device, a smartphone, a tablet, a personal computer, a laptop, a wearable, and an enterprise terminal.

The term "user interaction" refers to electronically managed data representing a particular engagement by a user with an application. In one example context a user engagement includes or is embodied by data that indicates the type, location of a user interface, and/or other detail data associated with a performed engagement, including and without limitation a click at a particular location on a user interface, a click on a particular interface element, a gesture performed on a touch interface, time spent viewing and/or otherwise engaging with a particular user interface, and/or engagement with a particular interface element associated with a particular known function. In another example context a user engagement includes or is embodied by data that indicates a process or action initiated in response to a user engagement with a particular user interface, including and without limitation a process that was initiated in response to a user engagement, data submission received in response to user engagement, and an API endpoint reached and/or API request transmitted in response to user engagement. In this regard it will be appreciated that non-limiting examples of user interaction include data indicating "click of the buy button" and/or "click at coordinate (100, 183) of the current user interface."

The term "provider" refers to a person, business, corporation, and/or other identifiable entity that engages or desire to engage one or more customers. The term "vehicle provider" may refer to a vehicle implementation of a provider, such as a person, business, corporation, and/or other identifiable entity that deals in the sale, service, maintenance, offloading, and/or other provision of vehicles or goods or services associated with vehicles to one or more customers. Non-limiting examples of a vehicle provider may include a used vehicle dealership, a vehicle manufacturer, and an individual vehicle salesman.

The term "provider system" refers to one or more computing devices embodied in hardware, software, firmware, and/or a combination thereof, operated by and/or otherwise controlled by a provider or an agent thereof for purposes of supporting one or more actions performed by the provider. A "vehicle provider system" may refer to an example provider system for use by vehicle providers.

The term "acquisition data" refers to information generated and/or transmitted by a provider system associated with the engagement of and/or provisions of goods and/or services to a customer. In some embodiments, acquisition data may include one or more of (1) any information permitting identification of a good or service (e.g., a vehicle), (2) any information permitting identification of a provider, and/or (3) any information permitting identification of and/or contact with a customer. For example, acquisition data may include some or all of an identifier associated with a good or service (e.g., a subject of interest to the customer around which the provider engagement will focus, such as a vehicle identification number (VIN) of a vehicle), a provider identifier (e.g., a dealer identifier), a customer identifier, a customer name, a customer phone number, a customer email, and/or a customer address.

The term "service onboarding system" refers to one or more computing devices embodied in hardware, software, firmware, and/or a combination thereof, operated by and/or otherwise controlled by a service provider, that facilitates onboarding of a user data object and/or a subject data object (e.g., a vehicle data object), for a service providing functionality. For example, the service providing functionality may include any service that is needed or desired by the customer and/or provider, such as service information, product information, maintenance information, and/or one or more third party products or services, such as protection products including a service contract or insurance policy. For example, a "vehicle" service onboarding system may facilitate onboarding of a user data object and/or vehicle data object for a service providing functionality associated with maintenance and/or ownership of a vehicle, including optionally vehicle insurance or service contracts. In some embodiments, for example, the service provider, which may be a distinct party from a provider, creates, owns, and/or otherwise provides access to one or more software application programs embodied in hardware, software, firmware, and/or a combination thereof (which may be referred to as "service applications") needed or desired by the customer and/or provider, such as, in a vehicle example, one or more software application programs associated with maintenance and/or ownership of the vehicle, for example mileage tracking, warranty, service contract, and/or vehicle insurance provision, and/or the vehicle maintenance information provision.

The term "vehicle information" refers to electronically managed data generated and/or provided by a vehicle provider system that represents data values for one or more properties associated with a vehicle. Non-limiting examples of vehicle information include some or all of a VIN, a vehicle make, a vehicle model, a vehicle dealer identifier, vehicle mileage values, and/or other vehicle identifying or characterizing information. Similarly, various subject information may be provided in association with any provider system discussed herein.

The term "subject data object" refers to electronically managed data maintained by an onboarding system that represents any information associated with a subject of interest to the customer that forms a basis for the service application. For example, the term "vehicle data object" refers to a subject data object associated with a vehicle, which may include electronically managed data maintained by a vehicle service onboarding system that represents any information associated with a vehicle. In some embodiments, a vehicle data object includes data properties corresponding to at least some or all of vehicle information provided by a vehicle provider system. A subject data object may include at least an identifier that uniquely identifies the subject represented by the data object and/or the data object itself, such as a vehicle data object. In some embodiments, a vehicle data object may be associated with any of a number of related data objects, such as a user data object representing an owner of the vehicle.

The term "machine-readable symbology" refers to one or more visual elements that are detectable and/or decodable by one or more computing systems. A machine-readable symbology is detectable by one or more computing device(s) utilizing a detection algorithm, and is decodable by one or more computing device(s) utilizing a decoding algorithm. Non-limiting examples of a machine-readable symbology include a barcode, a QR code, a Data Matrix, other 2-D symbology, and other 3-D symbology. In some embodiments, the machine-readable symbology may be captured via a camera associated with a computing device and the symbology may be read according to known methods.

The term "user data object" refers to electronically managed data maintained by a service onboarding system that represents any information associated with a customer. In some embodiments, the user data object that has not yet been onboarded may include only some information associated with a customer, and in some embodiments includes no information about a customer at all while pending user input during onboarding as described herein (e.g., a ghost account having no or minimal user information stored therein). In some embodiments, a user data object embodies a user account that is associated with a particular customer for initiating an authenticated session for accessing one or more service application(s). An example user data object represents, without limitation, a particular customer that receives a vehicle via a transfer or otherwise engages a provider and who is enabled to access functionality of a service application.

The term "temporary user data object" refers to electronically managed data maintained by a service onboarding system that has not be claimed by a customer and/or otherwise is not confirmed to represent any particular customer. In some embodiments, a temporary user data object does not include sufficient data values for one or more properties of the temporary user data object for purposes of representing a particular customer. In some embodiments, additionally or alternatively, a temporary user data object is configured via onboarding to complete entry of data sufficient to represent a particular customer, and/or is replaced by a particular user data object representing a particular customer.

The term "pending onboarding" with respect to a subject data object and/or a user data object refers to an association between the subject data object and the user data object where the user data object has not been updated, authenticated, and/or otherwise fully onboarded by the corresponding customer. In some embodiments, a user data object that is pending onboarding by a customer and is associated with a subject data object does not include any values representing customer properties, and/or includes data values not yet updated and/or confirmed by the user. In some embodiments, a subject data object that is pending onboarding by a customer is associated with data that is not yet confirmed and/or updated based on user onboarding. In some embodiments, data objects "pending onboarding" may be associated with a data slug to indicate pending status. In some embodiments, data objects "pending onboarding" may be automatically deleted after a predetermined time without removing the "pending onboarding" status. In some embodiments, data objects "pending onboarding" may have limited or no functionality accessible within the vehicle service application.

The term "fully onboarded" with respect to a subject data object and a user data object refers to an association between the subject data object and the user data object that has been updated, authenticated, claimed and/or otherwise made permanent between the subject data object and the user data object representing the customer. A fully onboarded relationship between a user data object and a subject data object means that the information representing the user data object associated with the subject data object and/or the association with the subject data object, has been indicated as accurate by user interaction from the customer represented by the user data object. In some embodiments, a fully onboarded user data object represents or is otherwise associated with a user account and/or user authentication credentials (e.g., a username and password) utilized to authenticate the user and/or associate the user with a particular user data object.

The term "communication channel" with respect to one or more computing devices refers to a data communication pathway associated with the one or more computing devices that enables transmission of data between two or more computing devices. Connections between two different devices may be considered a separate communication channel even if there is overlap between the communication pathways (e.g., a message between party A and party B may be considered a different communication channel than a message between party A and party C regardless of whether parties A, B, and C are connected to the same internet connection or use the same or different internet protocols). For example, in some embodiments, a communication channel enables communication between a service onboarding system and a user device. In some embodiments, a communication channel enables communication between a service onboarding system and a provider system.

The term "user communication channel data" refers to one or more data values associated with one or more user device(s) and/or associated customer(s) that may be utilized to establish a communication channel between a servicing onboarding system and a user device. Non-limiting examples of user communication channel data include a phone number associated with a particular customer, an email address associated with the particular customer, and/or an IP address associated with a user device indicated as owned by, operated by, and/or otherwise linked to the particular customer.

The term "cellular communication channel" refers to one or more computing device(s) embodied in hardware, software, firmware, and/or a combination thereof, that enable cellular networking communication between two or more computing devices.

The term "inaccessible" when used with respect to one or more computing device(s) and a communication channel refers to a state of operationally functionality where transmissions over the communication channel by a computing device cannot be initiated and/or cannot be another computing device. Non-limiting examples of a causes for inaccessible communication channels include insufficient cellular connection signal by a sender and/or receiver computing device, loss of networking capabilities by a sender and/or receiver computing device, disconnection of the recipient computing device from a network, and/or failure of one or more intermediary computing devices associated with the communication channel. A determination of inaccessibility need not include identification of the underlying cause of the inaccessibility.

The term "cellular communication message" refers to electronically managed data transmitted over a cellular communication channel. Non-limiting examples of a cellular communication message include a SMS, MMS, and/or a data transmission.

The term "custom onboarding message" refers to a networking transmission including data that enables a user device to facilitate onboarding utilizing a communication channel between the user device and the service onboarding system that may be distinct from a communication channel between the service onboarding system and a provider system. The custom onboarding message may be sent to the user via a separate channel from the provider (e.g., to the user's email and/or phone instead of to the provider) or indirectly via the provider (e.g., as a QR code or other symbology displayed on a device controlled by the provider), which the user may then interact with to open a separate channel of communication with the service onboarding system, which channel may be independent of the provider system. In a non-limiting example, a user device and a service onboarding system primarily communicate over a first communication channel (e.g., an Internet connection between the two), and the provider system communicates with the service onboarding system over a second communication channel (e.g., an Internet connection between the two). In some embodiments, a provider system communicates with the service onboarding system over a Wi-Fi communication channel, and the user device communicates with the service onboarding system via a cellular communication channel.

The term "customized onboarding link" refers to a specially configured data representation of a resource to enable onboarding associated with a particular data object via a service onboarding system. A customized onboarding link includes sufficient information associated with a such that the data object to be onboarded associated with the customized onboarding link is identifiable. In some embodiments, the customized onboarding link additionally includes customer information for prefilling one or more inputs, and/or provider information for configuring one or more user-facing interfaces associated with onboarding. Non-limiting examples of a customized onboarding link include a specially formatted uniform resource identifier, a specially formatted uniform resource locator, and/or a specially formatted external resource identifier.

The term "user-facing service application" refers to one or more software applications configured for execution by or on a user device that provides access to onboarding and/or functionality associated with a service application. The service application may encompass the user-facing service application. Additionally or alternatively, in some embodiments, the user-facing service application communicates with the service application to enable a user to interact with functionality performed by the service application. In some embodiments, the service application may be fully or partially instantiated as the user-facing service application installed on a user device. In some embodiments, the service application may include hardware, software, or combinations thereof operating remotely (e.g., on a server). For example, a user-facing "vehicle" service application may refer to a vehicle-oriented user-facing service application.

The term "native user-facing service application" refers to a particular user-facing service application embodied by at least one software application that is specifically designed to be executed within a specific computing environment associated with a computing device of a consumer, and is configured to provide access to functionality of a service onboarding system. A non-limiting example of a service application refers to an "app" installed to and/or executing via a mobile device that provides access to at least onboarding functionality provided by a service onboarding system.

The term "web-based user-facing service application" refers to a user-facing service application, accessible via a browser application, that is configured to provide access to functionality of a service onboarding system. For example, in some embodiments, a web-based service application is accessed from a user device via a browser application installed to and/or executed via the user device. For example, a web-based "vehicle" service application may refer to a vehicle-oriented user-facing service application.

The term "application distribution platform" refers to one or more systems configured to provide access to installation and/or download of native software applications to a user device. Non-limiting examples of an application distribution platform include the Apple App Store provided by Apple Inc. of Cupertino, California, and the Google Play store provided by Google LLC of Mountain View, California.

The term "data slug" refers to identifiable, electronically managed structured data that may be associated with another structured data object to indicate the other data object has not yet been fully onboarded. For example, in some embodiments, a data slug refers to a structured data object may be associated with a subject data object to indicate the customer associated with the subject data object as represented by a corresponding user data object has not yet been fully onboarded.

The term "user interface" refers to data rendered to a display of a computing device that includes one or more interface elements visible to a user of the computing device. In some embodiments, a user interface is interactable such that the use may perform various user interaction(s) with the one or more interface elements. It should be appreciated that in various example contexts, a user interface provides access to particular functionality of one or more computing devices (e.g., initiation of one or more processes, communication with a remote processing server configured to perform particular functionality, and/or updating of renderings to a display).

The term "user onboarding interface" refers to a particular user interface to enable automatic input and/or user input of customer information to be stored to and/or processed via a corresponding user data object. In some embodiments, a service onboarding system renders or causes rendering of a user onboarding interface in response to accessing one or more particular onboarding messages that direct the user, for example via a user device, to access the user onboarding interface. In some embodiments, a service onboarding system transmits to a user device a specially configured transmission embodying the embodies the user onboarding interface, or includes data utilized to configure the user onboarding interface, to cause rendering of a user onboarding interface by the user device.

The term "physical medium" with respect to the presentation of information refers to any tangible object on which information and/or data is printable, embeddable, inscribable, etchable, renderable, or otherwise presentable. In some embodiments, a specially configured computing device enables presentation of a physical medium including particularly presented information, for example a particular machine-readable symbology. Non-limiting examples of a physical medium include a paper printed by a printer, a second computing device rendering a particular user interface, and/or a directly marked laser-inscribed object and/or surface.

The term "onboard" with respect to one or more data objects refers to a state of data fidelity and/or data usability associated with the one or more data object(s). A user data object and/or subject data object is onboarded by interaction with a custom onboarding message associated with the user data object and/or subject data object. In one example context, a data object that is awaiting onboarding includes one or more data values not yet confirmed by a particular user. Additionally or alternatively, in one example context, the data object that is awaiting onboarding is not confirmed as associated with a particular data object with which the data object is to be associated.

The term "fully onboarded" with respect to a data object refers to a particular state of data fidelity and/or data usability associated with the one or more data object(s) where the data has been confirmed by a user and/or is associated with a particular data object confirmed by a user, while not necessarily requiring all available or optional fields associated with the particular data object to be complete. A subject data object and a user data object are fully onboarded upon receiving an indication that a user accessed a custom onboarding message associated with such data object(s), and/or updating one or more data value(s) associated with either of or both of the subject data object and/or user data object based on user-inputted information embodying or received together with an indication that the user accessed a custom onboarding message, which indications may collectively include a single or multiple signals. In one non-limiting example, a user data object may be considered fully onboarded upon receipt of any name, email address (e.g., to serve as a unique identifier/user name), mobile number, and upon storage in memory of the user's acceptance of the terms and conditions of the service application system. In some embodiments, the vehicle application system may require multi-factor authentication to be enabled prior to The term "protection product" refers to any policy, contract, service, or other product that provides for the protection, coverage, maintenance, and/or repair of one or more good or services (e.g., a vehicle). Examples of protection products may be vehicle extended protection plan information, insurance plan information, GAP insurance plan information, tire and wheel coverage plan information, prepaid maintenance plan information, an appearance protection product, a factory warranty protection product, a theft protection product; a 3-for-1 protection product, and/or the like. In some embodiments, the "protection products" may exclude a manufacturer's standard warranty. Protection products may be linked to and/or included in a subject data object and/or user data object, for example, depending upon whether the product is linked to the subject or the customer in some embodiments.

Example Systems of the Disclosure

FIG. 1 illustrates an example reduced-reliance onboarding system comprising a vehicle service onboarding system 102, a vehicle provider system 104, and user device 106 in accordance with example embodiments of the present disclosure. The depicted reduced-reliance onboarding system includes links between the vehicle service onboarding system 102 and the vehicle provider system 104, as well as between the vehicle service onboarding system 102 and the user device 106, over at least one communications network 108. In other embodiments, the vehicle service onboarding system 102 communicates with the vehicle provider system 104 over a first communications network, and the vehicle service onboarding system 102 communicates with the user device 106 over a second communication network. The various systems and devices depicted communicate to facilitate the functionality described herein.

The depicted vehicle service onboarding system 102 includes a vehicle service onboarding server 102A and a vehicle service onboarding data repository 102B. As depicted, the vehicle service onboarding server 102A is communicable with the vehicle service onboarding data repository 102B. In some embodiments, the vehicle service onboarding server 102A is directly coupled to the vehicle service onboarding data repository 102B, for example by wiring within the vehicle service onboarding system 102. Alternatively or additionally, in some embodiments, the vehicle service onboarding server 102A is wirelessly coupled to the vehicle service onboarding data repository 102B. In yet other embodiments, the vehicle service onboarding data repository 102B is embodied as a sub-system of the vehicle service onboarding server 102A. Alternatively or additionally, in some embodiments, the vehicle service onboarding data repository 102B is embodied as a virtual repository executing on the vehicle service onboarding server 102A.

The vehicle service onboarding server 102A is configured to provide various service application functionality. In some embodiments, the service application functionality is associated with one or more aspects of vehicle ownership, vehicle information tracking, vehicle transfer, vehicle maintenance, and/or the like. In this regard, the vehicle service onboarding server 102A may link user data object(s) representing users provisionsed for accessing the vehicle service application with vehicle data object(s) representing vehicles acquired and/or otherwise owned by such users. In this regard, a particular user may access the vehicle service application functionality provided by the vehicle service onboarding server 102A to utilize such functionality with respect to one or more vehicle data object(s) linked, or otherwise associated, with the user data object representing that user.

The vehicle service onboarding server 102A is further configured to provide reduced-reliance onboarding functionality, as described herein. In this regard, for example, the vehicle service onboarding server 102A receives and processes vehicle acquisition data from the vehicle provider system 104. The vehicle acquisition data may be utilized to generate and/or configure one or more data object(s) maintained by the vehicle service onboarding system 102 (e.g., a subject data object such as a vehicle data object, and/or a user data object). The vehicle acquisition data is utilized to generate and/or transmit a custom onboarding message utilized in facilitating reduced-reliance onboarding as described herein. For example, in some embodiments, the vehicle service onboarding server 102A attempts initiation of the custom onboarding message to the user device 106. Alternatively or additionally, the vehicle service onboarding server 102A transmits the custom onboarding message to the vehicle provider system 104, for example in circumstances where the attempted initiation of the custom onboarding message to the user device 106 fails and/or the vehicle service onboarding server 102A otherwise determines an associated communication channel is inaccessible (e.g., if no customer information is provided). The vehicle service onboarding server 102A receives an indication upon access of the custom onboarding message, and/or a portion thereof, by the user device 106. The indication that the user device 106 accessed the custom onboarding message may be received from the user device 106, for example when the user device 106 accesses the custom onboarding message directly through the a transmission directly to the user device 106 or indirectly through interaction with the vehicle provider system 104. Upon receiving an indication the user device 106 accessed the custom onboarding message, the vehicle service onboarding server 102A updates one or more data value(s) and/or data objects maintained by the vehicle service onboarding system 102.

The vehicle service onboarding data repository 102B embodies one or more computing devices configured to store any of the various data processed by the vehicle service onboarding server 102A to provide the functionality described as performed by the vehicle service onboarding system 102. The vehicle service onboarding data repository 102B may store various data in any of a myriad of manners, formats, tables, computing devices, and/or the like. For example, in some embodiments, the vehicle service onboarding data repository 102B includes one or more sub-repositories that are configured to store specific data processed by the vehicle service onboarding server 102A.

In some embodiments, the vehicle service onboarding server 102A is configured to store specific data being processed to the vehicle service onboarding data repository 102B. For example, in some embodiments, the vehicle service onboarding server 102A stores data generated included in and/or based on vehicle acquisition data as such vehicle acquisition data is processed, such as vehicle data object(s) (or other subject data object(s) in other contexts), user data object(s), data slug(s) associated therewith, associations between user data object(s) and vehicle data object (s) and/or indication(s), and/or the like. In some embodiments, additionally or alternatively, the vehicle service onboarding server 102A stores data based on accessed custom onboarding message(s). For example, in some embodiments, the vehicle service onboarding data repository 102B stores at least user data object(s) associated with customers owning and/or acquiring vehicle(s), vehicle data object(s) representing vehicle(s) associated with such user data object(s), and/or data linking vehicle data object(s) one or more user data object(s), based on the processed data. In some embodiments, the vehicle service onboarding server 102A updates one or more data records stored in the vehicle service onboarding data repository 102B in response to such processing, for example to update the status of a vehicle data object and/or user data object to indicate whether such data object(s) have been fully onboarded.

In some embodiments, the vehicle service onboarding system 102 embodies or is associated with a vehicle service application. In this regard, a user device, for example the 106 may communicate with the vehicle service onboarding system to fully onboard a user data object, associated with a particular subject data object, for example a vehicle data object, that enables access to vehicle service application functionality. For example, via the vehicle service onboarding system 102, the customer utilizes the user device 106 to fully onboard a user data object embodying a user account and link the user account with a vehicle recently purchased by the user, such that customer can utilize the onboarded user account to access a corresponding vehicle service application providing mileage tracking, maintenance information, and/or other vehicle ownership functionality.

Alternatively or additionally, in some embodiments, the vehicle service onboarding system 102 includes or is associated with a vehicle service application system, such as the vehicle service application system 110, embodying the vehicle service application. As depicted, the vehicle service application system 110 includes a vehicle service application server 110A and a vehicle service application data repository 110B. In some embodiments, the vehicle service application data repository 110B includes one or more computing device(s), database(s), and/or the like, configured to store data objects utilized for providing vehicle service application functionality. For example, in some embodiments, the vehicle service application data repository 110B includes one or more memory devices configured to store at least subject data object(s) such as vehicle data object(s), information associated with such vehicle data object(s) (or other subject data object(s)), user data object(s), and/or links between user data object(s) and vehicle data object(s) (or other subject data object(s)). In some embodiments, the vehicle service application server 110A is configured to store data to the vehicle service application data repository 110B that is processed by the vehicle service application server 110A for providing the vehicle service application functionality. Additionally or alternatively, in some embodiments, the vehicle service application server 110A is configured to retrieve data from the vehicle service application data repository 110B for use in providing the vehicle service application functionality.

In some embodiments the vehicle service application system 110 maintains one or more documents, images, videos, and/or other file data object(s), in text and/or image form, associated with one or more user data object(s) and/or subject data object(s) (e.g., vehicle data object(s)). For example, in some embodiments, the vehicle service application system 110 maintains image (or frames of video) representations captured via a client device, for example scanned document(s), captured image(s), video(s), and/or the like, which may be captured using a scanner, a camera separate from or integral with the client device (e.g., a mobile phone camera), or other imaging device. Non-limiting examples of captured image representation(s) include image representation(s) of document(s), receipt(s) for services, image(s) of the vehicle, and/or the like. For example, with reference to FIG. 16, an embodiment is shown in which a roadside service membership card has been captured in image form and the data associated with the card has been extracted and converted into text form automatically for inclusion in one or more fields below the image. The user may, additionally or alternatively, manually insert additional information related to the roadside coverage. Similarly, FIGS. 18-20 show the capture and storage of both manual and automatically entered information from a service receipt; and FIG. 21 shows captured information associated with a windshield policy. In this manner, the virtual "glovebox" shown in the figures and described herein, either locally (e.g., on a vehicle service application) or in conjunction with the vehicle service application system 110 or another remote system, may store and aggregate user data object(s) and/or subject data object(s) such as vehicle data object(s) for presentation in a single application. In some embodiments, vehicle information associated with (or utilized for onboarding) a vehicle data object is determined by processing such file data object(s). For example, in some embodiments, one or more file data object(s) may be scraped, processed utilizing optical character recognition (OCR), and/or the like to extract vehicle information and/or user information for the associated user data object. File data object(s) may be received from one or more third-party system(s), user device(s), and/or the like. As described herein, the collected data may then be processed in conjunction with the user data object(s) and/or vehicle data object(s) to update the system accordingly. The system may be utilized as a central hub that stores data (e.g., image, video, document, OEM, and/or other data) and/or provides access (e.g., as a "virtual glovebox") to such data to the user with which such data is associated, for example the owner of particular vehicle(s), driver(s) of such vehicle(s), and/or user(s) otherwise associated with one or more data object(s) representing such vehicles. Alternatively or additionally, in some embodiments the system may be utilized as a central hub that stores data for users and provides such data to any number of other entities that provide service(s) associated with such vehicles (e.g., vehicle dealers, service providers, and/or the like) for viewing and/or accessing the data associated with a user and/or vehicle(s). For example, receipts uploaded to the system may update the service history and recommended actions for the vehicle (e.g., a 10,000 mile service being completed may close that action and trigger a new future maintenance reminder at 15,000 miles). By way of another example, uploaded policy documents may add the policy as an option for future maintenance/repairs when recommending a solution to a user (e.g., a new claim reporting flow, such as the flows described with respect to FIGS. 23-34, may be added for the user based on the type of coverage acquired). Similarly, the system may recommend service or repairs based on the particular coverage a user has (e.g., warranty repair may only be recommended if a warranty is active), and these options may be updated within the system based on the captured information. Additional embodiments of features, functions, processes, apparatuses, and systems associated with capturing and storing data associated with a user and/or vehicle and other functionality enabled by a vehicle service application and associated systems are described in U.S. Patent Publication No. 2020/0234515A1, filed Jan. 23, 2020, and entitled "Methods, Apparatuses, And Systems For Monitoring And Maintaining Vehicle Condition", which application is hereby incorporated by reference herein in its entirety.

The external service system(s) 112 each include one or more computing device(s) embodied in hardware, software, firmware, and/or a combination thereof, that provide one or more vehicle-related service(s) and/or associated functionality. In some embodiments, an external service system of the external service system(s) 112 embodies a back-end computing system supporting operations of a vehicle service provider, for example a repair shop, a body shop, an auto dealer, and/or the like. Each of the external service system(s) 112 may embody a system separate from the vehicle service onboarding system 102 and/or the vehicle service application system 110. Additionally or alternatively, in some embodiments different entities control any of the external service system(s) 112 and the vehicle service onboarding system 102 and/or vehicle service application system 110.

In some embodiment, the vehicle service onboarding system 102 and/or the vehicle service application system 110 communicate with one or more external system(s) of the external service system(s) to access data associated with the one or more external system(s) and/or perform any of a myriad of functionality provided by such one or more external system(s). In this regard, the separate system(s) may communicate in any of a myriad of manners via one or more communications network(s), such as the communications network 108. In some embodiments, captured image(s), file data object(s), data, and/or the like, the vehicle service application system 110 is communicable with one or more external system(s), such as one or more of the external service system(s) 112), for processing. For example, in some embodiments, in response to user input the vehicle service application system 110 transmits one or more image data object(s), file data object(s), and/or the like to vehicle servicing and/or repair systems (e.g., via one or more data transmissions, API calls, and/or the like) for processing by such vehicle servicing and/or repairs systems. In some embodiments, the vehicle service application system 110 receives an offer for services in response, the offer based at least in part on the provided image data object(s), file data object(s), and/or the like. By way of example, as part of the illustrative flow shown in FIGS. 23-34, the repair shop selected by the user in FIG. 34 and/or one or more repair shops selected by the vehicle service application system 110 may receive details about the claim, including photographs and other documentation or information captured by or otherwise provided to the vehicle service application, and the repair shop may return a quote for the repair with or without adjustment based on the user's policy information associated with the vehicle service application. Additional embodiments of features, functions, processes, apparatuses, and systems associated with providing quotes and estimates to users based on received data are described in U.S. Patent Publication No. 2020/0234515A1, filed Jan. 23, 2020, and entitled "Methods, Apparatuses, And Systems For Monitoring And Maintaining Vehicle Condition", which application is hereby incorporated by reference herein in its entirety.

In some embodiments, the vehicle service application system 110 enables a user to schedule services and/or otherwise accept offers for services associated with a particular vehicle. For example, the vehicle service application may provide a GUI option for the user to schedule the desired service from their client device, such as in connection with the interface shown in FIG. 34 or with any other service or feature included in the vehicle service application. Such services may include dealer services (e.g., test drives of vehicle(s), purchases of vehicle(s), and/or the like), repair services (e.g., scheduling repairs of a vehicle corresponding to a vehicle data object currently associated with a particular user data object), and/or the like. In this regard, the vehicle service application system 110 may communicate with an external system of the external service system(s) 112 (e.g., a vehicle provider system, a vehicle servicing system, and/or the like) to communicate user information, vehicle information, scheduling time(s), service(s) to be performed, and/or the like. In some such embodiments, a user accesses the vehicle service application system 110 to schedule services with a third-party or otherwise external service provider (e.g., a dealer or servicing entity) directly from within the user-facing vehicle service application associated with the vehicle service application system 110. In this regard, the vehicle service application system 110 may be utilized to provide in-app scheduling of third-party services associated with one or more external entities and/or external service systems, for example that involve repairing and/or otherwise interacting with a particular vehicle onboarded to the system. For example, a user may be presented one or more user interface(s) for scheduling service(s) associated with one or more vehicle data object(s), such as depicted and described with respect to FIG. 14. Additional embodiments of features, functions, processes, apparatuses, and systems associated with scheduling repairs and other services are described in U.S. Patent Publication No. 2020/0234515A1, filed Jan. 23, 2020, and entitled "Methods, Apparatuses, And Systems For Monitoring And Maintaining Vehicle Condition", which application is hereby incorporated by reference herein in its entirety.

Alternatively or additionally, in some embodiments, the vehicle service application system 110 communicates image(s), file data object(s), and/or the like to one or more external system(s) of the external service system(s) 112 for any of a myriad of vehicle inspection and/or repair purposes. For example, in some embodiments, a user provides input indicating particular image(s), video(s), and/or other stored data for transmission to a dealer or other vehicle provider system (e.g., for offering trade-ins, repair costs, and/or the like), an auto body shop system (e.g., for offering quotes on repair services) and/or the like. In some embodiments, diagnostic data associated with the vehicle may be provided (e.g., via a OEM API linked to the vehicle telematics system) along with data that indicates the subject data object (e.g., a vehicle data object) with which such data is associated. In some embodiments, some or all of the image data object(s), video data object(s), and/or the like may be captured via a user device controlled by a user associated with the particular user data object with which such data is to be associated, such as user device 106. For example, in some embodiments, a user of the user device 106 utilizes a camera (e.g., a mobile phone camera) to capture image and/or video data of a document, vehicle, and/or the like, and inputs such data for storing associated with a user data object and/or subject data object such as a vehicle data object via the vehicle service application system 110. Alternatively or additionally, in some embodiments, some or all of the image data object(s), video data object(s), and/or the like may be captured via the external service system(s) 112 and/or one or more user device(s) associated therewith (e.g., user device of an administrator of any one of the external service systems 112(*s*)). In some such embodiments, the data may be transmitted to the vehicle service application system 110 together with data that identifies a particular user data object and/or subject data object such as a vehicle data object with which the data is associated. Additionally or alternatively, in some embodiments, some or all of the image data object(s), video data object(s), and/or the like may be captured via the vehicle provider system 104 and/or one or more user device(s) associated therewith. In some such embodiments, the data may be transmitted to the vehicle service application system 110 together with data that identifies a particular user data object and/or subject data object such as a vehicle data object with which the data is associated. The subject data object (e.g., a vehicle data object) and/or user data object with which such data is associated may be parsed and/or detected from a captured image data object and/or video data object (e.g., utilizing OCR to identify a particular vehicle identifier, user data object identifier, and/or the like). Alternatively or additionally, in some embodiments, a user inputting the data via a particular system inputs and/or selects a subject data object such as a vehicle data object and/or a user data object with which such data is associated.

In some embodiments, the entity receiving the image(s), video(s), file(s), and/or the like may process such data to provide interface(s) to individual users that subsequently perform virtual inspection service(s) associated with a vehicle based on such transmitted data. In this regard, the vehicle service application supported by the vehicle service application system 110 may serve as a central hub for data and/or document storage, retrieval, and transmission associated with any number of vehicle(s). For example, in some embodiments, a user may access data associated with a particular vehicle data object (or other subject data object in other contexts) through one or more user interface(s), for example as depicted and described with respect to FIGS. 15, 16, 18, 19, and/or 20.

Additionally or alternatively, in some embodiments, the vehicle service application system 110 enables importing and/or exporting file data object(s), user information, and/or vehicle information for any of the embodiments herein utilizing one or more external communication application(s), which may be hosted by or otherwise associated with one or more computing systems. Non-limiting examples of an external communication application include an email system, a third-party messaging system, an SMS or other text messaging system, and/or the like. In some embodiments, the vehicle service application system 110 accesses an email system (or other external communication application) to generate external communication(s) including stored file data object(s), vehicle information, user information, and/or the like. In some embodiments, the vehicle service application system 110 generates and/or maintains a particular external communication application identifier (e.g., a recipient email address or an account associated with the recipient or recipient email address in the context of an email system) specific to a particular subject data object (e.g., a vehicle data object) and/or user data object, where data and/or file data object(s) transmitted to the external communication application identifier that are received via the external communication application are stored by the vehicle service application system 110 associated with a particular corresponding subject data object. In one example context, the vehicle service application system 110 maintains a vehicle-specific or user-specific email address corresponding to a particular vehicle data object, such that documents and/or data emailed to the vehicle-specific email address is/are automatically extracted by the vehicle service application system 110 and stored associated with the vehicle data object. In another example context, the vehicle service application system 110 maintains a vehicle-specific or user-specific identification code corresponding to a particular vehicle data object, such that documents and/or data emailed with the identification code is/are automatically extracted by the vehicle service application system 110 and stored associated with the vehicle data object in connection with any of the data extraction, storage, and presentation embodiments discussed herein. In this regard, the vehicle service application system 110 may maintain and/or otherwise provide access to one or more email address(es) dedicated to each vehicle data object maintained by the system, such that any entity (and/or expected, approved, or otherwise "whitelisted" entities) may submit data to be associated with said vehicle data object via the corresponding dedicated email address. It will be appreciated that vehicle-specific email addresses (and/or other external communication application identifier(s) associated with particular vehicle data object(s)) may be generated and/or maintained for any number of unique vehicle data object(s). It will be appreciated that other embodiments may similarly function for other types of subject data object(s).

In some embodiments, the vehicle service application server 110A includes one or more specially configured computing devices that embodies and/or otherwise provides the vehicle service application. In this regard, the vehicle service application server 110A may include one or more servers configured via one or more specially configured software applications to receive specially configured requests from the user device 106 and provide access to particular service application functionality in response to the specially configured requests. The user of the user device 106, for example a customer that owns a particular vehicle corresponding to a particular vehicle data object, may initiate an authenticated session associated with a certain user data object (e.g., representing that customer's user account) to access such vehicle service application functionality associated with the particular vehicle data object.

In this regard, the vehicle service onboarding system 102 may generate, update, and/or otherwise configure data for use by the vehicle service application system. For example, in some embodiments, the vehicle service onboarding system 102 onboards user data object(s) that are utilized to access the various functionality provided by the vehicle service application, and/or subject data object(s) such as vehicle data object(s) that are utilized in various functionality provided by the vehicle service application. In some such embodiments, the vehicle service onboarding system 102 and vehicle service application system 110 may share one or more data repositories accessible to each system.

In some embodiments, the vehicle service onboarding system 102 and/or the vehicle service application system 110 communicates (e.g., via the communications network 108 and/or another communications network) with any number of external and/or disparate third-party data systems. Each third-party data system may maintain separate data associated with the subject data object(s), such as vehicle data object(s), and the vehicle service onboarding system 102 and/or the vehicle service application system 110 may push data out to these third party systems and receive data from these third party systems to facilitate a combined knowledgebase and synchronization across the systems. In this regard, the vehicle service onboarding system 102 and/or the vehicle service application system 110 may utilize one or more subject identifier(s) (e.g., vehicle data object identifier(s)), code(s), and/or the like to automatically retrieve and/or process data associated with a particular subject data object, such as a particular vehicle data object. The vehicle information from third-party data system(s) may be retrieved in real-time or near-real-time (e.g., up-to-date information input, forwarded, and/or retrieved from a vehicle and stored to the third-party data system), or the vehicle information may be delayed via an on-demand, periodic, or third-party initiated synchronization. For example and without limitation, in some embodiments during and/or after onboarding of a particular vehicle data object associated with a vehicle and/or association of the vehicle data object with a particular user data object, the vehicle service onboarding system 102 and/or the vehicle service application system 110 may query any number of third-party data systems to capture, verify, and/or process information about the vehicle represented by the vehicle data object.

In some embodiments, one or more portions of subject information associated with a particular subject data object (e.g., in one example context vehicle information associated with a vehicle data object) is aggregated from one or more external service system(s). For example, in some embodiments a vehicle service onboarding system 102 and/or the vehicle service application system 110 determines at least one subject identifier corresponding to and/or otherwise associated with a subject data object. The subject identifier may uniquely identify the subject data object (e.g., a vehicle identification number corresponding to a particular vehicle data object) such that all systems may utilize the subject identifier to determine particular information uniquely associated with the subject data object.

Additionally or alternatively, in some embodiments, the vehicle service onboarding system 102 and/or the vehicle service application system 110 query at least one (or a plurality of) external service system(s) based at least in part on the at least one subject identifier. The query may cause each external service system to identify and/or otherwise retrieve information stored by the external service system that is associated with the particular subject identifier. It will be appreciated, as described herein, that different external service systems may maintain different information for the same subject identifier. In the context of a vehicle, for example, different external service systems associated with various repair shops may have different information based on the services performed at the corresponding repair shop, and such information may further differ from OEM data that is maintained by a manufacturer system associated with the vehicle maker.

Additionally or alternatively still, in some embodiments, the vehicle service onboarding system 102 and/or the vehicle service application system 110 receives, in response to querying the plurality of external service systems, a portion of subject information associated with the subject data object from at least one of (and/or from each of) the external service system(s). In some embodiments, the portion(s) of subject information is/are received in real-time or near-real-time upon transmission of the original query to the external service system. The vehicle service onboarding system 102 and/or vehicle service application system 110 may perform any of a myriad of actions based on the received information. In some embodiments, for example, the vehicle service onboarding system 102 and/or the vehicle service application system 110 generates updated vehicle information by at least synthesizing each portion of subject information associated with the subject data object. In some embodiments, the synthesizing of each portion of subject information includes aggregation of distinct data portions to formulate a more complete record of information (e.g., mileage information from a first external service system and repair data from a second external service system). Additionally or alternatively, in some embodiments, the synthesizing of each portion of subject information includes resolution of conflicting data between two or more portions of subject information. It will be appreciated that any of the data conflict resolution process(es) described herein may be utilized, for example those described with respect to resolving data conflicts between user-submitted information. For example, conflicting data may be resolved based on a prioritized external service system (e.g., whose reported data is stored over conflicting data from other system(s)), the data portion that is most up-to-date may be identified and accepted over other conflicting data portion(s), and/or the like. In some embodiments, upon generating the updated vehicle information, the vehicle service onboarding system 102 and/or the vehicle service application system 110 stores the updated vehicle information associated with the subject data object. In this regard, one or more user(s) that are associated with or otherwise have access to the subject data object may subsequently view the updated vehicle information in one or more user interfaces, as described herein. Alternatively or additionally, in some embodiments, the updated subject information may be utilized to provide one or more service(s), offer(s), and/or the like to a particular user associated with a user data object based on the functionality provided by the vehicle service application system, for example.

Such information may include vehicle condition data, services performed information (e.g., what maintenance, repair, or other services were performed on a vehicle, when such services were performed on a vehicle, and/or by whom such services were performed), vehicle interaction information (e.g., what entities have interacted with the vehicle, and/or when), and/or the like. It will be appreciated that any number of third-party data systems may be queried for such information, and the information may be queried at any of the intervals and speeds discussed herein. For example and without limitation, the vehicle service onboarding system 102 and/or the vehicle service application system 110 may query one or more vehicle provider system(s) (e.g., dealer computing systems), vehicle repair system(s) (e.g., repair shop computing systems), vehicle information aggregator system(s) (e.g., CARFAX® system, vehicle ownership information system(s), vehicle incident information system(s), and/or the like), and/or the like, or any combination thereof. Likewise, in some embodiments, the vehicle service onboarding system 102 and/or the vehicle service application system 110 may push data collected by it or by third parties out to other third parties for facilitating further streamlining of service offerings and information for the customer. In some embodiments, this data may include real-time, semi-real-time, or delayed vehicle telematic data from an API associated with the vehicle and/or vehicle OEM manufacturer. In some embodiments, the various other data capture and processing methods (e.g., photo imaging, email receipt, etc.) discussed herein may provide one or more data objects for use with the third party systems discussed herein. The vehicle service onboarding system 102 and/or the vehicle service application system 110 may communicate with any number of third-party data system(s) using one or more API(s), web-scraping of retrieved web page(s), other web-based request(s) with an external server and/or database, and/or the like. In this regard, the vehicle service onboarding system 102 and/or vehicle service application system 110 may retrieve, maintain, and/or otherwise aggregate a myriad of data from different data sources, with each portion of data aggregated utilizing any of a myriad of methodologies.

Additionally or alternatively, in some embodiments, a third-party system includes a vehicle OEM system (e.g., associated with the provider of a vehicle, an entity corresponding to the make of a vehicle, and/or the like). One or more vehicle OEM system(s) may be accessed (e.g., via one or more API(s), web-scraping of retrieved web page(s), other web-based request(s) with an external server and/or database, and/or the like) to retrieve any number of disparate data properties for use in any of the processes described herein. For example, in some embodiments a vehicle service onboarding system 102 and/or the vehicle service application system 110 communicates with one or more vehicle OEM system(s) to capture one or more diagnostic code(s), mileage data, trip data, battery data, fuel usage data, OBD code data, error or other fault data, and/or the like associated with operation of the vehicle system(s) for a particular vehicle represented by a vehicle data object. As described herein, the data may be received in real time, near real time, or delayed instances (e.g., on demand, periodically, etc.) to facilitate any of the various vehicle service, maintenance, repair, information display, and other functions described herein. In situations where a diagnostic code is known, either received from a third party system or acquired directly via vehicle system integration (e.g., via an OEM system), the vehicle service application system 110 may be configured to translate the code (e.g., an OBD code) into human-readable language. The vehicle service application system 110 may then retrieve market information from one or more third party systems to generate estimated repair and service costs related to the translated code. In situations involving integration with third parties (e.g., dealers and/or repair shops), the receipt of a diagnostic code and/or a user's review of the diagnostic code information may trigger a third party provider system (e.g., a dealer or repair shop system) to transmit an offer associated with the code. The diagnostic code translation may be configured for the particular vehicle (e.g., the vehicle data object may include a make and model), which may use one or more specific translation processes for the particular make and model (e.g., different vehicles may have different code systems). Additional embodiments related to using such vehicle data are described in U.S. Patent Publication No. 2020/0234515A1, filed Jan. 23, 2020, and entitled "Methods, Apparatuses, And Systems For Monitoring And Maintaining Vehicle Condition", which application is hereby incorporated by reference herein in its entirety.

In some embodiments, the vehicle service application system 110 stores and/or process(es) OEM data and/or other data associated with vehicle operation to generate user interface(s), transmission(s), offer(s), and/or the like for servicing by a vehicle associated with a vehicle data object via a particular vehicle provider, external servicing entity, and/or the like. These servicing related interface(s), transmission(s), offer(s) may include alerts for the user generated by the vehicle service application system 110 to warn of faults and/or maintenance triggers and may include offers or other communications provided by third parties in response to receipt and analysis of the data. For example, in one example context the OEM data embodies driving behavior data, vehicle diagnostic(s), and/or the like determined from OEM communication with a vehicle and/or servicing entity interaction with a vehicle provided to an OEM system. Such data may be processed to provide user interface(s), offer(s), and/or the like for vehicle component(s) (e.g., tires, battery, brakes, and/or the like) and/or repair services (e.g., tune ups, tire rotation, and/or the like) associated via particular entities. In some embodiments, the entity for which a user interface is generated is based at least in part on a preferred status based on data associated with the entity, a payment from the entity for referring user(s), and/or the like. Additional embodiments related to using such vehicle data and associated offers and services are described in U.S. Patent Publication No. 2020/0234515A1, filed Jan. 23, 2020, and entitled "Methods, Apparatuses, And Systems For Monitoring And Maintaining Vehicle Condition", which application is hereby incorporated by reference herein in its entirety.

In some embodiments, a vehicle service onboarding system 102 and/or vehicle service application system 110 may communicate with one or more third-party data system(s) to import and/or export data associated with a subject data object such as a vehicle data object. In this regard, by enabling importing of otherwise disparate and unconnected data sets related to a vehicle and/or user from one or more third-party data systems, embodiments of the present disclosure provide technical improvements to the field of data management by reducing exposure to data inconsistencies and/or inaccuracies resulting from limited user sophistication (e.g., user misunderstanding of one vehicle service for a different vehicle service) and/or faulty reliance on human memory (e.g., improper entries of vehicle information associated with a vehicle data object due to misremembering). Similarly, a vehicle service onboarding system 102 and/or vehicle service application system 110 may communicate with one or more third-party systems to export data (e.g., vehicle information) to the third-party systems in a manner that synthesizes the third-party systems with the vehicle service onboarding system 102 and/or vehicle service application system 110. The data integration described herein may be used, for example, in a fleet management capacity, in which one user or a group of users are responsible for and linked to a plurality of subject data objects such as vehicle data objects. The present systems may facilitate maintenance, diagnostics, and repair on a fleetwide scale in a form that may be imported and exported between systems for rapid synchronization and maintenance of consistent records when vehicles are serviced or otherwise have their vehicle data objects updated in response to a new event.

Figure 35:
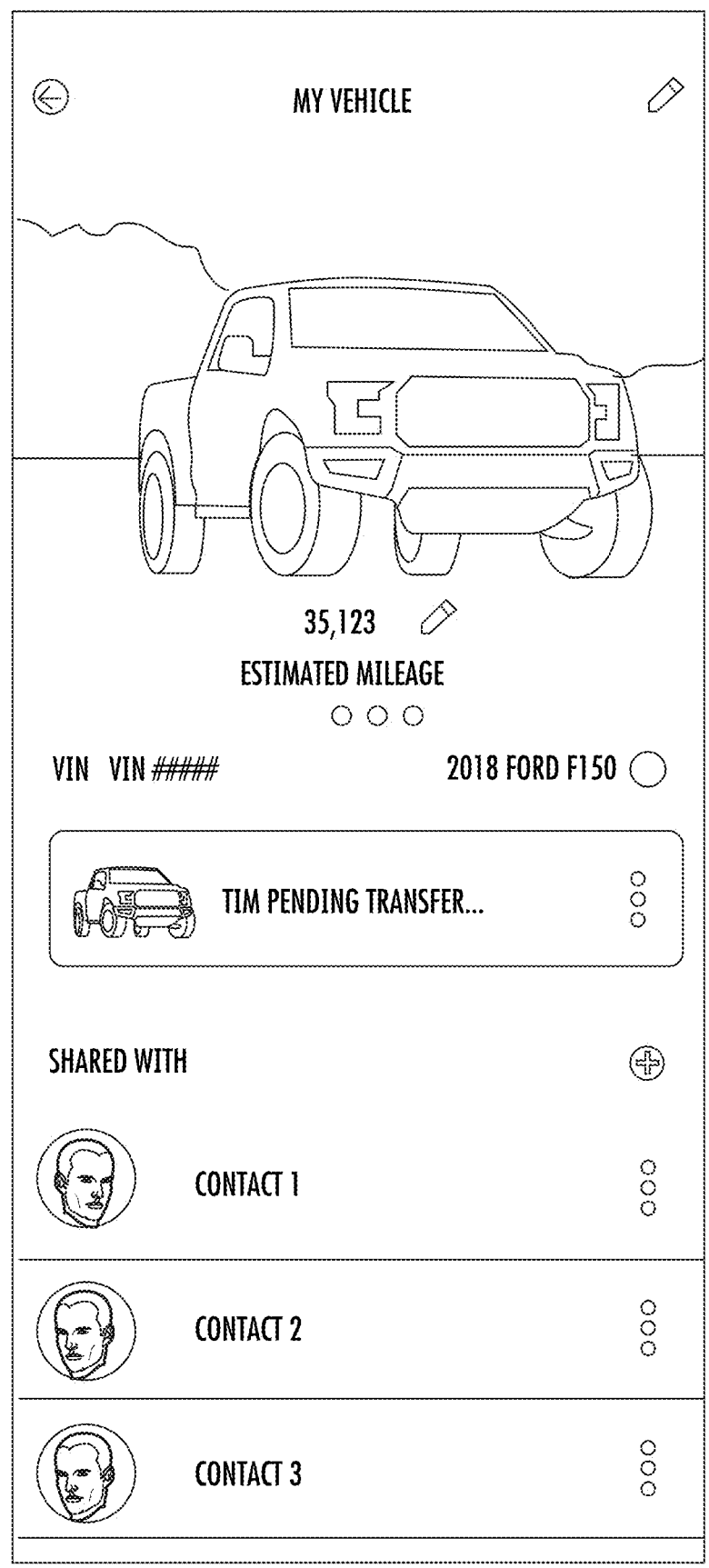

In some embodiments, the vehicle service application system 110 is configured to enable sharing associations with subject data object(s) (e.g., vehicle association(s)) and/or transfer of such associations with subject data object(s) with one or more user data object(s), such as shown and described in the context of FIG. 35. For example, in some embodiments one or more onboarding process(es) as described herein are performed to associate one or more particular vehicle data object (or other subject data object) with one or more user data object. The user data object associated with the vehicle data object may subsequently be accessed (e.g., by initiating an authenticated session associated with the user data object) to share or transfer access to the vehicle data object by associating the vehicle data object with at least one other user data object to enable the at least one other user data object to access data stored associated with the vehicle data object, store data associated with the vehicle data object, and/or access other functionality associated with the vehicle data object. In this manner, and in some embodiments, the vehicle data object may be a separate data entity capable of being separated, associated, transferred, and/or shared between user data objects. In some embodiments, a user data object may be associated with an existing vehicle data object similarly associated with one or more other user data object(s) utilizing the onboarding process(es) described herein. In one example context, users that share a vehicle may each associate their user data object with the vehicle data object representing said vehicle, such that each may access information about the vehicle and/or submit vehicle information regarding said vehicle, which may allow users associated with the vehicle to view and (if appropriate permissions are granted) change data associated with the vehicle data object for all users to access. It will be appreciated that vehicle data object(s) may similarly be disassociated with one or more user data object(s), for example such that vehicle information and/or data for such disassociated vehicle becomes inaccessible via the user data object. The vehicle data object may remain associated with other user data object(s). In this regard, it will be appreciated that a vehicle data object may be shared via the vehicle service application system 110 for any of a plurality of reasons, for example automatically and/or in response to user input at the time a vehicle is indicated as transferred due to sale, shared with another user embodying another driver, and/or the like. In one example context, the vehicle service onboarding message depicted and described with respect to FIG. 12 is transmitted upon transfer of a vehicle data object associated with a particular vehicle data object before transfer to a new user data object. It will be appreciated that associations with other types of subject data object(s) may similarly be shared.

In a circumstance where a subject data object, such as a vehicle data object, is associated with a plurality of user data objects, the vehicle service application system 110 may identify and merge data associated with the subject data object such as the vehicle data object from multiple sources as such data is received as input from and/or otherwise associated with any source. In the context of a vehicle data object for example, data may be received from sources associated with any one of the user data objects associated with the vehicle data object. In this regard, a first user associated with a first user data object may be associated with a vehicle data object, a second user associated with a second user data object may be associated with the same vehicle data object, a third user associated with a first user data object may be associated with the same vehicle data object, and so on, with each capable of submitting vehicle information for storing associated with the particular vehicle data object shared with the multiple user data objects. In some embodiments, the vehicle service application system 110 resolves conflicts in data values received from and/or associated with different user data object(s). For example, where the a first user associated with a first user data object submits a first data set associated with a particular vehicle and/or a second user associated with a second user data object submits a second data set associated with the particular vehicle, where the first data set is inconsistent with the second data set, the vehicle service application system 110 performs one or more process(es) for data conflict resolution. In one example context, a first user associated with a first user data object inputs first vehicle information embodying services performed on a particular vehicle associated with the first user data object, and a second user associated with same particular vehicle inputs no such vehicle information and/or conflicting information indicating other services performed on the particular vehicle. The vehicle service application system 110 may perform data conflict resolution process(es) including prioritizing data received from a particular user data object, prohibiting one or more users from submitting any or some data associated with the vehicle data object, prioritizing the most recently received and/or generated data, requesting user confirmation (e.g., via a designated primary user or owner) of which portion(s) of conflicting data should be stored, and/or the like.

It will be appreciated that the vehicle service application system 110 may communicate with any number of system(s) (e.g., both internal and/or external systems) to retrieve the described data associated with user(s), vehicle(s), and/or the like. Some or all of such data may be retrieved in real-time. For example, the vehicle service application system 110 may leverage one or more external APIs, direct system connection(s), and/or the like to retrieve vehicle information, OEM data, service record(s), contract data, and/or the like for particular a particular vehicle from one or more disparate external systems. Other data may be received and/or retrieved at determinable time intervals (e.g., batch transmitted at particular timestamp intervals). Received and/or retrieved data may be stored in one or more data repositories for further processing, display to a user, and/or the like, and may be retrieved and presented as part of a "glovebox" on the vehicle service application. The vehicle service application system 110 may leverage the subject data object such as a vehicle data object and/or user data object, as updated and maintained according to the processes and systems described herein, to identify the status of a vehicle with respect to any warranties, protection plans, and other protection products associated with the subject (e.g., a vehicle) and corresponding subject data object (e.g. a corresponding vehicle data object). The vehicle service application system 110 (e.g., via display through the vehicle service application) may graphically present the information to a user ensure to ensure that responsibility for various repairs, maintenance, etc. is properly assigned to the various protections held by the user. In some embodiments, recommendations for various repairs, maintenance, etc. may be made at least partly on the basis of the various protections held by the user.

The depicted vehicle provider system 104 includes a vehicle provider application server 104A, a vehicle provider data repository 104B, a medium printer 104C, and a vehicle provider mobile device 104D. As depicted, the vehicle provider application server 104A is communicable with the vehicle provider data repository 104B, the medium printer 104C, and the vehicle provider mobile device 104D. In some embodiments, the vehicle provider application server 104A is directly coupled to one or more of the vehicle provider data repository 104B, the medium printer 104C, and/or the vehicle provider mobile device 104D, for example by wiring within the vehicle provider system 104. Alternatively or additionally, in some embodiments, the vehicle provider application server 104A is wirelessly coupled to one or more of the vehicle provider data repository 104B, the medium printer 104C, and/or the vehicle provider mobile device 104D, for example over one or more wireless communication network(s). In yet other embodiments, the vehicle provider data repository 104B is embodied as a sub-system of the vehicle provider application server 104A. Alternatively or additionally, in some embodiments, the vehicle provider data repository 104B is embodied as a virtual repository executing on the vehicle provider application server 104A.

The vehicle provider application server 104A executes one or more software applications that are associated with and/or facilitate transactions of vehicles by the vehicle provider. For example, in some embodiments, a vehicle provider application server 104A is configured to execute one or more software applications that process data associated with the transfer of one or more vehicle(s) to customer(s). The vehicle provider application server 104A may process customer information (e.g., to verify aspects of a user's identity), payment information (e.g., to process a payment for a vehicle), vehicle information (e.g., to indicate what vehicles represented by the vehicle provider system 104 is being transferred), and/or other information associated with vehicle acquisition. A user interfacing with the vehicle provider system 104, for example a salesperson and/or owner of the vehicle provider utilizing a computing terminal of the vehicle provider system 104 or a configured user device to access such functionality, may input details associated with a vehicle transfer and/or other transaction. In some contexts, some of the vehicle transaction information that could be provided to the vehicle provider system 104 is left empty and/or otherwise not filled in by the user. For example, in some embodiments, only vehicle information and a limited portion of customer information (e.g., a phone number, an email address, or other contact information associated with the customer purchasing or otherwise obtaining the vehicle).

The vehicle provider data repository 104B embodies one or more computing devices configured to store any of the various data processed by the vehicle provider application server 104A. The vehicle provider data repository 104B may store various data in any of a myriad of manners, formats, tables, computing devices, and/or the like. For example, in some embodiments, the vehicle provider data repository 104B includes one or more sub-repositories that are configured to store specific data processed by the vehicle provider application server 104A.

In some embodiments, the vehicle provider application server 104A is configured to store specific data being processed in the vehicle provider data repository 104B. For example, in some embodiments, as transactions are input to the vehicle provider application server 104A, various customer information and/or vehicle information is stored to the vehicle provider data repository 104B and/or data records of the vehicle provider data repository 104B are updated based on customer information and/or vehicle information processed via the vehicle provider application server 104A. Alternatively or additionally, in some embodiments, the vehicle provider application server 104A retrieves data from the vehicle provider data repository 104B for processing associated with a particular transaction. For example, in some embodiments, the vehicle provider application server 104A updates vehicle information corresponding to a particular vehicle to indicate that the vehicle has been transferred as part of a transaction.

The vehicle provider system 104 is configured to generate and/or transmit vehicle acquisition data to the vehicle service onboarding system 102. In some embodiments, the vehicle provider system 104 automatically transmits the vehicle acquisition data to the vehicle service onboarding system 102 (e.g., upon completion of one or more processes associated with the transfer, and/or at predefined time intervals), and in other embodiments the vehicle acquisition data is transmitted to the vehicle service onboarding system 102 in response to request by the vehicle service onboarding system 102 (e.g., automatically at determinable timestamp intervals, upon user request via a user of the vehicle service onboarding system 102, and/or the like). In some such embodiments, for example, the vehicle acquisition data represents at least a portion of vehicle information and/or customer information corresponding to a particular vehicle transaction. The vehicle acquisition data may include at least a vehicle identifier associated with the vehicle that was part of the transfer, and the vehicle acquisition data may include user communication channel data associated with a communication channel utilizable to communicate with the customer. Such vehicle acquisition data may be input by the user of the vehicle provider system 104.

In some embodiments, the vehicle provider system 104 is additionally configured to provide one or more custom onboarding message(s) via a physical medium. For example, in some embodiments, the vehicle provider system 104 provides a custom onboarding message via a physical medium in response to receiving a custom onboarding message from the vehicle service onboarding system 102. In some embodiments, the vehicle provider application server 104A, the vehicle provider application server 104A transmits the custom onboarding message, or a portion thereof, to one or more other computing devices to cause provision of the custom onboarding message, or a portion thereof, via a physical medium via that other computing device. In some embodiments, the physical medium may include a display or other electronic representation shown on a physical device.

In some embodiments, the vehicle provider system 104 communicates with one or more application systems, such as the vehicle service application system 110 to retrieve, process, and/or otherwise store data associated with user data object(s) and/or subject data object(s) such as vehicle data object(s) maintained by such system. For example, in some embodiments, the vehicle provider system 104 retrieves data associated with one or more user data object(s) (e.g., user analytics data, vehicle interaction data, and/or the like) to provide user interface(s) offering vehicle(s) available by a vehicle provider and/or user interface(s) for offering to acquire vehicle(s) currently associated with the user data object(s). It will be appreciated that the vehicle provider system 104 may provide a user-facing application (e.g., a user-facing vehicle provider application) that enables one or more user(s) to interact with such functionality and/or other functionality described herein. In some embodiments, the vehicle provider system 104, the vehicle service application system 110, and/or another system may host a portal accessible via a web browser, dedicated program/app, or any other means on a provider device (e.g., a provider computer) that enables the provider to access any user or subject data objects such as vehicle data objects for which the provider is granted access. The portal may further allow the provider to generate one or more offers for presentation to the user, and may show a listing of offers available for each vehicle depending upon the data collected and analyzed according to the processes described herein.

As illustrated, for example, the vehicle provider application server 104A transmits one or more specially configured transmissions to the medium printer 104C. The medium printer 104C embodies a printer configured to print any of a variety of information on a physical medium, for example on paper and/or another printable medium. The vehicle provider application server 104A may transmit the custom onboarding message, a portion thereof, or an associated specially configured transmission associated therewith to cause the medium printer 104C to print the custom onboarding message or a portion thereof on a physical medium. For example, the medium printer 104C may print a paper including a machine-readable symbology, link, and/or other information embodied in the custom onboarding message. In this regard, the paper may be made accessible to the user device 106 (e.g., by presenting the paper to the user of the user device 106) for accessing the custom onboarding message by scanning the information, image(s), and/or the like printed to the paper. Alternatively or additionally, in some embodiments, the user may input certain data printed on the paper (e.g., a vehicle identifier or other unique code utilized to facilitate onboarding).

Alternatively or additionally, for example as illustrated, the vehicle provider application server 104A transmits one or more specially configured transmissions to the vehicle provider mobile device 104D. In some embodiments, the vehicle provider may alternatively or additionally use a fixed electronic device. In some such embodiments, the vehicle provider mobile device 104D embodies one or more user devices including a display to which information is renderable. Non-limiting examples of the vehicle provider mobile device 104D include a specially configured tablet device (e.g., configured to execute a particular software application or software application(s) that provide such functionality), a specially configured smartphone, and/or a specially configured mobile computer such as a laptop. In this regard, the vehicle provider application server 104A may cause provision of the physical medium by causing rendering of one or more specially configured user interfaces including a rendering of the custom onboarding message or a portion thereof. For example, in some embodiments, the vehicle provider mobile device 104D renders a machine-readable symbology, link, and/or other information embodied in the custom onboarding message for interaction by the user device 106. In this regard, the rendered interface may be made accessible to the user device 106 (e.g., by presenting the vehicle provider mobile device 104D to the user of the user device 106, and/or otherwise having the vehicle provider mobile device 104D visible to the user device 106). Additionally or alternatively, in some embodiments, the user may input certain data rendered to the vehicle provider mobile device 104D via the user device 106.

The user device 106 is embodied by one or more user computing devices, for example and without limitation a user smartphone, a user laptop, a user tablet, a user wearable, and/or the like. The user device 106 is configured utilizing one or more software applications installed and/or executed on the user device 106. In some embodiments, the user device 106 is configured to automatically include any of a myriad of functionality based on default software applications installed to the user device 106. For example, the user device 106 is configured utilizing an operating system to include one or more basic functionalities, such as control of one or more display(s) of the user device 106, speaker functionality, microphone functionality, data storage functionality, software application management functionality, networking functionality, and/or the like. It should be appreciated that software applications executed on the user device 106 may be built on top of such functionality and utilize it to perform various functionality as described herein.

In some embodiments, the user device 106 is configured to perform any of various functionality for interacting with custom onboarding message(s). In some embodiments, the user device 106 includes one or more installed communication application(s) that are configured to receive custom onboarding message(s). Non-limiting examples of such installed communication application(s) include a text messaging application, a data messaging application, an email application, a custom software application configured to provide push notifications to the user device 106, and/or the like. One or more of the communication application(s) enables receiving and/or transmitting various messages. For example, in some embodiments, an installed communication application enables access, via the user device, to receive a custom onboarding message in any of a myriad of formats based on the communication application.

Additionally or alternatively, in some embodiments, the user device 106 is configured to provide functionality for interacting with one or more custom onboarding messages presented via a physical medium. Non-limiting examples of such functionality includes camera functionality for capturing one or more image(s) of the physical medium, image processing functionality for processing such captured image (s), machine-readable symbology detection functionality (e.g., to detect machine-readable symbology within captured image(s)), and/or machine-readable symbology decoding functionality (e.g., to decode machine-readable symbology detected within the captured image(s)). Additionally or alternatively, in some embodiments, the user device 106 is configured to utilize a browser application that enables access to web-based applications, for example a web-based user-facing service application associated with functionality provided by the vehicle service onboarding system 102. Additionally or alternatively, in some embodiments, the user device 106 is configured to utilize a native user-facing vehicle service software application associated with accessing functionality of the vehicle service onboarding system 102. It should be appreciated that, in some embodiments, the user device 106 includes access to one or more application distribution platforms that facilitate installation and/or distribution of such software applications to the user device 106.

Example Apparatuses of the Disclosure

Having discussed example systems in accordance with the present disclosure, example apparatuses in accordance with the present disclosure will now be described. In some embodiments, the vehicle service onboarding system 102 as described herein with respect to FIG. 1 is embodied by one or more computing systems. For example, in at least one embodiment, the service application onboarding system is embodied by the vehicle service onboarding apparatus 200 as depicted and described in FIG. 2. The vehicle service onboarding apparatus 200 includes a processor 202, a memory 204, an input/output circuitry 206, a communications circuitry 208, and onboarding circuitry 210. The vehicle service onboarding apparatus 200 is configured, using one or more of the sets of circuitry 202, 204, 206, 208, and/or 210, to execute any one or more of the operations described herein.

Although components are described with respect to functional limitations, it should be understood that the particular implementations necessarily include the user of particular computing hardware. It should also be understood that certain of the components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the vehicle service onboarding apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the vehicle service onboarding apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the vehicle service onboarding apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the vehicle service onboarding apparatus 200, and/or one or more remote or "cloud" processor(s) external to the vehicle service onboarding apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied by the specific operations described herein when the instructions are executed.

As one particular example, the processor 202 may be configured to perform various operations embodying reduced-reliance onboarding functionality. In this regard, the processor 202 in some embodiments is configured to perform and/or otherwise support the various functionality performed by the vehicle service onboarding system 102, as described herein. In some embodiments, the processor 202 includes hardware, software, firmware, and/or a combination thereof, that maintains vehicle data associated with (e.g., via one or more data links) a particular user data object. In some such embodiments, the processor 202 includes hardware, software, firmware, and/or a combination thereof, that creates and/or otherwise generates a subject data object such as a vehicle data object representing a particular vehicle, and/or a user data object representing a particular customer. Additionally or alternatively, in some embodiments, the processor 202 includes hardware, software, firmware, and/or a combination thereof, that updates data values embodied by and/or associated with a vehicle data object and/or a user data object to indicate whether such data object(s) are awaiting onboarding and/or have already been onboarded.

In some embodiments, the processor 202 includes hardware, software, firmware, and/or a combination thereof, that receives vehicle acquisition data. Additionally or alternatively, in some embodiments, the processor 202 includes hardware, software, firmware, and/or a combination thereof, that generates a subject data object such as a vehicle data object based on the vehicle acquisition data. Additionally or alternatively, in some embodiments, the processor 202 includes hardware, software, firmware, and/or a combination thereof, that attempts initiation of a custom onboarding message to be accessed by a user device associated with a customer identifiable from the vehicle acquisition data. Additionally or alternatively, in some embodiments, the processor 202 includes hardware, software, firmware, and/or a combination thereof, that receives an indication that the customer accessed the custom onboarding message, and in response updates at least some data to indicate completion of onboarding of the user data object and/or vehicle data object. In some embodiments, the processor 202 performs one or more of such actions in combination with another set of circuitry of the vehicle service onboarding apparatus 200.

The input/output circuitry 206 provides output to the user and, in some embodiments, receives one or more indication(s) of user input. In some embodiments, the input/output circuitry 206 is in communication with processor 202 to provide such functionality. The input/output circuitry 206 includes one or more user interface(s) and/or includes a display that may comprise the user interface(s) rendered as a web user interface, an application interface, and/or the like, to the display of a user device, a backend system, or the like. In some embodiments, the input/output circuitry 206 may also include a keyboard, a mouse, a joystick, a touch screen, touch areas, soft keys, a microphone, a speaker, or other input/output mechanisms. The processor 202 and/or input/output circuitry 206 comprising or otherwise interacting with the processor 202 may be configured to control one or more functions of one or more user interface elements through computer program instructions (e.g., software and/or firmware) stored on a memory accessible to the processor 202 (e.g., stored on memory 204, and/or the like).

The communications circuitry 208 includes any device, circuitry, and/or other means embodied in hardware, software, firmware, and/or a combination of hardware, software, and software, that is configured to receive and/or transmit data from/to a network and/or any other device, circuitry, or module of or in communication with vehicle service onboarding apparatus 200. In this regard, the communications circuitry 208 may include, for example, a network interface for enabling communications with a wired or wireless communication network. For example, the communications circuitry 208 in some embodiments includes one or more network interface card(s), antenna(s), bus(es), switch(es), router(s), modem(s), and supporting hardware and/or software, or any other device suitable for enabling communications via one or more communication network(s). Additionally or alternatively, in some embodiments the communications circuitry 208 includes circuitry for interacting with the antenna(s) and/or other hardware or software to cause transmission of signals via the antenna(s) or to handle receipt of signals received via the antenna(s).

The onboarding circuitry 210 includes hardware, software, firmware, and/or a combination thereof, configured to support various aspects of reduced-reliance vehicle service application onboarding functionality as described herein. In some embodiments, the onboarding circuitry 210 utilizes processing circuitry, such as the processor 202 and/or the like, to perform one or more of such actions. Additionally or alternatively, in some embodiments, the onboarding circuitry 210 utilizes input/output circuitry 206 to facilitate user output (e.g., causing rendering of one or more user interface(s)), and/or to receive user input (e.g., user clicks, user taps, keyboard interactions, user gesture, and/or the like). Additionally or alternatively still, in some embodiments, the onboarding circuitry 210 utilizes communications circuitry 208 to initiate transmissions to another computing device, receive transmissions from another computing device, communicate signals between the various sets of circuitry as depicted, and/or the like.

For example, in some embodiments, the onboarding circuitry 210 includes hardware, software, firmware, and/or a combination thereof, that receives vehicle acquisition data including at least some vehicle information associated with a vehicle and at least some customer information associated with a customer. In some embodiments, the vehicle acquisition data includes user communication channel data usable for transmitting information to a user device associated with the customer. In some such embodiments, the onboarding circuitry 210 includes hardware, software, firmware, and/or a combination thereof, that generates a subject data object such as a vehicle data object comprising at least a portion of the vehicle information, where the vehicle data object is associated with an indication of pending onboarding.

In some such embodiments, the onboarding circuitry 210 includes hardware, software, firmware, and/or a combination thereof, that attempts initiation of a custom onboarding message to be accessed by the user device associated with the customer. For example, in some embodiments, the onboarding circuitry 210 includes hardware, software, firmware, and/or a combination thereof, to initiate transmission of the custom onboarding message to the user device associated with the customer, for example via a communication channel associated with the user communication channel data, and/or to a vehicle provider system for providing to the user. In some such embodiments, the onboarding circuitry 210 includes hardware, software, firmware, and/or a combination thereof, that receives an indication that the customer accessed the custom onboarding message via the user device.

In some such embodiments, the onboarding circuitry 210 includes hardware, software, firmware, and/or a combination thereof, that updates data based on the received indication that the customer accessed the custom onboarding message via the user device. For example, in some embodiments, the onboarding circuitry 210 includes hardware, software, firmware, and/or a combination thereof, that updates data associated with the subject data object such as a vehicle data object and/or the user data object associated with the customer to indicate completion of onboarding. Additionally or alternatively, in some embodiments, the onboarding circuitry 210 includes hardware, software, firmware, and/or a combination thereof, that updates one or more data values associated with the subject data object such as the vehicle data object and/or the user data object based on data values included in and/or received associated with the indication that the customer accessed the custom onboarding message.

In some embodiments, the onboarding circuitry 210 includes hardware, software, firmware, and/or a combination thereof, that generates a specially configured custom onboarding message. For example, in some embodiments, the onboarding circuitry 210 generates the custom onboarding message specially configured based on the user data object and/or the subject data object such as the vehicle data object associated with the vehicle acquisition data. For example, in some embodiments, the onboarding circuitry 210 includes hardware, software, firmware, and/or a combination thereof, that generates a customized onboarding link associated with the subject data object such as the vehicle data object and/or the user data object for transmitting to a user device and/or vehicle provider system. Alternatively or additionally, in some embodiments, the onboarding circuitry 210 includes hardware, software, firmware, and/or a combination thereof, that generates data representing a machine-readable symbology for including in a custom onboarding message, for example where the machine-readable symbology provides information associated with onboarding a particular user data object together with a particular subject data object such as a vehicle data object (e.g., by indicating that such data objects are linked). It should be appreciated that, in some embodiments, the onboarding circuitry 210 may include a separate processor, specially configured field programmable gate array (FPGA), or a specially programmed application specific integrated circuit (ASIC), to perform such functionality.

It should be appreciated that, in some embodiments, one or more of the sets of circuitry 202-210 are combinable. Alternatively or additionally, in some embodiments, one or more of the sets of circuitry performs some or all of the functionality described associated with another set of circuitry. For example, in some embodiments, the onboarding circuitry 210 is combined with the processor 202, such that the processor 202 performs one or more of the operations described above with respect to the onboarding circuitry 210.

In some embodiments, the user device 106 as depicted and described herein with respect to FIG. 1 is embodied by one or more computing systems. In an example embodiment, the user device 106 is embodied by the reduced-reliance user apparatus 300 as depicted and described in FIG. 3. The reduced-reliance user apparatus 300 includes processor 302, memory 304, input/output circuitry 306, communications circuitry 308, and user reduced-reliance onboarding circuitry 310. In some embodiments, the reduced-reliance user apparatus 300 communicate with the a vehicle provider system and/or a vehicle service onboarding system (for example, embodied by the vehicle service onboarding apparatus 200 as depicted and described with respect to FIG. 2). It should be appreciated that, in some embodiments, a vehicle service onboarding system communicates with any number of reduced-reliance user apparatuses, for example one or more for each user (e.g., a customer) accessing functionality provided by the vehicle service onboarding system 102.

It should be appreciated that the elements 302-308 may be embodied similar to that of the similarly named elements described with respect to FIG. 2. For purposes of brevity and length of disclosure, duplicate description of such functionality is omitted. The reduced-reliance user apparatus 300 in some embodiments is configured, using one or more that sets of circuitry 302, 304, 306, 308, 310, 312, and/or 314, to execute the operations described herein.

The user reduced-reliance onboarding circuitry 310 includes hardware, software, firmware, and/or a combination thereof, configured to support various aspects of reduced-reliance vehicle service application onboarding functionality performed by the user device 106 as depicted and described with respect to FIG. 1. In some embodiments, the reduced-reliance user apparatus 300 utilizes processing circuitry, such as the processor 302 and/or the like, to perform one or more of such actions. For example, in some embodiments, the user reduced-reliance onboarding circuitry 310 includes hardware, software, firmware, and/or a combination thereof, that accesses a custom onboarding message. In this regard, in some embodiments, the reduced-reliance user apparatus 300 includes hardware, software, firmware, and/or a combination thereof, to receive the custom onboarding message via a communication application executed via the reduced-reliance user apparatus 300. Alternatively or additionally, in some embodiments, the reduced-reliance user apparatus 300 includes hardware, software, firmware, and/or a combination thereof, to detect, decode, and/or otherwise access a custom onboarding message, for example a machine-readable symbology and/or customized onboarding link included in the custom onboarding message.

Additionally or alternatively, in some embodiments, the user reduced-reliance onboarding circuitry 310 includes hardware, software, firmware, and/or a combination thereof, to cause rendering of one or more user onboarding interface (s). The one or more user onboarding interface(s) include various interface elements that enable input of data associated with onboarding a user data object and/or subject data object such as a vehicle data object. In some such embodiments, the user reduced-reliance onboarding circuitry 310 includes hardware, software, firmware, and/or a combination thereof, to cause rendering of one or more user onboarding interface(s) in any of a myriad of applications executed via the reduced-reliance user apparatus 300, for example a web-based user-facing vehicle service application, a native user-facing vehicle service application, and/or the like.

Additionally or alternatively, in some embodiments, the user reduced-reliance onboarding circuitry 310 includes hardware, software, firmware, and/or a combination thereof, that determines whether a user-facing vehicle service application is installed. In some embodiments, the user reduced-reliance onboarding circuitry 310 includes hardware, software, firmware, and/or a combination thereof, that accesses various an application distribution platform in a circumstance where the user-facing vehicle service application is not installed. Additionally or alternatively, in some embodiments, the user reduced-reliance onboarding circuitry 310 includes hardware, software, firmware, and/or a combination thereof, that initiates the user-facing vehicle service application based on the custom onboarding message in a circumstance where the user-facing vehicle service application is determined installed.

It should be appreciated that, in some embodiments, the user reduced-reliance onboarding circuitry 310 may include a separate processor, specially configured field programmable gate array (FPGA), or a specially programmed application specific integrated circuit (ASIC), to perform such functionality.

The vehicle service application circuitry 312 may include hardware, software, firmware, and/or a combination thereof, configured to support various aspects of vehicle service application functionality performed by the user device 106, for example via a user-facing vehicle service application upon installation to the user device 106, as depicted and described with respect to FIG. 1. In some embodiments, the vehicle service application circuitry 312 utilizes processing circuitry, such as the processor 302 and/or the like, to perform one or more of such actions. For example, in some embodiments, the vehicle service application circuitry 312 includes hardware, software, firmware, and/or a combination thereof, that communicates with and provides access to vehicle service application functionality via a vehicle service application system. Additionally or alternatively, in some embodiments, the vehicle service application circuitry 312 includes hardware, software, firmware, and/or a combination thereof, that authenticates data to register and/or begin an authenticated session associated with a user data object corresponding to a particular user via the reduced-reliance user apparatus 300. Additionally or alternatively, in some embodiments, the vehicle service application circuitry 312 includes hardware, software, firmware, and/or a combination thereof, that transmits one or more specially configured request(s) (e.g., API requests, request for a web page, a webhook, and/or the like) to send and/or retrieve data from a vehicle service application system, and/or initiate functionality via the vehicle service application system. Additionally or alternatively, in some embodiments, the vehicle service application circuitry 312 includes hardware, software, firmware, and/or a combination thereof, that initiates one or more algorithm(s), process(es), and/or the like embodying vehicle service application functionality. It should be appreciated that, in some embodiments, the vehicle service application circuitry 312 may include a separate processor, specially configured field programmable gate array (FPGA), or a specially programmed application specific integrated circuit (ASIC), to perform such functionality.

The camera circuitry 314 may include hardware, software, firmware, and/or a combination thereof, configured to support various aspects of capture and storage of image and/or video data, and/or corresponding audio data, performed by the user device 106 as depicted and described with respect to FIG. 1. In one example context, the camera circuitry 314 provides and/or controls such functionality performed via a user-facing application, such as a user-facing vehicle service application, installed to and/or executed by the user device 106. In some embodiments, the camera circuitry 314 utilizes processing circuitry, such as the processor 302 and/or the like, to perform one or more of such actions. For example, in some embodiments, the camera circuitry 314 includes a camera comprising one or more image sensor(s), and/or in some embodiments microphone (s) for capturing audio data. Additionally or alternatively, in some embodiments, the camera circuitry 314 includes hardware, software, firmware, and/or a combination thereof, that control(s) activation of one or more camera(s) for capturing one or more image data object(s), video data object(s), and/or audio data object(s) associated therewith. Additionally or alternatively, in some embodiments, the camera circuitry 314 includes hardware, software, firmware, and/or a combination thereof, that store(s) captured data in a permanent storage and/or associated with a particular user data object and/or subject data object such as a vehicle data object. Additionally or alternatively, in some embodiments, the camera circuitry 314 includes hardware, software, firmware, and/or a combination thereof, that performs document scanning functionality for one or more captured image data object(s). It should be appreciated that, in some embodiments, the camera circuitry 314 may include a separate processor, specially configured field programmable gate array (FPGA), or a specially programmed application specific integrated circuit (ASIC), to perform such functionality.

It should be appreciated that, in some embodiments, one or more of the sets of circuitry 302-314 are combinable. Alternatively or additionally, in some embodiments, one or more of the sets of circuitry performs some or all of the functionality described associated with another set of circuitry. For example, in some embodiments, the user reduced-reliance onboarding circuitry 310, the vehicle service application circuitry 312, and/or the camera circuitry 314, is/are combinable at least in part with the processor 302, such that the processor 302 performs one or more of the operations described above with respect to the user reduced-reliance onboarding circuitry 310, the vehicle service application circuitry 312, and/or the camera circuitry 314.

Example Computing Environments of the Disclosure

FIG. 4 illustrates visualizations of example computing environments specially configured to facilitate reduced-reliance vehicle service application onboarding in accordance with at least some example embodiments of the present disclosure. Specifically, as illustrated, the example computing environment includes a vehicle service onboarding environment 402, a vehicle provider environment 404, and a user environment 406. Each of the depicted environments are maintained via any of a myriad of hardware, software, and/or firmware. In this regard, each of the depicted environments includes any number of software process(es) that interact to provide the functionality described. Each software process maintains any number of data objects utilized to provide functionality performed by each of the software processes and/or another software process. It should be appreciated that the software process(es) may be entirely distinct (e.g., executed utilizing different computing hardware and/or in different runtime environments), integrated and/or otherwise utilizing one or more shared functionality, and/or the like.

The vehicle service onboarding environment 402 embodies various software process(es) maintained by and/or otherwise associated with the vehicle service onboarding system 102. In this regard, the various process(es) depicted and described with respect to the vehicle service onboarding environment 402 provide the various functionality described with respect to the vehicle service onboarding system 102.

As depicted, the vehicle service onboarding environment 402 includes a service onboarding application 402A. The service onboarding application 402A embodies any number of software process(es) that maintain data objects associated with performing onboarding of a subject data object such as a vehicle data object and/or user data object (e.g., a user account associated with a customer) for a vehicle service application. For example, in some embodiments, the service onboarding application 402A maintains any number of user data object(s) associated with users configured to access the vehicle service application, and vehicle data object(s) representing vehicles linked to such user data object(s) and/or to be linked to such user data object(s).

In this regard, the service onboarding application 402A may receive, generate, and/or process various information associated with onboarding a subject data object such as a vehicle data object and/or user data object. For example, in some embodiments, the service onboarding application 402A receives vehicle acquisition data from a vehicle provider system and processes the vehicle acquisition data to perform one or more actions associated with such onboarding functionality. In some embodiments, the service onboarding application 402A embodies one or more software process(es) that process the vehicle acquisition data to generate a subject data object such as a vehicle data object and/or user data object associated therewith, associate and/or otherwise link a subject data object such as a vehicle data object and a user data object, and/or identify a subject data object such as a vehicle data object and/or a user data object as pending onboarding.

Additionally or alternatively, in some embodiments, the vehicle service onboarding environment 402 includes one or more software process(es) that manage generation and/or processing of information associated with a custom onboarding message. In some embodiments, the service onboarding application 402A generates information to be included in a custom onboarding message, for example a customized onboarding link associated with onboarding a subject data object such as a vehicle data object and/or a user data object, and/or a machine-readable symbology embodying the customized onboarding link and/or the subject data object such as a vehicle data object and/or user data object to be onboarded. Additionally or alternatively still, in some embodiments, the service onboarding application 402A attempts initiation of the custom onboarding message a user device and/or vehicle provider system, as described herein, for processing. In some such embodiments, the service onboarding application 402A generates and/or attempts initiation of the custom onboarding message utilizing the custom onboarding message service 402B.

In some embodiments, the service onboarding application 402A facilitates onboarding of a subject data object such as a vehicle data object and/or a user data object based on received indications of accessing a custom onboarding message by the user. For example, in some embodiments, the service onboarding application 402A receives an indication that the customer accessed the custom onboarding message via a user device. The service onboarding application 402A updates the data based on the received indication. In some embodiments, the service onboarding application 402A updates data associated with the subject data object such as a vehicle data object and/or the user data object to indicate completion of onboarding of such data object(s). Alternatively or additionally, in some embodiments, the indication embodies or includes updated data provided by the user for use in completing onboarding. In some such embodiments, the service onboarding application 402A updates customer information embodied by a user data object corresponding to the custom onboarding message and/or updates vehicle information associated with the subject data object such as a vehicle data object based on the updated information received from the user as part of or together with the indication.

As depicted, the vehicle service onboarding environment 402 optionally includes custom onboarding message service 402B. The custom onboarding message service 402B embodies any number of software process(es) that enable generation and/or transmission of custom onboarding message(s), and/or receiving and processing indication(s) associated therewith. The custom onboarding message service 402B in some embodiments are executed via separate computing device(s), separate runtime environment(s), separate sub-computing environment(s) controlled by the vehicle service onboarding environment 402, and/or the like. For example, in some embodiments, the custom onboarding message service 402B embodies a cloud-based application utilizing cloud computing devices located remote from the computing devices embodying the service onboarding application 402A.

In some embodiments, the custom onboarding message service 402B includes any number of software process(es) that transmit and/or output for a particular user one or more custom onboarding message(s) utilizing particular communication channel(s). For example, in at least one embodiment, the custom onboarding message service 402B generates and/or attempts transmission of a SMS message embodying a custom onboarding message. Alternatively or additionally, in some embodiments, the custom onboarding message service 402B generates and/or attempts transmission of an email message embodying a custom onboarding message service 402B. In some such embodiments, the custom onboarding message service 402B is configured to generate and/or attempt transmission of such a custom onboarding message utilizing a particular communications protocol corresponding to a type of custom onboarding message communication to be transmitted.

In some embodiments, the custom onboarding message comprises a customized onboarding link that enables access to a download of a particular user-facing service application, for example the user-facing vehicle service application 406A and/or onboarding of a user data object and/or subject data object (e.g., a vehicle data object). For example, in some embodiments, the user-facing vehicle service application 406A is accessible to register a user data object corresponding to the user having downloaded the user-facing vehicle service application 406A and/or associating one or more subject data object(s) (e.g., vehicle data object(s)) with a user data object. In some embodiments, the vehicle provider system 104 may access the vehicle service onboarding system 102 to upload data embodying a plurality of data identifiers for transmitting custom onboarding messages. In one example context, such data includes a CSV data file including information for any number of user(s). The data identifier(s) may be associated with one or more transmission methodologies for delivering custom onboarding message(s) to one or more user(s). For example, in some embodiments each of the plurality of data identifiers is associated with a preferred transmission methodology for delivering a custom onboarding message to each user. In other embodiments, each of the plurality of data identifiers represents or otherwise is associated with a particular transmission methodology for delivering a custom onboarding to each particular user of the plurality of users. In this regard, a particular provider may input data for bulk generation and/or transmission of custom onboarding message(s) for a plurality of users.

In some embodiments, a user device views, shares, print, and/or otherwise interact with one or more document(s) and/or other file data object(s) from a user-facing application associated with a provider (e.g., a native app or a web app). The provider system subsequently may communicate with the service application onboarding system to associate such document(s) and/or other file data object(s) with an existing and/or newly generated user data object. For example, in one example context, the service application onboarding system generates a new user data object and associates the user with the input file data object(s), and transmits a customized onboarding message to a particular data identifier associated with a particular user and/or user device. In some embodiments, the provider system may use the portal discussed herein to upload the documents to the vehicle service application system 110 for the user's review, such that the portal is able to both push and pull information to/from the vehicle service application system.

In some embodiments, upon accessing a customized onboarding link and/or accessing a user-facing application, the user-facing application is provided including particular interface element(s). For example, in some embodiments, the interface element(s) include image(s), identifier(s), data, and/or the like specifically associated with the provider from which a custom onboarding message including the customized onboarding link was received. In some such embodiments, a provider (e.g., a dealer of vehicle(s)) generates a machine-readable symbology (e.g., a QR code) for including in a custom onboarding message, the QR code embodying a customized onboarding link.

In some embodiments, upon accessing a customized onboarding link and/or access the user-facing application, the user-facing application provides a registration and/or user data object sign up interface including one or more pre-filled input interface element(s). The interface element(s) may be pre-filled based at least in part on information from a custom onboarding message and/or customized onboarding link. In some embodiments, the user establishes communication with a customer support representative (e.g., over a call via a call center). The customer service representative may initiate the custom onboarding message (e.g., including a customized onboarding link) transmitted to a user device based at least in part on one or more data identifier(s) input by the user, identified from one or more database(s) associated with another user-facing application, and/or the like. For example, a user may contact to request support associated with a second user-facing application (e.g., that provides functionality for communicating with and/or otherwise managing protection program(s) for a plurality of device(s), machine(s), and/or the like) associated with the user-facing vehicle service application 406A. In some embodiments, the custom onboarding message is sent automatically upon detecting communication is established between the user and the customer support representative. In other embodiments, the customer service representative provides one or more user input(s) that initiate one or more process(es) to transmit the custom onboarding message. For example, in some embodiments, the customer support representative accesses an administrative interface while communication is established with the user (e.g., during a customer support call or chat session), and provides one or more user input(s) to initiate transmission of the custom onboarding message during the period of established communication. In this regard, the process for initiating onboarding of a particular user to a vehicle service application via a corresponding vehicle service onboarding system may be initiated by a customer service representative (or in some embodiments, automatically) during such a service call with the customer service representative. Alternatively or additionally, the process for initiating onboarding of a particular user to a vehicle service application via a corresponding vehicle service onboarding system may be initiated by a customer service representative (or in some embodiments, automatically) during a connected session with a customer service representative system.

In some embodiments, a customer service representative accesses an administrative system or sub-system associated with the vehicle service application system to communicate with a user associated with a user-facing application (e.g., a user seeking technical and/or customer support) and/or a user associated with a provider-facing application (e.g., a provider portal user). In some embodiments, a user establishes communication with an administrative system utilizing a user-facing vehicle service application to request technical support associated with a vehicle corresponding to a vehicle data object. In this regard, the customer support representative may utilize the administrative system to provide data, message(s), and/or the like, and/or investigate data, error(s), and/or the like received from the user via an established connection.

In some embodiments, a custom onboarding message as described in various embodiments herein may also be generated automatically by the service application onboarding system for automatic transmission upon sharing of a subject data object, such as a vehicle data object, by an existing user data object. For example, in some embodiments, a user associated with an existing user data object shares an existing vehicle data object (or other subject data object) with a user via a particular data identifier (e.g., a data identifier usable to transmit a custom onboarding message). In some such embodiments, the service application onboarding system generates a machine-readable symbology embodying a customized onboarding link for inclusion in a custom onboarding message. The custom onboarding message including the customized onboarding link (e.g., in the machine-readable symbology representation, such as a QR code) is subsequently transmitted utilizing the data identifier, for example as a text message, email, traditional mailing, and/or other mechanism determined or indicated as preferred for the other user associated with the data identifier. The custom onboarding message may indicate that the user data object shared access to the particular subject data object, such as a vehicle data object.

In some embodiments, a custom onboarding message is generated in response to use of a user-facing application by a user for tracking claim status(es) associated with one or more protection program(s), for example for device(s), machine(s), and/or the like. For example, the user may access a companion user-facing application associated with the user-facing vehicle service application 406A (e.g., offered by the same entity, providing partially overlapping functionality, and/or the like). In one example context, the user utilizes the companion software application to track claim status(es) associated with one or more protection program(s), and once an updated claim status is detected and/or received, the service application onboarding system generates and/or transmits a custom onboarding message associated with the user-facing vehicle service application 406A. In some embodiments, the custom onboarding message includes a customized onboarding link generated by the service application onboarding system for transmission to a user device via a data identifier associated with a user account for the companion software application. In some embodiments, for example, a claim is initiated and/or a claim status associated with an existing claim is accessed via one or more user interface(s), such as those depicted and described with respect to FIGS. 26, 27, 28, 29, 30, 31, 32, 33, and/or 34. It will be appreciated that the claims status may be maintained via a vehicle service application and/or an associated system or subsystem.

The vehicle provider environment 404 embodies various software process(es) maintained by and/or otherwise associated with the vehicle provider system 104. In this regard, the various process(es) depicted and described with respect to the vehicle provider environment 404 provide the various functionality described with respect to the vehicle provider system 104.

As depicted, the vehicle provider environment 404 includes a vehicle provider application 404A. The vehicle provider application 404A embodies any number of software process(es) that maintain and/or process data associated with vehicle transactions and/or acquisition by one or more customer(s).

The vehicle provider onboarding message provision application 404B in some embodiments are executed via separate computing device(s), separate runtime environment(s), separate sub-computing environment(s) controlled by the vehicle provider environment 404, and/or the like. For example, in some embodiments, the vehicle provider onboarding message provision application 404B embodies at least one software process executing on a vehicle provider mobile device of the vehicle provider system 104.

In some embodiments, the vehicle provider application 404A processes data representing a transfer of a vehicle from the vehicle provider to a particular customer, for example processing customer information associated with the customer of a transaction and/or vehicle information embodying a vehicle being transferred to the customer. In some embodiments, the vehicle provider application 404A generates and/or transmits vehicle acquisition data for processing via the vehicle service onboarding environment 402. For example, the vehicle provider application 404A may transmit vehicle acquisition data, including at least a portion of customer information identified as associated with a particular vehicle transformation and vehicle information identifying and/or otherwise associated with a vehicle transferred via a transaction, to a vehicle service onboarding system 102 for processing via the service onboarding application 402A as depicted and described.

In some embodiments, the vehicle provider application 404A processes data received from the vehicle service onboarding system 102. For example, in some embodiments, the vehicle provider application 4 404A receives and/or process(es) custom onboarding message(s). For example, in some embodiments, the vehicle provider application 404A initiates provision of the custom onboarding message via a physical medium. In some embodiments, the vehicle provider application 404A communicates with the vehicle provider onboarding message provision application 404B to provide the custom onboarding message in a physical medium.

As depicted, the vehicle provider environment 404 optionally includes vehicle provider onboarding message provision application 404B. The vehicle provider onboarding message provision application 404B embodies any number of software process(es) that facilitate provision of custom onboarding message(s), and/or portions thereof, via a physical medium. For example, in some embodiments, the vehicle provider onboarding message provision application 404B communicates with the vehicle provider application 404A to facilitate provision of the custom onboarding message. For example, in some embodiments, the vehicle provider onboarding message provision application 404B receives the custom onboarding message from the vehicle provider application 404A, and initiates provision of the custom onboarding message. In some embodiments, the vehicle provider onboarding message provision application 404B controls a printer, for example, such that the custom onboarding message is printed to be provided to the user. In other embodiments, the vehicle provider onboarding message provision application 404B controls a vehicle provider mobile device to provide the custom onboarding message by rendering the custom onboarding message via the display of the vehicle provider mobile device.

In some embodiments, the custom onboarding message service 402B includes any number of software process(es) that transmit custom onboarding message(s) utilizing particular communication channel(s). For example, in at least one embodiment, the custom onboarding message service 402B generates and/or attempts transmission of a SMS message embodying a custom onboarding message. Alternatively or additionally, in some embodiments, the custom onboarding message service 402B generates and/or attempts transmission of an email message embodying a custom onboarding message service 402B. In some such embodiments, the custom onboarding message service 402B is configured to generate and/or attempt transmission of such a custom onboarding message utilizing a particular communications protocol corresponding to a type of custom onboarding message communication to be transmitted.

As depicted, the user environment 406 includes a user-facing vehicle service application 406A. The user-facing vehicle service application 406A embodies any number of software process(es) that maintain and/or process data associated with accessing user-facing functionality associated with a vehicle service application.

The message communication application 406B in some embodiments are executed via separate computing device (s), separate runtime environment(s), separate sub-computing environment(s) controlled by the user environment 406, and/or the like. For example, in some embodiments, the message communication application 406B embodies at least a separate software application executing via a user device.

In some embodiments, the user-facing vehicle service application 406A provides access to vehicle service application functionality. For example, in some embodiments, the user-facing vehicle service application 406A at least provides access to onboarding functionality associated with the vehicle service application. In some such embodiments, the user-facing vehicle service application 406A includes one or more software process(es) that is configured to render user interface(s) associated with such functionality and/or receiving and/or processing user input associated with such user interface(s). In some embodiments, the user-facing vehicle service application 406A embodies an "app" installed to and executable via the user device 106 as depicted and described. For example, in some embodiments, the user-facing vehicle service application 406A enables communication with the vehicle service onboarding system 102 to access functionality provided by the service onboarding application 402A.

In some embodiments, the user-facing vehicle service application 406A provides access to vehicle service application functionality that enables association of subject data object(s) (e.g., vehicle data object(s)) with one or more user data object(s), and management of data, document(s), and/or the like associated with the subject data object(s) such as vehicle data object(s). Additionally or alternatively, in some embodiments, the user-facing vehicle service application 406A provides access to vehicle service application functionality that enables initiation of one or more process(es) for interacting with the subject corresponding to a subject data object, for example in the example context of vehicle management a vehicle corresponding to the vehicle data object (e.g., initiation of repair request(s), monitoring of vehicle status and/or functioning, and/or the like). In this regard, the user-facing vehicle service application 406A may provide any of a myriad of functionality associated with data and/or file storage for particular vehicle data object(s), as well as use of such data and/or file data object(s) for particular process(es).

In some embodiments, the user-facing vehicle service application 406A alone or in communication with an associated back-end application system may track and/or otherwise capture user interaction(s), process(es), and/or the like performed via the user-facing vehicle service application 406A (e.g., user impressions and/or a full range of user behaviors within the application). In this regard, some embodiments may capture user impressions over any number of behavior(s) and/or feature(s) accessible via the user-facing vehicle service application 406A. The user-facing vehicle service application 406A and/or associated back-end application system may process data aggregated for any number of interaction(s) with the user-facing vehicle service application 406A and/or other data associated with a particular user data object, subject data object(s) (e.g., vehicle data object(s)), and/or the like, to generate and/or otherwise update a user profile associated with a particular user. In some embodiments, a user data object comprises or embodies a user profile that indicates the user's behavior while utilizing the user-facing vehicle service application 406A. The user profile may be shared, processed, and/or otherwise utilized for any of a myriad of purposes, including any of the processes and flows described herein. In some embodiments for example, a user profile is transferrable with other entities external from the user-facing vehicle service application 406A, such as vehicle provider system(s), vehicle repair shop system(s), and/or the like. Alternatively or additionally, in some embodiments, the user profile is processed by the user-facing vehicle service application 406A and/or an associated back-end application system to generate particular user interface(s), offer(s), and/or communications associated with external entities. For example, in one example context, the user profile, user information, vehicle information, and/or the like associated with a particular user data object is utilized to provide information, offer(s), and/or the like from dealer(s), repair shop(s), and/or the like that is determined likely to be engaged with by the user via the user-facing vehicle service application 406A. In some embodiments, the captured interaction(s), process(es), and/or the like may be processed diagnostically to improve the functioning of the vehicle service application, such as by looking for unintended or data-implicit user patterns or user avoidance of one or more pages of the application and revising the application based upon these uses. In some embodiments, the captured interaction(s), process(es), and/or the like may be used to confirm user interaction with one or more third-party messages (e.g., tracking clickthrough rates on offers or the frequency with which a user cancels or otherwise declines to interact with one or more third party communications).

In some embodiments, the user environment 406 optionally includes a message communication application 406B. The message communication application 406B embodies any number of software process(es) that facilitate reception and/or processing of custom onboarding message(s). In some embodiments, the message communication application 406B includes one or more software process(es) that monitor for a custom onboarding message transmitted via a particular communication channel. For example, the message communication application 406B in some embodiments monitors for SMS messages received associated with particular user communication channel data embodying a telephone number. Alternatively or additionally, in some embodiments, the message communication application 406B monitors for email messages received associated with particular communication channel data embodying a particular email. In some such embodiments, the message communication application 406B receives the custom onboarding message transmitted via the vehicle service onboarding environment 402.

Additionally or alternatively, in some embodiments, the message communication application 406B causes rendering of one or more user interface(s) including received custom onboarding message(s). Such user interface(s) enable a user to view the received custom onboarding message(s). In some such embodiments, additionally or alternatively, the user interface(s) enable a user to access the custom onboarding message (and/or a portion thereof). For example, in some embodiments, the message communication application 406B enables rendering of a user interface including a custom onboarding link included in the custom onboarding message to enable the user to interact with the rendered custom onboarding link to cause transmission of an indication that the user accessed the custom onboarding message.

Example Processes of the Disclosure

FIG. 5A illustrates a data flow diagram between computing devices performing operations for an example process of reduced-reliance vehicle service application onboarding in accordance with at least some example embodiments of the present disclosure. Specifically, as depicted, the data flow includes various operations performed by and/or between a vehicle provider system 552, vehicle service onboarding system 554, and user device 556. In the depicted embodiment, reliance on the vehicle provider system 552 is reduced, while still allowing the vehicle provider to trigger onboarding. FIG. 5B illustrates a flowchart depicting operations of an example process for reduced-reliance vehicle service application onboarding in accordance with at least some example embodiments of the present disclosure. Specifically, FIG. 5B depicts operations of the data flow depicted in FIG. 5A specifically from the perspective of a vehicle service onboarding system 554.

The vehicle service onboarding system 554 in some embodiments is embodied by the specially configured vehicle service onboarding apparatus 200. For purposes of description, the flowchart depicted and described with respect to FIG. 5B is described as performed by such a specially configured vehicle service onboarding apparatus 200 embodying the vehicle service onboarding system 554. In some embodiments, it should be appreciated that the user device 556 is embodied by the reduced-reliance user apparatus 300.

The process begins at operation 502. At operation 502, the vehicle service onboarding apparatus 200 includes means, such as the onboarding circuitry 210, communications circuitry 208, input/output circuitry 206, processor 202, and/or the like, or a combination thereof, to receive, from the vehicle provider system 552, vehicle acquisition data comprising vehicle information and customer information. In some such embodiments, the vehicle acquisition data embodies data associated with a transfer of a vehicle to a customer. For example, in some embodiments, the vehicle information of the vehicle acquisition data includes at least data that at least uniquely identifies the vehicle being transferred and/or other information associated with the vehicle (e.g., a vehicle type, mileage, model, and/or the like. Additionally or alternatively, for example, in some embodiments, the customer information of the vehicle acquisition data includes at least user communication channel data associated with the customer of the transaction. In some embodiments, the customer information further includes other data associated with the customer, which may not be trusted and/or otherwise indicated as pending onboarding.

At operation 504, the vehicle service onboarding apparatus 200 includes means, such as the onboarding circuitry 210, communications circuitry 208, input/output circuitry 206, processor 202, and/or the like, or a combination thereof, to generate a vehicle data object comprising at least a portion of the vehicle information. In some such embodiments, the vehicle data object represents various properties of the vehicle indicated as transferred by the vehicle acquisition data. In some embodiments, generating the vehicle data object may include retrieving or otherwise accessing and/or updating a pre-existing vehicle data object stored in memory. Additionally or alternatively, in some embodiments, the vehicle data object includes data values associated with various other properties processed associated with a corresponding vehicle service application. For example, in some embodiments, the vehicle data object includes data properties associated with a vehicle mileage, vehicle maintenance action(s), and/or the like. In this regard, vehicle data object may be updatable in response to functionality utilized associated with a particular vehicle service application (e.g., to update the data value associated with one or more of such data properties). In other embodiments, the vehicle service onboarding apparatus 200 generates another subject data object comprising at least a portion of received subject information.

In some embodiments, the vehicle data object includes or is associated with a data slug indicating that the vehicle data object is pending onboarding by a user, as described herein. Alternatively or additionally, the vehicle data object is associated with a user data object (e.g., embodying a user account, or to be claimed or otherwise associated with a user account) that includes or is associated with a data slug indicating the user data object is pending onboarding by a user, as described herein. For example, the data slug may embody a particular identifier utilized to facilitate onboarding of the vehicle data object associated with a particular user data object. The data slug(s) may be removed upon receiving an indication that the user accessed a custom onboarding message as described herein, which may signify that the vehicle and user data objects have been claimed (e.g., that the user has taken the appropriate steps to link themselves with the vehicle via the vehicle service application).

At optional operation 506, the vehicle service onboarding apparatus 200 includes means, such as the onboarding circuitry 210, communications circuitry 208, input/output circuitry 206, processor 202, and/or the like, or a combination thereof, to associate the vehicle data object with a user data object generated comprising at least a portion of the customer information. In this regard, the vehicle service onboarding apparatus 200 may generate and/or maintain data, database record(s), relationship(s), and/or the like for associating the vehicle data object and the vehicle data object that associates (and/or otherwise links) such data object(s). The associated user data object and vehicle data object may indicate that the vehicle data object is to be accessible via the corresponding user data object for purposes of accessing vehicle information associated with or embodied by the vehicle data object, updating vehicle information associated with and/or embodied by the vehicle data object, and/or the like, via a vehicle service application. For example, in some contexts, the association between a vehicle data object and a user data object indicates that the user data object associated with the vehicle data object owns and/or has otherwise been transferred the vehicle represented by the vehicle data object.

In some embodiments, the vehicle data object comprises or otherwise is associated with an indication of pending onboarding. In this regard, the particular customer information embodied in the user data object may be indicated as untrustworthy (e.g., because it was received from a vehicle provider system and not subsequently confirmed or corrected), unconfirmed by the user, and/or otherwise incomplete. In this regard, for example, the vehicle data object may be associated with a user data object including or otherwise associated with user communication channel data associated with the particular communication channel utilizable to transmit custom onboarding message(s) to a use device associated with the user.

In some embodiments, the user data object generated embodies a temporary user data object that is not linked to any particular customer. In some such embodiments, the temporary user data object can be claimed by a user (e.g., a customer associated with a transfer of a vehicle represented by the vehicle acquisition data) during onboarding, for example via accessing a custom onboarding message associated with the user data object and/or corresponding vehicle data object, and/or submitting user information via a user onboarding interface as described herein. Alternatively or additionally, in some embodiments, a temporary user data object is merged with an existing user data object representing a user account associated with the customer (e.g., where the existing user data object is identifiable during onboarding, such as by the customer providing user authentication credentials associated with the existing user data object). Additionally or alternatively still, in some embodiments, a temporary user data object is replaced with an existing user data object representing a user account associated with the customer.

At operation 508, the vehicle service onboarding apparatus 200 includes means, such as the onboarding circuitry 210, communications circuitry 208, input/output circuitry 206, processor 202, and/or the like, or a combination thereof, to attempt initiation of a custom onboarding message. In this regard, the custom onboarding message is to be accessed by the user device associated with the customer. As depicted, the vehicle service onboarding apparatus 200 attempts initiation of the custom onboarding message directly to the user device 556. In some embodiments, the vehicle service onboarding apparatus 200 attempts initiation of the custom onboarding message utilizing a particular communication channel associated with the user device. For example, the communication channel associated with the user device in some embodiments is associated with user communication channel data corresponding to the particular communication channel for the particular user device.

In some embodiments, the vehicle service onboarding apparatus 200 is configured to initiate transmission of the custom onboarding message utilizing a particular third-party cloud service configured to facilitate transmission of a custom onboarding message utilizing a particular communication channel (e.g., email, SMS, push notification, app communication messages, other messaging or communication protocols, and/or the like). For example, the vehicle service onboarding apparatus 200 may initiate transmission of the custom onboarding message utilizing a custom onboarding message service, such as the custom onboarding message service 402B, under the control of the vehicle service onboarding apparatus 200.

The vehicle service onboarding apparatus 200 determines whether the initiated custom onboarding message was successfully transmitted. For example, as depicted, the vehicle service onboarding apparatus 200 determines whether a custom onboarding message was successfully initiated and received by the user device 556. In some such embodiments, the vehicle service onboarding apparatus 200 identifies and/or otherwise receives a transmission error in a circumstance where the custom onboarding message was not successfully initiated, and/or was initiated but not received by the intended recipient (e.g., not received by the user device 556). Alternatively or additionally, in some embodiments, the vehicle service onboarding apparatus 200 identifies and/or otherwise receives a transmission confirmation in a circumstance where the custom onboarding message was successfully initiated and received by the intended recipient. In the example data flow depicted and described with respect to FIG. 5A, the custom onboarding message initiated for transmission to the user device 556 is successfully received by the user device 556.

At operation 510 (as depicted in FIG. 5A, omitted from FIG. 5B), the user device 556 receives and accesses the custom onboarding message. It should be appreciated that the user device 556 may receive the custom onboarding message over any one of a myriad of communication channels. Similarly, in some embodiments, the vehicle service onboarding apparatus 200 accesses the custom onboarding message in any one of a myriad of defined manners, for example in response to user input, automatically, and/or the like. Example instances of the user device 445 receiving and accessing the custom onboarding message are further described herein with respect to FIGS. 8-10.

At operation 512, the vehicle service onboarding apparatus 200 includes means, such as the onboarding circuitry 210, communications circuitry 208, input/output circuitry 206, processor 202, and/or the like, or a combination thereof, to receive an indication that the customer accessed the onboarding message via the user device. In some embodiments, the indication comprises a transmission from the user device 556 associated with the initiated custom onboarding message transmitted to the user device 556. In this regard, the indication received from the user device 556 may include particular identifying information that uniquely identifies the user data object and/or vehicle data object to onboard based on the associated accessed custom onboarding message. For example, in some embodiments, the indication that the customer accessed the onboarding message via the user device comprises a particular accessed customized onboarding link that is associated with a particular user data object and/or vehicle data object for which to complete onboarding.

At optional operation 514, the vehicle service onboarding apparatus 200 includes means, such as the onboarding circuitry 210, communications circuitry 208, input/output circuitry 206, processor 202, and/or the like, or a combination thereof, to cause rendering of a user onboarding interface. In some embodiments, a user-facing vehicle service application may render the interface in response to the user selection of the custom onboarding message, and the user-facing vehicle service application may be configured to retrieve and/or receive data from the vehicle service onboarding apparatus. In some embodiments, the vehicle service onboarding apparatus 200 causes rendering of the user onboarding interface the user device 556 in response to receiving the indication that the customer accessed the onboarding message via the user device 556. In this regard, a session may be initiated with the user device 556 upon receiving the indication that enables the vehicle service onboarding apparatus 200 to cause rendering of the user onboarding interface to the client device.

In some embodiments, the user onboarding interface includes one or more interface elements associated with inputting user information for updating a user data object associated with a vehicle. For example, in some embodiments the user onboarding interface includes one or more interface element(s) associated with inputting biographical data associated with a particular user. Alternatively or additionally, in some embodiments, the user onboarding interface includes one or more interface elements associated with submitting user authentication credentials. In this regard, such user authentication credentials may be utilized to identify an existing, previously provisioned user data object associated with the user without requiring additional onboarding of the user.

Additionally or alternatively, in some embodiments the user onboarding interface includes one or more interface elements associated with inputting vehicle information corresponding to a particular vehicle data object (or other subject data object). For example, in some embodiments, the user onboarding interface includes at least one interface element that enables input of a vehicle identifier associated with a vehicle data object (e.g., a VIN number). The vehicle identifier, for example, may be provided to the user by the vehicle provider and/or the like for inputting via the user onboarding interface. In some embodiments where the user device is associated with a particular user data object (e.g., the user has previously authenticated themselves as associated with a particular user data object), the inputted vehicle information is utilized to associate the corresponding vehicle data object with the particular user data object to complete onboarding.

At operation 516, the vehicle service onboarding apparatus 200 includes means, such as the onboarding circuitry 210, communications circuitry 208, input/output circuitry 206, processor 202, and/or the like, or a combination thereof, to update data associated with the user data object and/or vehicle data object to indicate completion of onboarding of such data object(s). In some embodiments, the vehicle service onboarding apparatus 200 updates the data in response to receiving the indication the user accessed the custom onboarding message. Additionally or alternatively, in some embodiments, the vehicle service onboarding apparatus 200 updates the data in response to receiving a second indication and/or updated data submitted via the user onboarding interface.

In some embodiments, to indicate completion of onboarding, the vehicle service onboarding apparatus 200 removes a slug data object from the vehicle data object (or other subject data object) and/or user data object to indicate that such data object(s) have been completely onboarded. Alternatively or additionally, in some embodiments, the vehicle service onboarding apparatus 200 updates one or more data flags indicating whether the user data object and/or vehicle data object were completely onboarded. Alternatively or additionally, in some embodiments, the vehicle service onboarding apparatus 200 updates the association between the vehicle data object to another, existing user data object that has been fully provisioned by a user to indicate completion of onboarding. For the avoidance of doubt, fully onboarded data objects and removal of any data slugs may not necessarily mean that information cannot be added or changed for the data objects later.

In some embodiments, data associated with the user data object is updated based on the received data from the user device. For example, in some embodiments, the indication that the user accessed the custom onboarding message and/or data submitted via a user onboarding interface is utilized to update one or more data values of the vehicle data object (or other subject data object) and/or the user data object. For example, in some embodiments, the vehicle service onboarding apparatus 200 receives data embodying user information, submitted by the user of the user device 556, to be utilized to update one or more data values of the user data object currently associated with a particular vehicle data object. Alternatively or additionally, the submitted user information is utilized to identify an alternative, existing user data object to be associated with the vehicle data object (e.g., in a circumstance where the user provides user authentication credentials associated with an existing user data object).

Upon completion of onboarding, a user associated with a user data object may utilize a user-facing software application to access various vehicle service application functionality associated with the vehicle data object(s) (or other subject data object(s)) linked and/or otherwise associated with that user data object. For example, in some embodiments, the vehicle service application functionality enables tracking of vehicle information, such as mileage, maintenance operations, and/or the like. Additionally or alternatively, in some embodiments, the vehicle service application functionality enables the user to subscribe to vehicle protection program(s) and/or submit claim information associated with vehicle protection program(s) with which the vehicle is enrolled. The vehicle service application functionality may monitor and/or enable updating of a claim status associated with a claim initiated in response to submission of claim information. In some embodiments, once a particular claim status is detected by the vehicle service application functionality (e.g., a claim is initiated, a claim reaches a status associated with full data submission by a user, and/or the like), the vehicle service application functionality includes automatically generating a claim notification message for transmission to one or more external or third-party entities. For example, the claim notification message may include data notifying the external entity (e.g., a vehicle provider, a dealer, a servicing entity, and/or the like) that a claim as been initiated or reached a particular claim status (e.g., a GAP claim). The claim notification message may provide a lead to the external entity for initiating an offer according to the various embodiments discussed herein. For example, in some embodiments, a dealer system automatically is notified upon initiation of a claim and/or updating of the claim to a particular claim status. Additionally or alternatively, in some embodiments, the vehicle service application functionality enables the user to monitor and/or otherwise visualize any other information associated with the vehicle.

FIG. 6 illustrates a flowchart depicting additional operations for an example process of reduced-reliance vehicle service application onboarding. Specifically, FIG. 6 illustrates operations of an example process for transmitting a custom onboarding message including a customized onboarding link over a particular communication channel in accordance with at least some example embodiments of the present disclosure. For purposes of description, the flowchart depicted and described with respect to FIG. 6 is described as performed by such a specially configured vehicle service onboarding apparatus 200 embodying the vehicle service onboarding system 554. The vehicle service onboarding apparatus 200 is described with respect to interactions with the user device 556. In some embodiments, it should be appreciated that the user device 556 is embodied by the reduced-reliance user apparatus 300.

As illustrated, the process may begin after one or more operations of another process and/or sub-process. For example, in some embodiments, the process depicted and described with respect to FIG. 6 begins after operation 506 as depicted and described with respect to FIG. 5B. Additionally or alternatively, in some embodiments, flow returns from the process depicted and described with respect to FIG. 6 to one or more operations of another process upon completion of the process depicted and described, for example returns to operation 510 of the process as depicted and described with respect to FIG. 5B herein. In other embodiments, the flow ends upon completion of the operations as depicted and described with respect to FIG. 6. In this regard, in some such embodiments, the process depicted and described with respect to FIG. 6 supplants and/or otherwise embodies operation 508 as depicted and described with respect to FIG. 5B.

At operation 602, the vehicle service onboarding apparatus 200 includes means, such as the onboarding circuitry 210, communications circuitry 208, input/output circuitry 206, processor 202, and/or the like, or a combination thereof, to generate a customized onboarding link associated with the vehicle data object (or in other contexts, another subject data object). The customized onboarding link in some such embodiments is generated to enable onboarding of the vehicle data object via accessing the customized onboarding link. For example, the customized onboarding link may particularly be associated with the vehicle data object such that access of the custom onboarding link indicates that the user is claiming and/or otherwise confirming that they have been transferred and/or otherwise own the vehicle represented by the vehicle data object. In some embodiments, for example, the customized onboarding link includes a vehicle identifier associated with the vehicle data object to associate the customized onboarding link with the vehicle data object. Alternatively or additionally, in some embodiments, the customized onboarding link otherwise is associated with accessing a particular process, user interface, and/or functionality specifically associated with the vehicle data object. It should be appreciated that the customized onboarding link may include any number of parameters and/or data values utilized in onboarding. For example in some embodiments, the customized onboarding link includes information identifying and/or associated with the vehicle provider associated with received vehicle acquisition data, user identification data identifying the user data object, and/or the like.

At optional operation 604, the vehicle service onboarding apparatus 200 includes means, such as the onboarding circuitry 210, communications circuitry 208, input/output circuitry 206, processor 202, and/or the like, or a combination thereof, to determine a communication channel associated with the user communication channel is currently accessible. In some embodiments, the vehicle service onboarding apparatus 200 performs one or more checks to determine a network connection status, communication channel status, a user device network status, and/or the like. For example, in some embodiments, the vehicle service onboarding apparatus 200 pings and/or otherwise attempts communication with the user device to determine whether the communication channel associated with the user device is accessible. In some embodiments, in circumstances where the communication channel associated with the user device is not accessible, a custom onboarding message is transmitted to a different computing device as described herein, for example to a vehicle provider system 552. In other embodiments, the vehicle service onboarding apparatus 200 does not perform such a determination before attempting initiation of the custom onboarding message, and such a determination is made based on response data (e.g., transmission error data and/or transmission success data) received in response to an attempted transmission. It should also be appreciated that, as described herein, the customized onboarding link may be encoded as part of a machine-readable symbology in circumstances where the vehicle service onboarding apparatus 200 determines the communication channel associated with the user is inaccessible.

At operation 606, the vehicle service onboarding apparatus 200 includes means, such as the onboarding circuitry 210, communications circuitry 208, input/output circuitry 206, processor 202, and/or the like, or a combination thereof, to attempt initiation, to the user device via the communication channel, of the custom onboarding message. The custom onboarding message includes the customized onboarding link associated with the vehicle data object (or other subject data object). In this regard, the user may interact with the custom onboarding message received by the user device to access the customized onboarding link. In this regard, the customized onboarding link may be utilized to enable transmission of an indication that the user accessed the custom onboarding message from the user device to the vehicle service onboarding apparatus 200 for processing.

By specially configuring the customized onboarding link, the vehicle service onboarding apparatus 200 enables generation of different customized onboarding link(s) for each vehicle data object (or other subject data object) and/or user data object (e.g., such that a unique link may be provided to the customer to automatically enable the customer to claim their account and/or vehicle without excessive account-creation protocols or identity verification required by generic links). In this regard, the customized onboarding link defines the vehicle data object and/or user data object with which the corresponding custom onboarding message is associated. In some embodiments, the customized onboarding link is generated with specific additional information to be utilized in onboarding, configuring a user-facing vehicle service application, and/or the like. Additionally, the customized onboarding link provides a mechanism for the user to efficiently access the custom onboarding message utilizing reduced-reliance (e.g., only requiring a user engagement and/or automatic engagement with the customized onboarding link).

FIG. 7A illustrates a data flow diagram between computing devices performing operations for an example process of reduced-reliance vehicle service application onboarding in accordance with at least some example embodiments of the present disclosure. Specifically, as depicted, the data flow includes various operations performed by and/or between the vehicle provider system 552, the vehicle service onboarding system 554, and the user device 556. Such computing device(s) may be similarly embodied as depicted and described with respect to FIG. 5A. FIG. 7B illustrates a flowchart depicting operations of an example process for reduced-reliance vehicle service application onboarding in accordance with at least some example embodiments of the present disclosure. Specifically, FIG. 7B depicts operations of the data flow depicted in FIG. 7A specifically from the perspective of a vehicle service onboarding system 554.

As illustrated, the process depicted in FIGS. 7A and 7B includes one or more operations depicted and described herein with respect to FIGS. 5A and 5B. For purposes of simplified description and brevity, repeated description of such operations is omitted. In this regard, the operations 702-710 embody a sub-process in circumstances where the a communication channel is inaccessible, as described.

At optional operation 702, the vehicle service onboarding apparatus 200 includes means, such as the onboarding circuitry 210, communications circuitry 208, input/output circuitry 206, processor 202, and/or the like, or a combination thereof, to determine a communication channel associated with the customer is inaccessible. In some embodiments, for example, the vehicle service onboarding apparatus 200 identifies a status associated with the communication channel, a network status for the vehicle service onboarding apparatus 200, and/or a network status for the user device, that represents the status of the communication channel.

Alternatively or additionally, in some embodiments, the vehicle service onboarding apparatus 200 initiates a transmission to the user device to determine whether the communication channel is accessible. For example, in some such embodiments, the vehicle service onboarding apparatus 200 determines the communication channel is accessible in a circumstance where response data associated with the initiated transmission indicates the initiated transmission was successfully completed. Alternatively, in a circumstance where the vehicle service onboarding apparatus 200 receives error data in response to the initiated transmission, the vehicle service onboarding apparatus 200 determines the communication channel is inaccessible based on the response data. Alternatively or additionally still, in some embodiments, the vehicle service onboarding apparatus 200 determines the communication channel associated with the customer is inaccessible in a circumstance where the initiated transmission times out and/or otherwise does not receive response data in a particular timestamp interval.

At operation 704, the vehicle service onboarding apparatus 200 includes means, such as the onboarding circuitry 210, communications circuitry 208, input/output circuitry 206, processor 202, and/or the like, or a combination thereof, to generate a machine-readable symbology associated with the vehicle data object (or other subject data object). For example, in some embodiments, the vehicle service onboarding apparatus 200 generates a machine-readable symbology embodying a vehicle identifier that uniquely identifies a vehicle data object (or other subject identifier uniquely identifying another subject data object), such that the machine-readable symbology can be decoded to identify the vehicle identifier. Alternatively or additionally, in some embodiments, the vehicle service onboarding apparatus 200 generates a custom onboarding link associated with the vehicle data object, for example as described with respect to operation 602. In some such embodiments, the vehicle service onboarding apparatus 200 generates the machine-readable symbology embodying the custom onboarding link associated with the vehicle data object. In this regard, the machine-readable symbology is detectable and decodable to identify and access the custom onboarding link embodied therein.

At operation 706, the vehicle service onboarding apparatus 200 includes means, such as the onboarding circuitry 210, communications circuitry 208, input/output circuitry 206, processor 202, and/or the like, or a combination thereof, to transmit, to the vehicle provider system 552, the custom onboarding message. The custom onboarding message comprises the machine-readable symbology generated by the vehicle service onboarding apparatus 200. In this regard, the vehicle service onboarding apparatus 200 transmits the custom onboarding message to the vehicle provider system 552 to cause the vehicle provider system 552 to present the machine-readable symbology and/or other information of the custom onboarding message. For example, in some embodiments, the vehicle service onboarding apparatus 200 transmits the custom onboarding message as part of and/or together with a specially configured request to cause the vehicle provider system to initiate one or more process(es) for presenting the machine-readable symbology to the user representing a customer of a transaction embodied by vehicle acquisition data.

At operation 708, the vehicle provider system 552 presents the custom onboarding message via the physical medium 752. In some embodiments, for example, the vehicle provider system 552 presents the custom onboarding message, and/or a portion thereof, via the physical medium 752 such that the presented data is visible and/or otherwise accessible via the user device 556. In some embodiments, for example, the vehicle provider system 552 prints the custom onboarding message, a customized onboarding link, and/or the machine-readable symbology to the physical medium 752 such that the physical medium 752 may be provided to the user of the user device 556 for accessing via the user device 556. In a particular context, the vehicle provider system 552 causes a printer of the vehicle provider system 552 to print at least the machine-readable symbology for presenting to the user of the user device 556. Alternatively or additionally, in some embodiments, the vehicle provider system 552 causes rendering of one or more user interfaces, for example to a display of a vehicle provider mobile device embodied as part of and/or controlled by the vehicle provider system 552. In some such embodiments, the physical medium 752 embodies the rendered representation(s) of the custom onboarding message, customized onboarding link embodied therein, and/or machine-readable symbology embodied in the custom onboarding message. The physical medium 752 embodying the vehicle provider mobile device presenting the rendering may be provided to the user of the user device 556, and/or otherwise visible to the user (e.g., placed in a location where the device is visible to the user and/or user device 556.

At operation 710, the user device 556 accesses the custom onboarding message via the physical medium 752. In some embodiments, the user of the user device 556 utilizes image capture and/or processing functionality to extract information from the physical medium 752 embodying the custom onboarding message, and/or a portion thereof, and access such information. For example, in some embodiments, the user of the user device 556 utilizes the user device 556 to capture an image of the physical medium 752, and detect and decode the machine-readable symbology embodied therein to access a particular customized onboarding link embodied by the machine-readable symbology in the custom onboarding message. Upon decoding the machine-readable symbology, for example, the user device 556 may access the customized onboarding link (e.g., via a browser application, native vehicle service application executed on the user device 556, and/or the like) automatically or in response to user input via the user device 556.

At operation 712, the vehicle service onboarding apparatus 200 includes means, such as the onboarding circuitry 210, communications circuitry 208, input/output circuitry 206, processor 202, and/or the like, or a combination thereof, to receive an indication that the customer accessed the onboarding message via the user device 556. For example, in some embodiments, the user utilizes the user device 556 to capture and decode the machine-readable symbology, and interacts with the and/or automatically accesses a customized onboarding link embodied by the machine-readable symbology. In some such contexts, the physical medium 752 is provided to the user associated with the user device 556 to enable access to the data presented via the physical medium 752. In one example context, for example, a salesperson or other employee associated with the vehicle provider system 552 retrieves the physical medium 752 (e.g., a printed paper, a mobile device, a display screen, and/or the like) and provides it or otherwise shows it to the user associated with the user device 556 to enable accessing of the data presented via the physical medium 752. In other embodiments, for example where the custom onboarding message is presented via the physical medium 752 as text (e.g., text embodying the customized onboarding link), the user device 556 may detect ad extract such text automatically, and/or in some embodiments the user of the user device 556 may input such text into the user device for accessing, for example via a browser application or a user-facing vehicle service application executing on the user device 556. As described herein, whether the customized onboarding link is provided directly to the user device or to a physical medium of the vehicle provider for access by the user/user device, the steps taken after the user interacts with the link may be the same. For example, the customer may be prompted to download or otherwise access (e.g., via web app or browser) the vehicle service application if not already installed for completing onboarding.

In some embodiments, the vehicle service onboarding apparatus 200 subsequently continues to perform one or more onboarding operations based on the indication received from the user. For example, in some embodiments, the flow continues as depicted and described with operations 514 and/or 516.

Such embodiments enable a user device to access a custom onboarding message without direct access to the user device from the service application system. Additionally or alternatively, such embodiments enable the user device to access the custom onboarding message even in circumstances where a communication channel for accessing the user device becomes inaccessible. Thus, in both circumstances, onboarding is complete based on reduced-reliance by a user of the user device by providing the custom onboarding message.

FIG. 8 illustrates a flowchart depicting operations of an example process for reduced-reliance vehicle service application onboarding in accordance with at least some example embodiments of the present disclosure. Specifically, FIG. 8 discloses a process performed by a user device, for example the user device 556 as depicted and described with respect to FIGS. 5A and 7A embodied by the specially configured reduced-reliance user apparatus 300. For purposes of description, the flowchart depicted and described with respect to FIG. 8 is described as performed by such a specially configured reduced-reliance user apparatus 300 embodying a user device. In some embodiments, the reduced-reliance user apparatus 300 is in communication with one or more other computing devices such as a service application onboarding system (e.g., embodied by a vehicle service onboarding apparatus 200) and/or a vehicle provider system to facilitate the various operations as depicted and described.

The process begins at optional operation 802. At optional operation 802, the reduced-reliance user apparatus 300 includes means, such as the user reduced-reliance onboarding circuitry 310, communications circuitry 308, input/output circuitry 306, processor 302, and/or the like, or a combination thereof, to receive a custom onboarding message associated with a vehicle data object (or other subject data object) maintained by a vehicle service onboarding system. In some embodiments, the reduced-reliance user apparatus 300 receives the custom onboarding message from the vehicle service onboarding system over a particular communication channel. In some such embodiments, the communication channel may be associated with a particular message communication application executed on the reduced-reliance user apparatus 300, for example a text messaging application, an email application, and/or the like. In this regard, the message communication application enables rendering of and/or access to the custom onboarding message, or at least a portion thereof, via the reduced-reliance user apparatus 300.

At operation 804, the reduced-reliance user apparatus 300 includes means, such as the user reduced-reliance onboarding circuitry 310, communications circuitry 308, input/output circuitry 306, processor 302, and/or the like, or a combination thereof, to access the custom onboarding message. In some embodiments, the reduced-reliance user apparatus 300 accesses the custom onboarding message in response to user interaction received via the reduced-reliance user apparatus 300. For example, in some embodiments where the custom onboarding message is received and rendered via a user interface of a message communication application executed via the reduced-reliance user apparatus 300, the user may engage the rendering of the custom onboarding message, or a portion thereof, via the message communication application to access it. In one example context, the reduced-reliance user apparatus 300 renders a customized onboarding link included in and/or otherwise embodied by the custom onboarding message, such that the user engages the customized onboarding link to access the custom onboarding message.

In other embodiments, the reduced-reliance user apparatus 300 utilizes other functionality, such as image capture and/or image processing functionality via a camera and processor associated with the user apparatus. In some embodiments, the custom onboarding message, and/or information associated therewith, is presented via a physical medium (e.g., a paper printout, a user interface rendered to a device, and/or the like). For example, in some embodiments, the custom onboarding message includes or embodies a machine-readable symbology presented via a physical medium. The reduced-reliance user apparatus 300 captures an image of the machine-readable symbology from the physical medium, detects the machine-readable symbology from the physical medium, and decodes the detected machine-readable symbology to identify the information encoded therein. In some such embodiments, the machine-readable symbology encodes a customized onboarding link that, upon decoding, is automatically accessed via the reduced-reliance user apparatus 300. Alternatively or additionally, in some embodiments, the decoded customized onboarding link is rendered via the reduced-reliance user apparatus 300 to enable a user to engage the customized onboarding link to access the custom onboarding message.

At operation 806, the reduced-reliance user apparatus 300 includes means, such as the user reduced-reliance onboarding circuitry 310, communications circuitry 308, input/output circuitry 306, processor 302, and/or the like, or a combination thereof, to render a user onboarding interface. In some embodiments, the user onboarding interface is rendered in response to accessing the custom onboarding message. The user onboarding interface comprises a set of information input fields. In some such embodiments, the set of information input fields includes one or more customer information input fields. In this regard, the user may input data to the user information input field(s) to be utilized in updating one or more properties of a user data object (e.g., a user account associated with a customer) maintained by a service application onboarding system. For example, in some embodiments, the user-inputted data is utilized to update a user data object associated with the custom onboarding message (e.g., associated with a vehicle data object or other subject data object identifiable from the custom onboarding message and/or information identified therefrom). The data inputted into the user information input field(s) includes user authentication credentials usable to identify a user data object to associate with the vehicle data object (or other subject data object), for example by identifying a user data object that matches the inputted user authentication credentials. In some embodiments, operation 806 may include additional operations for causing the user onboarding interface to be rendered, such as installing the underlying application onto the user device or accessing a web app or browser to cause the interface to be rendered on the user device.

Additionally or alternatively, in some embodiments, the set of information input fields includes one or more vehicle information input fields. In this regard, the user may input data to the vehicle information input field(s) to be utilized in updating one or more properties of a vehicle data object (or other subject data object) maintained by a service application onboarding system. For example, in some embodiments, the user-inputted data is utilized to update a subject data object such as a vehicle data object associated with and/or identified in the custom onboarding message. Alternatively or additionally, in some embodiments, the vehicle information input field(s) include a vehicle identifier input field usable to confirm the subject data object such as the vehicle data object associated with the custom onboarding message and/or customized onboarding link embodied therein.

In some embodiments, one or more of the information input field(s) in the set of information input field(s) is automatically filled based on information received in the vehicle acquisition data and/or custom onboarding message. In some such embodiments, the information input field(s) may each be filled based on data embodied in the vehicle acquisition data and/or custom onboarding message and/or information therein (e.g., a machine-readable symbology embodying such data value(s)). For example, in some embodiments, the custom onboarding message may transmit additional information along with the customized onboarding link, and in some embodiments, the custom onboarding message may enable access to a link to the vehicle service onboarding system storing some additional data (e.g., some input fields), which may be provided and reviewed by the customer from the user device during onboarding. In this regard, the user may review such data value(s) to confirm the accuracy of such data value(s) and may adjust one or more data value(s) to update such data vale(s) to a correct value. Additionally or alternatively, the user may provide a data value for any of the information input field(s) not automatically filled based on the received information.

It should be appreciated that the user onboarding interface may be rendered via any of a myriad of software applications executed via the reduced-reliance user apparatus 300. For example, in some embodiments, the reduced-reliance user apparatus 300 executes a web-based user facing vehicle service application configured to render the user onboarding interface. For example, in some embodiments, the reduced-reliance user apparatus 300 accesses a customized onboarding link embodied in the custom onboarding message, and in response receives data embodying the user onboarding interface. In other embodiments, the reduced-reliance user apparatus 300 initiates a native user-facing vehicle service application that renders the user onboarding interface in response to initiating the native user-facing vehicle service application. For example, in some embodiments, the reduced-reliance user apparatus 300 initiates the native user-facing vehicle service application to render the particular user onboarding interface.

At operation 808, the reduced-reliance user apparatus 300 includes means, such as the user reduced-reliance onboarding circuitry 310, communications circuitry 308, input/output circuitry 306, processor 302, and/or the like, or a combination thereof, to receive user input via the user onboarding interface. In some such embodiments, the user input indicates and/or otherwise embodies a request to submit information inputted via the user onboarding interface. In some embodiments, the user onboarding interface includes a submit button that is configured to initiate a request to submit the information embodied by the data value(s) of the set of information inputs. In this regard, the user may interact with the user onboarding interface to review and/or update one or more data value(s) embodied in the information input(s) rendered to the user onboarding interface, and interact with the submit button to request submission of the data value(s) embodied in the information input(s). In other embodiments, the reduced-reliance user apparatus 300 is configured to receive the user input embodying a gesture, voice command (e.g., interactive voice recognition), and/or other type of user input indicating a request to submit information inputted via the user onboarding interface.

At operation 810, the reduced-reliance user apparatus 300 includes means, such as the user reduced-reliance onboarding circuitry 310, communications circuitry 308, input/output circuitry 306, processor 302, and/or the like, or a combination thereof, to submit user-inputted onboarding information to the vehicle service onboarding system. The user-inputted onboarding information is submitted in response to the user input requesting submission of the information. In some embodiments, the user-inputted onboarding information is utilized to configure a user data object associated with a subject data object (e.g., a vehicle data object) and/or the subject data object (e.g., vehicle data object) identified from the received custom onboarding message and/or information therein. For example, in some embodiments, the reduced-reliance user apparatus 300 submits the user-inputted onboarding information by transmitting the user-inputted onboarding information to the vehicle service onboarding system. The user-inputted onboarding information may include some or all of the data value(s) associated with each information input of the set of information inputs. In some embodiments, additional information related to the vehicle may be provided by the user, such as color, body type, and the like.

FIG. 9A illustrates a flowchart depicting additional operations for an example process of reduced-reliance vehicle service application onboarding. Specifically, FIG. 9A illustrates operations of an example process for initiating a native user-facing vehicle service application on a user device in accordance with at least some example embodiments of the present disclosure. As described herein, in some example embodiments, the custom onboarding link functions as a deep link in some circumstances (e.g., where the native app is already installed), a deferred deep link in other circumstances (e.g., where the native app needs to be installed from an app store), and a web link in yet other circumstances (e.g., on a desktop or other platform where web is preferred over an "app" architecture). In some embodiments, the customized onboarding link may be structured the same in each of the aforementioned instances, and the customer-side device and/or operating system of the customer-side device may trigger the appropriate handling of the customized onboarding link. For purposes of description, the flowchart depicted and described with respect to FIG. 9A is described as performed by such a specially configured reduced-reliance user apparatus 300, for example as described with respect to FIG. 8.

As illustrated, the process may begin after one or more operations of another process and/or sub-process. For example, in some embodiments, the process depicted and described with respect to FIG. 9A begins after operation 804 as depicted and described with respect to FIG. 8. Additionally or alternatively, in some embodiments, flow returns from the process depicted and described with respect to FIG. 9A to one or more operations of another process upon completion of the process depicted and described, for example returns to operation 806 of the process as depicted and described with respect to FIG. 8 herein. In other embodiments, the flow ends upon completion of the operations as depicted and described with respect to FIG. 9A.

At operation 902, the reduced-reliance user apparatus 300 includes means, such as the user reduced-reliance onboarding circuitry 310, communications circuitry 308, input/output circuitry 306, processor 302, and/or the like, or a combination thereof, to determine whether a native user-facing vehicle service application is installed on the reduced-reliance user apparatus 300. In some embodiments, for example, the reduced-reliance user apparatus 300 determines whether the native user-facing vehicle service application is installed by querying for an installation status from the operating system of the reduced-reliance user apparatus 300. Alternatively or additionally, in some embodiments, the reduced-reliance user apparatus 300 attempts initiation of the user-facing vehicle service application, and determines the native user-facing vehicle service application is not installed in a circumstance where the initiation of the native user-facing vehicle service application is unsuccessful or results in an error, and determines the native user-facing vehicle service application is installed in a circumstance where the initiation of the native user-facing vehicle service application is successful.

In circumstances where the reduced-reliance user apparatus 300 determines the native user-facing vehicle service application is installed, or in some embodiments automatically upon installation of the user-facing vehicle service application, a subsequent access of the custom onboarding message, and/or upon user interaction by a user, flow proceeds to operation 906. At operation 906, the reduced-reliance user apparatus 300 includes means, such as the user reduced-reliance onboarding circuitry 310, communications circuitry 308, input/output circuitry 306, processor 302, and/or the like, or a combination thereof, to initiate the native user-facing vehicle service application based on the custom onboarding message. For example, in some embodiments, the native user-facing vehicle service application is initiated to a particular user interface based on the custom onboarding message. In one example context, the native user-facing vehicle service application is initiated to a particular user onboarding interface with one or more information input field(s) populated based on the custom onboarding message. Alternatively or additionally, in some embodiments, the native user-facing vehicle service application is initiated to automatically perform one or more process(es) in response to accessing the custom onboarding message. For example, in some embodiments, the reduced-reliance user apparatus 300 initiates the native user-facing vehicle service application to automatically cause the native user-facing vehicle service application to transmit information associated with a particular subject data object such as a vehicle data object and/or user data object to the vehicle service onboarding system to complete onboarding of such data object(s).

In some embodiments, the apparatus 300 installs the native user-facing vehicle service application to the apparatus 300 utilizing the customized onboarding link embodied in the custom onboarding message. Additionally or alternatively, in some embodiments, the apparatus 300 automatically configures the native user-facing vehicle service application once installed utilizing the customized onboarding link embodied in the custom onboarding message. In some such embodiments, the customized onboarding link serves as a deep link and/or a deferred deep link that configures query parameters for the initial launch of the user-facing vehicle service application on the apparatus 300. For example, the apparatus 300 may configure the user-facing vehicle service application to automatically initiate onboarding of a vehicle represented by the vehicle data object (or other subject represented by a corresponding subject data object) via information included in the customized onboarding link (e.g., a vehicle identifier, slug data object identifying the vehicle and/or corresponding user data object, and the like).

Additionally or alternatively, in some embodiments, the apparatus 300 configures the newly installed native user-facing vehicle service application based on information associated with the vehicle provider system from which vehicle acquisition data was provided to a vehicle service onboarding system. For example, in some embodiments, the custom onboarding message includes a customized onboarding link that uniquely identifies the vehicle provider system from which the vehicle acquisition data was obtain for use in customizing an initial interface, such as a user onboarding interface. The initial interface may be configured to identify information associated with the user data object and/or a subject data object including for example a vehicle data object, such as preferred dealers, repair providers, extended warranties, service contracts, insurance policies, repair preferences, and similar data and metadata, and may show or cause display of logos, information, and/or other visual and/or text data based on the vehicle provider system identified in the customized onboarding link. In some embodiments, some or all data utilized by the native user-facing vehicle service application, including customization, user, and vehicle information may be stored on a vehicle service application onboarding system and accessed as needed, for example by the user-facing vehicle service application. In some embodiments, the user data objects and/or subject data objects (e.g., vehicle data objects) may include information accessed by the native user-facing vehicle service application to render the application interface and provide the vehicle service application, including any of the related features and functionalities described herein. In some such embodiments, for example, these data objects are requested and received from the vehicle service onboarding system upon accessing the custom onboarding message and/or a customized onboarding link therein. Alternatively or additionally, in some embodiments, the custom onboarding message includes such image(s) and/or text associated with the vehicle provider system for use in configuring the newly installed native user-facing vehicle service application via the apparatus 300. In this regard, the user may be presented automatically with a user experience that is based on their specific vehicle acquired and/or the vehicle provider from which the user acquired the vehicle.

In circumstances where the reduced-reliance user apparatus 300 determines the native user-facing vehicle service application is not installed, flow proceeds to operation 904. At operation 904, the reduced-reliance user apparatus 300 includes means, such as the user reduced-reliance onboarding circuitry 310, communications circuitry 308, input/output circuitry 306, processor 302, and/or the like, or a combination thereof, to access at least one application distribution platform to install the native user-facing vehicle service application. In this regard, the reduced-reliance user apparatus 300 may download and/or install the native user-facing vehicle service application from the at least one application distribution platform. Upon installation of the native user-facing vehicle service application to the reduced-reliance user apparatus 300, the user may access the native user-facing vehicle service application to access functionality associated with the custom onboarding message.

In some embodiments, upon installation of the native user-facing vehicle service application to the reduced-reliance user apparatus 300, the native user-facing vehicle service application is automatically initiated to perform functionality based on the accessed custom onboarding message, for example as described with respect to operation 906. For example, in some embodiments, upon installation of the native user-facing vehicle service application, the native user-facing vehicle service application is automatically initiated to a user onboarding interface associated with and/or based on the custom onboarding message. In some such embodiments, the custom onboarding message comprises or includes a specially programmed deep link (or deferred deep link) that provides information and/or parameter values embodied in the customized onboarding link (as described herein, for example with respect to operation 706) to the newly installed native user-facing vehicle service application to cause such automatic configuring.

FIG. 9B illustrates a flowchart depicting additional operations for an example process of reduced-reliance vehicle service application onboarding. Specifically, FIG. 9B illustrates operations of an example process for initiating a web-based user-facing vehicle service application on a user device in accordance with at least some example embodiments of the present disclosure. For purposes of description, the flowchart depicted and described with respect to FIG. 9B is described as performed by such a specially configured reduced-reliance user apparatus 300, for example as described with respect to FIG. 8.

As illustrated, the process may begin after one or more operations of another process and/or sub-process. For example, in some embodiments, the process depicted and described with respect to FIG. 9B begins after operation 804 as depicted and described with respect to FIG. 8. Additionally or alternatively, in some embodiments, flow returns from the process depicted and described with respect to FIG. 9B to one or more operations of another process upon completion of the process depicted and described, for example returns to operation 806 of the process as depicted and described with respect to FIG. 8 herein. In other embodiments, the flow ends upon completion of the operations as depicted and described with respect to FIG. 9B.

At operation 952, the reduced-reliance user apparatus 300 includes means, such as the user reduced-reliance onboarding circuitry 310, communications circuitry 308, input/output circuitry 306, processor 302, and/or the like, or a combination thereof, to initiate a web-based vehicle service application associated with the vehicle service onboarding system. In some embodiments, the web-based vehicle service application is initiated based on the custom onboarding message. For example, in some embodiments, the web-based vehicle service application is initiated at a particular endpoint and/or web page represented by a customized onboarding link included in and/or embodied by the custom onboarding message. In this regard, in some such embodiments, the reduced-reliance user apparatus 300 initiates a browser application to access the particular customized onboarding link, such that the web-based vehicle service application is initiated and/or otherwise accessed via the browser application. In this regard, in some such embodiments, the customized onboarding link embodied by and/or in the customized onboarding link comprises a web link that directs the apparatus 300 (for example via a browser application) to a particular resource embodying the vehicle service application. The particular resource identified by and/or otherwise represented by the customized onboarding link configures the resulting web page based on the various information and/or parameters of the customized onboarding link (e.g., to customize the interface embodied by the web page and/or automatically onboard a particular subject data object such as a vehicle data object in a similar manner to that described with respect to operation 906).

FIG. 10 illustrates a flowchart depicting additional operations for an example process of reduced-reliance vehicle service application onboarding. Specifically, FIG. 10 illustrates operations of an example process for providing a vehicle identifier indicating access of a corresponding custom onboarding message in accordance with at least some example embodiments of the present disclosure. The vehicle identifier may include data directly or indirectly indicative of the vehicle, such as, by way of non-limiting examples, a VIN number, a reference to a vehicle represented by a vehicle data object and/or user data object associated with the vehicle data object, or any other information that once accessed by the user device for onboarding and/or presented to the vehicle service onboarding system causes the vehicle service onboarding system to identify the vehicle or associated data/information representative of the vehicle or customer for which the customer is performing the onboarding. For purposes of description, the flowchart depicted and described with respect to FIG. 10 is described as performed by such a specially configured reduced-reliance user apparatus 300, for example as described with respect to FIG. 8.

As illustrated, the process may begin after one or more operations of another process and/or sub-process. For example, in some embodiments, the process depicted and described with respect to FIG. 10 begins after operation 804 as depicted and described with respect to FIG. 8. Additionally or alternatively, in some embodiments, flow returns from the process depicted and described with respect to FIG. 10 to one or more operations of another process upon completion of the process depicted and described, for example returns to operation 806 of the process as depicted and described with respect to FIG. 8 herein. In other embodiments, the flow ends upon completion of the operations as depicted and described with respect to FIG. 10.

At operation 1002, the reduced-reliance user apparatus 300 includes means, such as the user reduced-reliance onboarding circuitry 310, communications circuitry 308, input/output circuitry 306, processor 302, and/or the like, or a combination thereof, to extract, from the custom onboarding message and/or a portion of the custom onboarding message information, a vehicle identifier associated with the custom onboarding message. In some embodiments, the vehicle identifier uniquely represents, or otherwise is associated with, the vehicle data object being onboarded associated with the custom onboarding message. For example, in this regard, the custom onboarding message includes a data value embodying the vehicle identifier, includes a custom onboarding link that includes the vehicle identifier (e.g., as a query parameter and/or the like), and/or includes a machine-readable symbology embodying the vehicle identifier. In some such embodiments, the vehicle identifier may be provided to the vehicle service onboarding system to indicate the user accessed the custom onboarding message corresponding to the vehicle data object identified by the vehicle identifier (or in other contexts, another subject data object identified by a subject identifier).

At operation 1004, the reduced-reliance user apparatus 300 includes means, such as the user reduced-reliance onboarding circuitry 310, communications circuitry 308, input/output circuitry 306, processor 302, and/or the like, or a combination thereof, to provide the vehicle identifier to facilitate onboarding. In some embodiments, for example, the reduced-reliance user apparatus 300 provides the vehicle identifier to the vehicle service onboarding system. In some embodiments, the vehicle identifier is provided to indicate that the user accessed the corresponding custom onboarding message, and/or that the user to which the custom onboarding message was transmitted has confirmed ownership of the vehicle represented by the vehicle identifier. In some such embodiments, the vehicle identifier is provided to the vehicle service onboarding system to cause the vehicle service onboarding system to complete onboarding of the vehicle data object (or other subject data object) associated with the vehicle identifier and/or a user data object associated and/or otherwise linked to the vehicle data object. For example, in some embodiments, the reduced-reliance user apparatus 300 causes the vehicle service onboarding system to, in response to receiving the vehicle identifier indicating the user accessed the custom onboarding message, update data associated with the vehicle data object represented by the vehicle identifier (or other subject data object represented by a subject identifier) and/or the user data object associated therewith. In some such embodiments, the reduced-reliance user apparatus 300 provides the vehicle identifier to the vehicle service onboarding system together with user-inputted onboarding information, for example input via a user onboarding interface as described herein.

Example Implementation of the Disclosure

FIG. 11 illustrates a flowchart depicting operations performed in an example implementation in accordance with at least some example embodiments of the present disclosure. The example illustrated with respect to FIG. 11 may, in whole or in any sub-part, define one or more embodiments of the present disclosure and may be fairly used with or substituted for any of the embodiments described herein. Specifically, FIG. 11 depicts example operations performed by various software applications executed by the various computing devices described herein. It should be appreciated that, in some such embodiments, each of the operations are performed by one or more of the service application onboarding system (e.g., executing the service onboarding application 1154, and/or the vehicle provider onboarding message provision application 1156), vehicle provider system (e.g., executing the vehicle provider application 1152, and/or the custom onboarding message service 1158), and/or the user device (e.g., executing the user-facing vehicle service application 1160). In this regard, each of the described computing devices may communicate with one another via one or more communications network, as described herein.

At operation 1102, the vehicle provider system (for example, via the vehicle provider application 1152) provides vehicle acquisition data to the vehicle service onboarding system. In some such embodiments, for example, a salesperson associated with the vehicle provider enters the vehicle acquisition data to the vehicle provider system during and/or upon completion of the transaction. The vehicle acquisition data includes any number of information associated with a vehicle transaction between a customer and the vehicle provider. For example, in some embodiments, the vehicle acquisition data includes vehicle information associated with the transferred vehicle and/or customer information associated with the customer of the transaction. In some embodiments, the vehicle information includes minimal information possible for identifying a vehicle, such as at least and/or only a vehicle identifier.

In some embodiments, the vehicle acquisition data includes customer information including at least communication channel data for use in communicating with a user device corresponding to the customer (e.g., the customer's mobile phone number for use in sending a text message). Additionally or alternatively, in some embodiments, the vehicle acquisition data includes vehicle provider information identifying and/or otherwise associated with the vehicle provider facilitating the transaction of the vehicle with the customer. In some embodiments, the vehicle acquisition data includes a vehicle identification number (VIN), vehicle provider identifier (e.g., a unique identifier associated with a dealer), customer first name, customer last name, customer phone number, and/or optionally a customer email.

At operation 1104, the vehicle service onboarding system (for example via the service onboarding application 1154) creates a new user data object and a subject data object (e.g., a vehicle data object) associated with a data slug indicating vehicle data object is pending onboarding. In at least one example context the vehicle data object represents the vehicle identified as transferred by the vehicle acquisition data. In some embodiments, the vehicle data object includes one or more data properties having values set based on the vehicle acquisition data (e.g., a VIN, vehicle make or model, and/or the like). In some embodiments, the data slug is generated to uniquely identify the vehicle data object for purposes of facilitating onboarding. It will be appreciated that other properties may be included for other types of subject data object(s). For example, in some embodiments, the data slug includes a short, unique 4-8 character identifier that is associated with a vehicle data object until onboarding is completed. In some embodiments, the data slug may be reused upon completion of onboarding for the newly created vehicle data object. The new user data object may be created with some or all of the user information included in the vehicle acquisition data. Alternatively or additionally, in some embodiments, the new user data object is empty (e.g., does not include any user information) for example in instances where the vehicle acquisition data includes no customer information from the vehicle provider system. In at least some embodiments, the new user data object embodies a temporary user data object that can be claimed by a user and/or replaced or otherwise merged with an existing user data object (e.g., representing a fully onboarded user account for a particular user).

In some embodiments, the vehicle service onboarding system (for example, via the service onboarding application 1154 associated with onboarding for a particular vehicle service application) may operate as part of or in conjunction with systems providing additional functionality to the customer, such as a contract form generation system capable of pre-populating and preparing documents for the customer's signature in real time. In some embodiments, the contract form generation system additionally or alternatively creates temporary contracts (e.g., place holder contracts prior to signature, data onboarding, and account synchronization for the customer) associated with the subject data object such as a vehicle data object and/or corresponding user data object, which temporary contracts may be stored as part of the subject data object (e.g., the vehicle data object) and/or corresponding user data object. In some embodiments, the temporary contracts may be utilized for visualization and/or processing by an administrator of the vehicle service onboarding system (e.g., to see what warranties and/or other contractual obligations are provided to the customer that will be onboarded associated with the particular subject data object such as the vehicle data object). In some such embodiments, the temporary contracts remain associated with the subject data object such as the vehicle data object and/or corresponding user data object until updated during onboarding. During or following onboarding, the vehicle service application system may update the temporary contracts with actual contracts and other data and information associated with the user and/or vehicle, which data may be retrieved or transmitted from, for example, the user, a third party server (e.g., an insurance or service contract provider), or the vehicle provider. For example, upon completion of the temporary contracts, the completion may be updated in the contract form generation system, which may push the completed status and data associated with the contracts to the vehicle service application system, which may seamlessly update the customer's contract information in the service application. In some embodiments, the vehicle service application may be called (e.g., via API) or otherwise triggered via the receipt of the data objects described herein, even if received indirectly, such as via a contract form generation system that has received customer and/or subject (e.g., vehicle) data from a provider and/or customer.

At operation 1106, the vehicle service onboarding system (for example, via the service onboarding application 1154 for performing onboarding with respect to a particular vehicle service application) creates a customized onboarding link and initiates an onboarding flow. In some embodiments, the customized onboarding link is created corresponding with the subject data object such as the vehicle data object, for example utilizing the data slug and/or a vehicle identifier associated with the subject data object such as the vehicle data object. In this regard, the data slug may serve as a unique identifier for enabling onboarding of the particular vehicle data object (or other subject data object in other contexts). For example, the customized onboarding link may be configured utilizing the data slug as a parameter that uniquely identifies the subject data object, for example the vehicle data object, identified by the customized onboarding link. Additionally or alternatively, in some embodiments, the customized onboarding link is generated utilizing various portions of the vehicle acquisition data. For example, in some embodiments, the customized onboarding link includes a vehicle provider identifier, customer information, vehicle information, and/or the like. The vehicle service onboarding system may initiating the onboarding flow via one or more of the subsequent operations described.

In some embodiments, at operation 1108, the vehicle service onboarding system attempts to communicate with the user device directly via a user communication channel, and communicates indirectly in circumstances where the user device cannot be communicated with directly. For example, the vehicle service onboarding system may attempt a preferred method of communication, as described with respect to operation 1112. In a circumstance where the preferred method of communication with the user device fails, an alternative method may be attempted, for example as described with respect to operation 1110.

At operation 1112, the vehicle service onboarding system (e.g., via the custom onboarding message service 1158) initiates transmission of an SMS custom onboarding message including the customized onboarding link to the user device associated with the customer. In this regard, the SMS custom onboarding message includes at least the customized onboarding link for accessing by the user, and is transmitted to the user device via an SMS message. In a circumstance where the user accesses the custom onboarding link from the SMS custom onboarding message (e.g., by tapping or clicking on the link from within the SMS custom onboarding message), the flow continues. In some embodiments, the vehicle service onboarding system initiates the transmission of the SMS custom onboarding message directly or via a separate system, such as the contract form generation system described herein.

Alternatively or additionally, at operation 1110, the vehicle service onboarding system (for example, via the vehicle provider onboarding message provision application 1156) initiates transmission to the vehicle provider system of a custom onboarding message including machine-readable symbology encoding the customized onboarding link. The Transmitted custom onboarding message causes the vehicle provider system to print and/or otherwise provide the machine-readable symbology via a physical medium (e.g., a printed paper including the machine-readable symbology). The printed machine-readable symbology (e.g., on a printed paper) may be presented to the customer for scanning via the user device to access the customized onboarding link embodied therein. In some embodiments, operation 1110 occurs in a circumstance where the vehicle service onboarding system determines direct communication with the user device is not accessible (e.g., a SMS custom onboarding message fails to send and/or fails to be received). Alternatively or additionally, in some embodiments, operation 1110 occurs in a circumstance where the vehicle service onboarding system determines the user has not accessed the customized onboarding link transmitted via or as part of the SMS custom onboarding message in a determinable time interval. Alternatively or additionally still, in some embodiments, operation 1110 occurs in all contexts as a backup in case the user does not access the customized onboarding link via the SMS custom onboarding message. In some embodiments, the flow continues in a circumstance where the user device accesses the customized onboarding link via the machine-readable symbology.

At operation 1114, the user device (for example, via the user-facing vehicle service application 1160) renders a user onboarding interface. The user onboarding interface includes one or more interface elements configured based on the vehicle provider associated with the vehicle transaction. For example, in some embodiments, a vehicle provider identifier is extracted from the customized onboarding link and utilized to configure one or more custom images, text elements, and/or the like included in the user onboarding interface. Alternatively or additionally, in some embodiments the customized onboarding link includes vehicle provider information for use in configuring one or more interface element(s) of the user onboarding interface. The user onboarding interface may be branded to identify the vehicle provider, for example by including a dealer name, a dealer logo, dealer colors, and/or the like. Additionally or alternatively still, in some embodiments, the user onboarding interface includes one or more user information inputs that enable a user of the user device (e.g., the customer) to enter user-submitted user information. Non-limiting examples of user information inputs include text field input elements for entering a customer first name, a customer last name, a customer email address, a customer username, a customer password, a customer phone number, and/or the like. In some embodiments, one or more of the user information inputs includes pre-filled data based on the vehicle acquisition data. For example, in some embodiments, data values for prefilling one or more of the user information inputs is extracted from the customized onboarding link.

At operation 1116, the user device (for example, via the user-facing vehicle service application 1160) initiates an API command to clear the data slug off of the subject data object, for example the vehicle data object, maintained by the vehicle service onboarding system. For example, in some embodiments, the API command to clear the data slug is initiated in response to submitting the user-inputted user information via the user onboarding interface. In some embodiments, the API command includes the data slug (or an identifier associated therewith) extracted from the customized onboarding link for purposes of identifying the subject data object such as the vehicle data object from which to remove the data slug. Additionally or alternatively, in some embodiments, the API command includes the user-submitted user information for use in updating the user data object associated with the subject data object such as the vehicle data object from which the slug is removed, claiming the user data object, and/or merging the user data object with an existing data object representing the user account for the customer. In some embodiments, the API command includes the user-submitted user information for use in filling in and/or otherwise completing onboarding of a user data object corresponding to the subject data object such as the vehicle data object being onboarded.

At operation 1118, the user device (for example, via the user-facing vehicle service application 1160) renders a vehicle details interface. In some embodiments, the vehicle details interface includes one or more vehicle data input elements that enables a user to input information associated with the vehicle represented by the vehicle data object (or other subject data object). For example, non-limiting examples of such vehicle data input elements include text data inputs that enable the customer to input a VIN, select a custom image for the vehicle data object, select a custom engine for the vehicle data object, select a custom color to associated with the vehicle data object, and/or select a background image and/or color for association with the vehicle data object.

At operation 1120, the user device (e.g., via the user-facing vehicle service application 1160) renders a home screen interface. In some such embodiments, the home screen interface includes various interface elements for accessing and/or initiating various vehicle service application functionality. In some embodiments, the accessible vehicle service application functionality is performable associated with at least the subject data object (e.g., the vehicle data object) for which onboarding was completed. For example, in a circumstance where the customer completes onboarding associated with a newly obtained vehicle, vehicle service application functionality may be accessible associated with the new vehicle data object representing the newly obtained vehicle.

FIGS. 12-13 depict example images of a customer device display rendering interfaces associated with the onboarding process. For example, FIG. 12 illustrates a display rendering an interface of a user SMS app that includes a customized onboarding message with a welcome message and a customized onboarding link for automatically initiating the onboarding process. FIG. 13 depicts an example outcome from selecting the customized onboarding link of FIG. 12, which includes opening a native user-facing vehicle service application that enables the user to add basic account information which will then be saved as part of a user data object and the vehicle whose purchase triggered the customized onboarding message will be associated with the user data object. As described herein, in some embodiments, any field shown in FIG. 13 may be pre-populated with information that the vehicle service application system (including the vehicle service application onboarding system) has received and/or stored. As also depicted in FIG. 13, the customer is given the opportunity to "Login" to an existing account associated with a user data object which may then link the purchased vehicle (via the associated vehicle data object) with any other vehicles owned or controlled by the customer.

Example Vehicle Service Application

Non-limiting examples of a vehicle service application, including user-facing vehicle service applications will now be described. As described herein, the vehicle service application may provide various functions and capabilities associated with a customer's vehicle ownership, protection, and maintenance, including, but not limited to, tracking vehicle operation and maintenance data, tracking and maintaining protection program data, communicating with third party systems to facilitate maintenance and repair of the vehicle. Data associated with the vehicle service application may link with and/or be included in the vehicle data objects (or other subject data objects in other contexts) and/or user data objects. Additional embodiments of features, functions, processes, apparatuses, and systems associated with an example vehicle service application are described in U.S. Patent Publication No. 2020/0234515A1, filed Jan. 23, 2020, and entitled "Methods, Apparatuses, And Systems For Monitoring And Maintaining Vehicle Condition", which application is hereby incorporated by reference herein in its entirety.

FIGS. 14-36 include example interfaces from a vehicle service application. The depicted embodiments of FIG. 14-36 include interfaces of a native user-facing vehicle; however, one of ordinary skill in the art will appreciate, in light of the present disclosure, that other variations of the vehicle service application may be configured to render similar interfaces. Unless explicitly stated otherwise, each depicted interface may be used separately or in conjunction with one or more other interface, some of which are depicted herein. Individual interface that are described as preceding, following, or otherwise linking to others need not be present in every embodiment. The depicted interfaces are configured to be rendered on one or more displays associated with one or more apparatuses as part of one or more systems according to any of the embodiments described herein.

Figure 14:
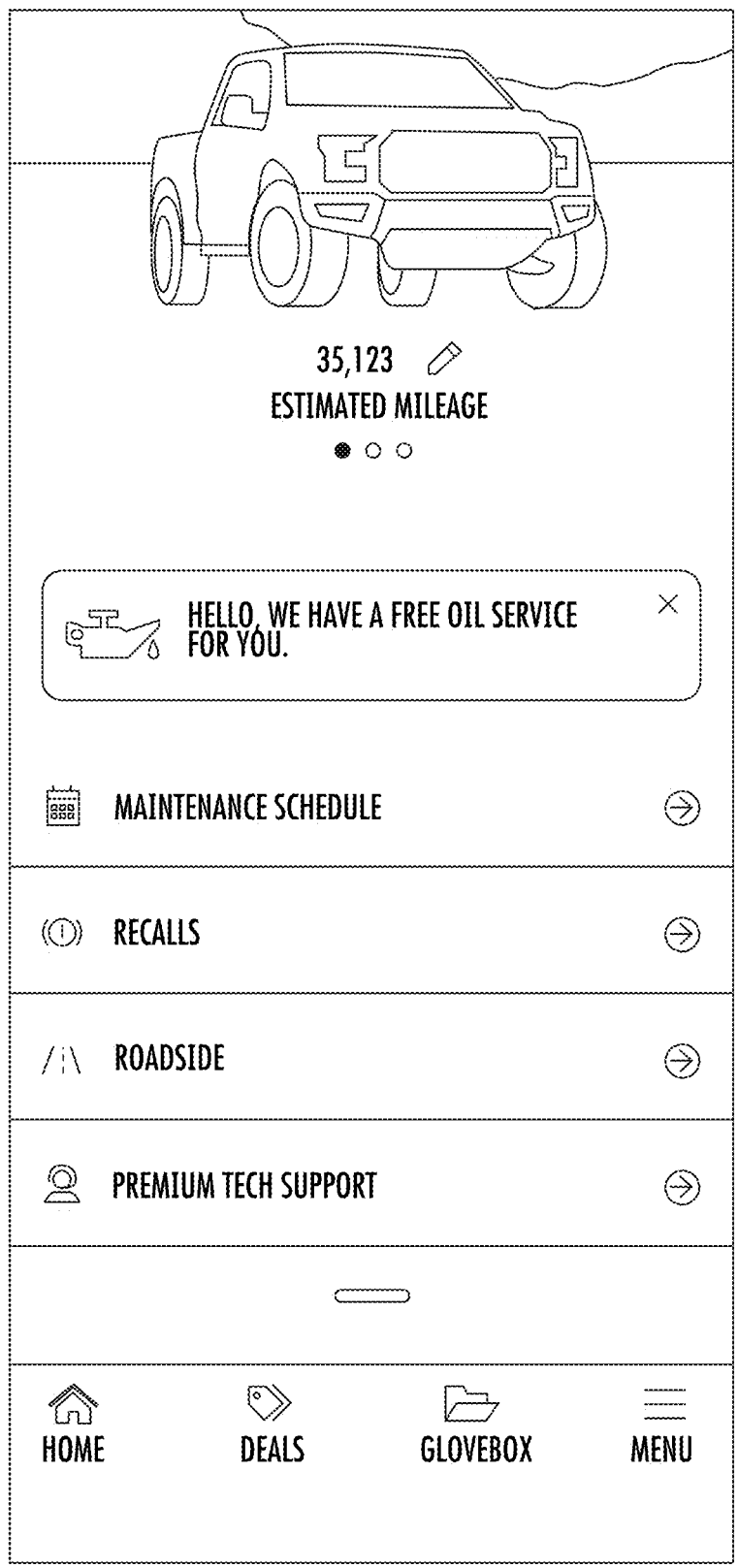

FIG. 14 depicts an embodiment of a home screen for a native user-facing vehicle service application. In the depicted embodiment, the interface includes a representative image of the vehicle and the vehicle's mileage. The interface displays a pop-up offering a free oil service promotion associated with one or more third party service providers, which may be displayed based on the relevance to the user. The depicted interface further comprises menu items including a Maintenance Schedule icon, which displays the recommended maintenance schedule for the vehicle when selected; a Recalls icon, which displays any active and/or completed vehicle recalls when selected; a Roadside icon, which can facilitate connecting the customer to a roadside assistance service when selected; and a Premium Tech Support icon, which can facilitate connecting the customer to a customer service representative when selected. The depicted interface further includes a home row of icons, including Home, Deals, Glovebox, and Menu icons, and a shortcuts slider is disposed between the home row and Premium Tech Support icon which may be slid upwardly to display any one or more shortcut functions selected by the user, the vehicle provider, and/or the vehicle service application provider.

Figure 15:
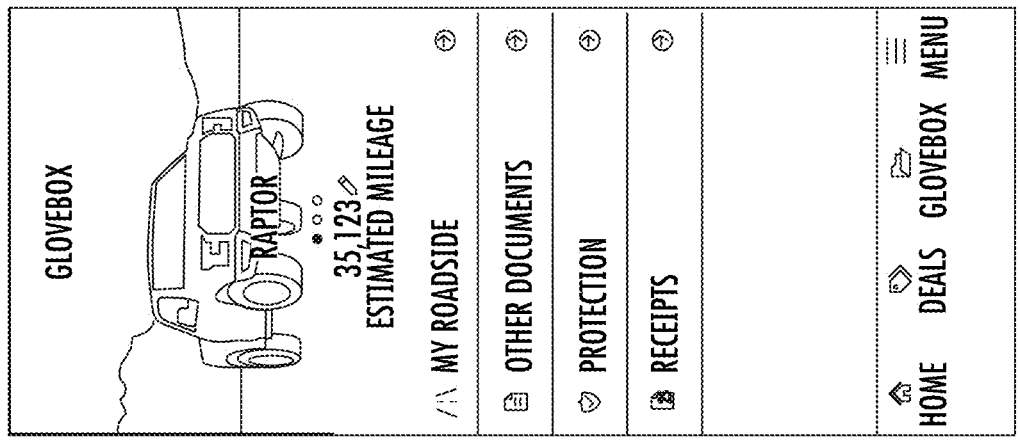

FIG. 15 depicts an embodiment of a Glovebox interface for a native user-facing vehicle service application, which may be displayed when the Glovebox icon (e.g., the Glovebox icon shown in FIG. 14) is selected. The depicted interface comprises menu items including a My Roadside icon, an Other Documents icon, a Protection icon, and a Receipts icon.

Figure 16:
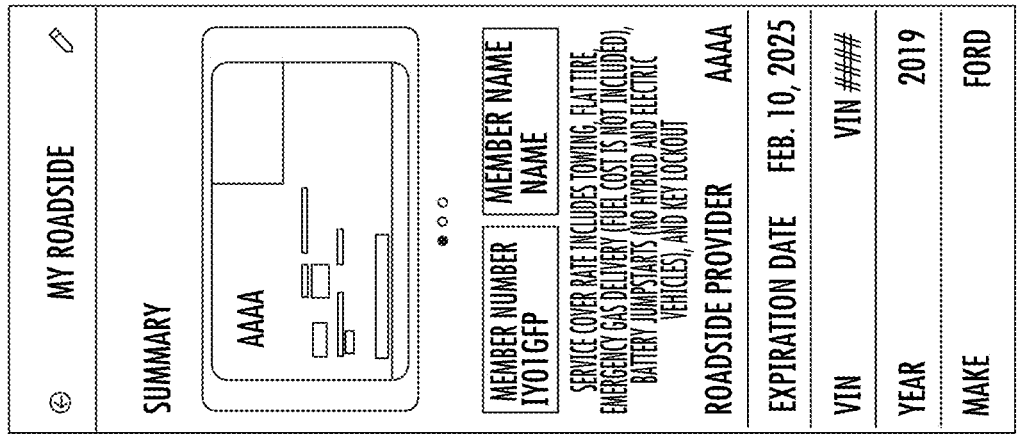

With reference to FIG. 16, an embodiment of a My Roadside interface is shown which includes icons and data that may be displayed upon selection of the My Roadside icon of FIG. 15. The My Roadside interface may include any information related to the customer's roadside assistance service and membership details for quick recall and for quickly connecting the customer to the roadside assistance service if needed. Each of the features and functionalities of the vehicle service application, including the "My Roadside" and other Glovebox features, may be populated by and/or linked to third party systems, such as in the case of multiple providers seeking to engage the same customer as described herein. For example, the vehicle service application system may receive and/or retrieve (e.g., in response to prompting by the user or indication of an account associated with the user) data associated with a third party roadside service provider account and provide and/or link to information associated with the customer's roadside service provider account within the My Roadside section of the Glovebox. Similar systems and processes may be implemented for any of the Glovebox features or other features and functionalities described herein.

Figure 17:
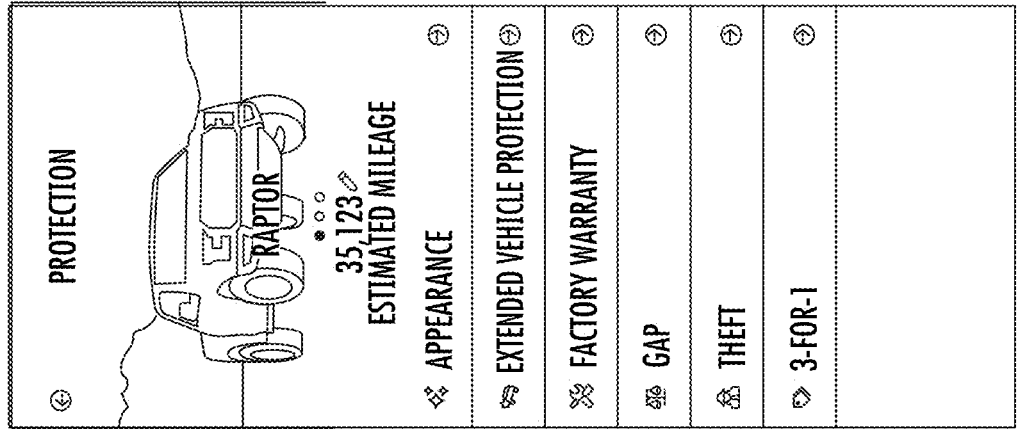

FIG. 17 depicts a Protection interface, which displays a plurality of protection products associated with the customer. For example, the depicted protection product menu items include an Appearance protection product; an Extended Vehicle Protection protection product; a Factory Warranty protection product; a GAP protection product; a Theft protection product; and a 3-for-1 protection product. Each menu item of the Protection interface may facilitate the display of information and/or the provision of services and functionality related to each of the respective protection products.

FIGS. 18-20 depict example Receipt interfaces, which may be reached via the Receipt icon in the Glovebox interface described above with respect to FIG. 15. In the depicted embodiment, the interface shown in FIG. 18 may be displayed that includes a chronological listing of previous receipts associated with the vehicle, such as receipts from maintenance, gas, protection product, or other transactions associated with the vehicle. The interface of FIG. 18 further includes an "Add Receipt" icon which then initiates the acquisition of a new customer receipt as shown in FIGS. 19-20. In FIG. 19, the customer is permitted to add an image of the receipt, which may be captured directly through the vehicle service application or loaded from memory in the customer's device. The interface of FIG. 19 also permits the user to categorize the type of the receipt and enter any relevant notes for future recall. With reference to FIG. 20, an example of a saved receipt is shown.

Figure 22:
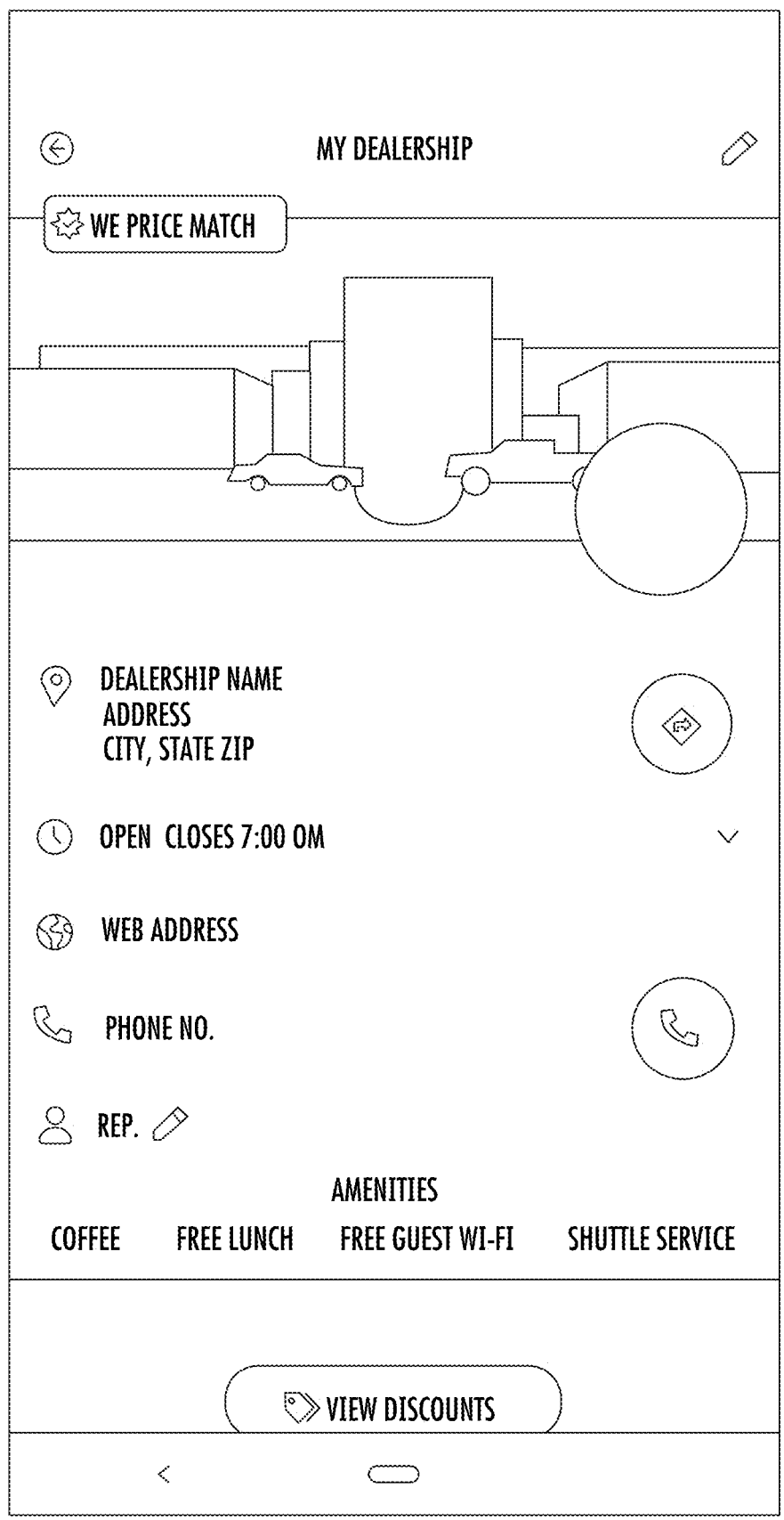

FIG. 22 depicts an example My Dealership page, showing the relevant information associated with the customer's primary dealership. In some embodiments, the onboarding process described herein may comprise selecting the vehicle provider at which the vehicle was purchased as the default My Dealership contact. The vehicle acquisition data may optionally include information identifying the vehicle provider.

FIG. 21 depicts an example primary page Windshield protection product interface that may be accessed, for example, via the Protection interface described above with respect to FIG. 17. FIGS. 23-34 depict interfaces associated with submitting one or more claims under the Windshield protection product. Although Windshield protection product interfaces are shown, the same or similar interfaces may be used for any protection product associated with the vehicle. In some embodiments, the vehicle service application may connect the customer to a protection product provider system for provision of one or more functions and features associated with a given protection product (e.g., submitting a claim).

For example, FIG. 23 depicts an initial claim page that may appear once the "claim" tab is selected on the primary page of the protection product. FIG. 24 depicts a request for the mileage of the vehicle associated with the claim. With reference to FIGS. 24 and 31, the customer may manually input the mileage and/or capture an image of the odometer reading to facilitate the claims process. FIG. 25 allows the user to classify the type of damage via intuitive image options. The depicted images include a crack or chip to the windshield, and one of ordinary skill in the art will appreciate, in light of the present disclosure, that the images may be replaced with any relevant type of damage for a given protection product. With reference to FIG. 30, in some embodiments, the customer will be requested to select the location of the damage before or after classifying the type of damage depending upon the protection product. The claim process may collect the claim data in any order prior to facilitating repair of the vehicle.

FIGS. 26-29 depict the process of scheduling a repair for the vehicle after the initial claim information has been entered. In some embodiments, the claim may be approved prior to scheduling the repair. In some embodiments, the claim data may be entirely collected within the vehicle service application and then transmitted as a package to the provider of the protection product for which the claim was selected. In some embodiments, the vehicle service application provider may also be the provider of one or more protection products. With reference to FIG. 26, an overview is provided to the user explaining the details of the damage and/or repair process. FIG. 27 allows the user to select the default repair location (e.g., the vehicle provider) or modify their repair provider. FIGS. 32-34 depict embodiments for automatically and manually detecting the location of the vehicle based on the position data provided by the customer device (e.g., via an API providing position data from cellular and/or GPS positioning systems). When a user is with the vehicle, the user's location may serve as a proxy for the vehicle location for determining if the vehicle is sufficiently close to the default repair location (e.g., within a predetermined, configurable distance, such as 40 miles) to send the user to the default repair location (see FIG. 32). If the user is not with the vehicle, the user may manually enter the vehicle location (see FIG. 33). If a new repair location is needed or desired by the customer, a maps interface may be displayed that allows the customer to browse and select from nearby repair providers. In some embodiments, a promotion system may link with the maps interface to provide recommendations and/or coupons or other promotions associated with nearby repair providers. In some embodiments, as shown in FIG. 34, the map may allow the customer to sort by all repair providers or a list of preferred repair providers selected by the customer or the vehicle service application provider. With reference to FIG. 28, in some embodiments, the customer may request a repair provider come to a selected location to pick up the vehicle and/or perform the repairs. Once the repair location and information are complete, an interface may be displayed that includes a confirmation of the vehicle, repair, and/or policy information (see FIG. 29).

FIG. 35 depicts a vehicle share/transfer screen which may operate with any of the embodiments disclosed herein. The depicted interface permits a user to share, assign (e.g., transfer), or otherwise associate the vehicle data object associated with a vehicle with one or more other user data object(s) and/or identifier(s) that may be used to onboard a new user data object. The assignment of a vehicle data object may occur, for example, when the vehicle is resold or lent to a third party. In some such embodiments, a vehicle data object is associated with a new user data object and disassociated with the user data object initiating the transfer. In some embodiments, the new owner of the vehicle may undertake an onboarding process according to the embodiments described herein, with the original owner serving as the vehicle provider. When transferred, the vehicle data object may retain the data associated with the vehicle and at least any data that is customer agnostic, such that the new owner may receive the entire vehicle service application record associated with the vehicle without any additional effort or loss of information. Similarly, the "Share" option may allow a customer to share some or all information associated with the vehicle with a contact. The contact may be associated with an existing user data object (e.g., associated with user information having an identifier for transmitting data message(s) to the contact, such as an email or a telephone number) or may be associated with one or more identifier(s) utilized for transmitting a message to a user device associated with the contact, for example an onboarding message for automatically provisioning a user data object associated with the vehicle data object being shared.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML, page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Non-Limiting Example Embodiments of the Disclosure

Having described various aspects of the innovations, it will be appreciated that various embodiments are described herein. The subject matter described herein includes, without limitation, the following specific embodiments. These embodiments are merely examples and should not be construed as limiting the scope of the disclosure. It will be appreciated that the embodiments in some aspects are freely combinable. In other aspects of the present disclosure, each embodiment is independent from other embodiments described.

Embodiment 1. A computer-implemented method comprising:
  receiving, at a service onboarding system from a provider system, acquisition data comprising subject information and customer information associated with a customer, the customer information comprising at least user communication channel data usable for transmitting information to a user device associated with the customer;
  generating, at the service onboarding system, a subject data object comprising at least a portion of the subject information, wherein the subject data object associated with an indication of pending onboarding;
  attempting initiation of a custom onboarding message to be accessed by the user device associated with the customer;
  receiving, at the service onboarding system, an indication that the customer accessed the custom onboarding message via the user device, the indication associated with a user data object for the customer; and updating, at the service onboarding system, data associated with the subject data object to indicate completion of onboarding.

Embodiment 2. The computer-implemented method according to Embodiment 1, further comprising:
in response to determining a first communication channel associated with the user communication channel data is currently inaccessible:
generating a machine-readable symbology associated with the subject data object; and
transmitting, from the service onboarding system to the provider system via a second communication channel, the custom onboarding message comprising the machine-readable symbology to be presented via the provider system,
wherein the indication that the customer accessed the custom onboarding message is received in response to the user device scanning the machine-readable symbology.

Embodiment 3. The computer-implemented method according to any one of the Embodiments 1-2, further comprising:
in response to determining a first communication channel associated with the user communication channel data is currently inaccessible:
generating a machine-readable symbology associated with the subject data object; and
transmitting, from the service onboarding system to the provider system via a second communication channel, the custom onboarding message comprising the machine-readable symbology to be presented via the provider system,
wherein the indication that the customer accessed the custom onboarding message is received in response to the user device scanning the machine-readable symbology.

Embodiment 4. The computer-implemented method according to any one of Embodiments 1-3, wherein the machine-readable symbology is presented via the provider system by causing the provider system to render a user interface comprising the machine-readable symbology.

Embodiment 5. The computer-implemented method according to any one of Embodiments 1-4, wherein the machine-readable symbology is presented via the provider system by causing the provider system to render a user interface comprising the machine-readable symbology.

Embodiment 6. The computer-implemented method according to any one of Embodiments 1-5, wherein the machine-readable symbology is presented via the provider system by causing the provider system to render a user interface comprising the machine-readable symbology.

Embodiment 7. The computer-implemented method according to any one of Embodiments 1-6, wherein the machine-readable symbology is presented via the provider system by causing the provider system to print a physical medium comprising the machine-readable symbology.

Embodiment 8. The computer-implemented method according to any one of Embodiments 1-7, further comprising:
generating a customized onboarding link associated with the subject data object; and
in response to determining a communication channel associated with the user communication channel data is currently accessible, transmitting, from the service onboarding system to the user device via the communication channel, the custom onboarding message comprising customized onboarding link associated with the subject data object,
wherein the indication that the customer accessed the custom onboarding message is received in response to customer interaction with the customized onboarding link via the user device.

Embodiment 9. The computer-implemented method according to any one of Embodiments 1-8, wherein the user communication channel data comprises a mobile phone number and the communication channel comprises a cellular communication channel associated with the mobile phone number, and wherein the custom onboarding message comprises a cellular communication message comprising the customized onboarding link.

Embodiment 10. The computer-implemented method according to any one of Embodiments 1-9, further comprising:
causing rendering, via the user device in response to receiving the indication that the customer accessed the custom onboarding message via the user device, of a user onboarding interface comprising a set of customer information input fields.

Embodiment 11. The computer-implemented method according to any one of Embodiments 1-10, wherein at least one of the set of customer information input fields automatically filled based on the customer information received from the service onboarding system.

Embodiment 12. The computer-implemented method according to any one of the Embodiments 1-11, wherein at least one of the set of customer information input fields automatically filled based on the customer information received from the service onboarding system.

Embodiment 13. The computer-implemented method according to any one of the Embodiments 1-12, wherein accessing the custom onboarding message causes the user device to:
determine whether a service application associated with the service onboarding system is installed to the user device;
in a circumstance where the service application is determined not to be installed to the user device, access at least one application distribution platform to install the service application to the user device; and
in a circumstance where the service application is determined to be installed to the user device, initiating the service application based on the subject data object.

Embodiment 14. The computer-implemented method according to any one of the Embodiments 1-13, wherein accessing the custom onboarding message causes the user device to:
determine whether a service application associated with the service onboarding system is installed to the user device;
in a circumstance where the service application is determined not to be installed to the user device, access at least one application distribution platform to install the service application to the user device; and
in a circumstance where the service application is determined to be installed to the user device, initiating the service application based on the subject data object.

Embodiment 15. The computer-implemented method according to any one of the Embodiments 1-14, wherein accessing the custom onboarding message causes the user device to:

initiate a web-based service application associated with the service onboarding system, wherein the web-based service application is initiated based on the subject data object.

Embodiment 16. The computer-implemented method according to any one of the Embodiments 1-15, wherein the subject data object is associated with a data slug indicating the user data object associated with the subject data object is pending onboarding, and wherein updating the data associated with the user data object to indicate has been fully onboarded comprises:

disassociating the subject data object and the data slug.

Embodiment 17. The computer-implemented method according to any one of the Embodiments 1-16, wherein the service onboarding system and the provider system communicate via a first set of application programming interfaces, and the service onboarding system and the user device communicate via a second set of application programming interfaces.

Embodiment 18. A computer-implemented method, which may be performed independently or in combination with one or more embodiments herein, including and without limitation in combination with any one of the Embodiments 1-17 further comprising:

receiving captured data associated with a subject represented by the subject data object generating the subject data object in response to receiving the captured data associated with the subject; and attempting initiation of the custom onboarding message in response to generating the subject data object.

Embodiment 19. A computer-implemented method, which may be performed independently or in combination with one or more embodiments herein, including and without limitation in combination with any one of Embodiments 1-18, the method comprising:

receiving and storing captured data associated with a subject represented by the subject data object;

providing access to the captured data to all user data objects associated with the subject data object via a virtual glovebox interface; and attempting initiation of the custom onboarding message in response to generating the subject data object.

Embodiment 20. A computer-implemented method, which may be performed independently or in combination with one or more embodiments herein, including and without limitation in combination with any one of Embodiments 1-19 the method comprising:

receiving captured data associated with a subject represented by the subject data object;

processing the captured data to identify at least one updated data value associated with the subject data object; and updating at least one data property associated with the subject data object based at least in part on the at least one updated data value.

Embodiment 21. A computer-implemented method, which may be performed independently or in combination with one or more embodiments herein, including and without limitation in combination with any one of Embodiments 1-20 the method comprising:

receiving and storing captured data associated with a subject represented by the subject data object;

transmitting at least a portion of the captured data to at least one external service system to cause the external service system to initiate a process for generating service offer data associated with the subject represented by the subject data object based at least in part on at least the portion of captured data;

receiving, from the at least one external service system in response to the transmission of at least the portion of the captured data, the offer data associated with the subject; and causing rendering of a user interface configured based at least in part on the offer data to the user device associated with the customer or a second user device associated with the customer.

Embodiment 22. A computer-implemented method, which may be performed independently or in combination with one or more embodiments herein, including and without limitation in combination with any one of Embodiments 1-21 the method comprising:

receiving, by the vehicle service application, an indication of a third-party service to be initiated;

identifying, by the vehicle service application, an external system corresponding to the third-party service to be initiated; and initiating, by the vehicle service application, a process associated with the third-party service via the external system.

Embodiment 23. A computer-implemented method, which may be performed independently or in combination with one or more embodiments herein, including and without limitation in combination with any one of Embodiments 1-22 the method comprising:

receiving captured image data;

generating computer-readable image data by processing the captured image data utilizing a character recognition algorithm;

extracting, from the computer-readable image data, at least one identifier associated with the user data object or the subject data object;

based at least in part on the at least one identifier, associating at least a portion of the captured image data or at least a portion of the computer-readable image data with the user data object or the subject data object;

processing the captured data to identify at least one updated data value associated with the subject data object; and updating at least one data property associated with the subject data object based at least in part on the at least one updated data value.

Embodiment 24. A computer-implemented method, which may be performed independently or in combination with one or more embodiments herein, including and without limitation in combination with any one of Embodiments 1-23 the method comprising:

accessing an external communication application identifier via an external communication application, the external communication application identifier associated with the subject data object;

receiving, via the external communication application, communication data associated with the via the external communication application identifier;

extracting, from the communication data, updated subject information associated with the subject data object; and storing the updated subject information associated with the subject data object.

Embodiment 25. A computer-implemented method, which may be performed independently or in combination with one or more embodiments herein, including and without limitation in combination with any one of Embodiments 1-24 the method comprising:

determining at least one subject identifier associated with the subject data object;

querying a plurality of external service systems based at least in part on the at least one subject identifier associated with the subject data object;

receiving, in response to querying the plurality of external service systems, a portion of subject information associated with the subject data object from each of the plurality of external service systems;

generating updated vehicle information by synthesizing each portion of subject information associated with the subject data object; and storing the updated vehicle information associated with the subject data object.

Embodiment 26. A computer-implemented method, which may be performed independently or in combination with one or more embodiments herein, including and without limitation in combination with any one of Embodiments 1-25 the method comprising:

wherein the subject data object comprises a vehicle data object, receiving subject information associated with the vehicle data object from an external system comprising aggregated subject information from one or more systems onboard a subject represented by the subject data object;

triggering an alert based at least in part on the subject data object, the alert indicating a recommendation for servicing of the subject data object; and causing rendering of at least one alert interface based at least in part on the triggered alert, the at least one alert interface rendered via the user device or another user device associated with the user data object.

Embodiment 27. A computer-implemented method, which may be performed independently or in combination with one or more embodiments herein, including and without limitation in combination with any one of Embodiments 1-26 the method comprising:

receiving an indication of a second user data object to which the subject data object is to be associated; and associating the subject data object with the second user data object, such that the second user data object is provided access to data associated with the subject data object and can store new data associated with the subject data object.

Embodiment 28. A computer-implemented method, which may be performed independently or in combination with one or more embodiments herein, including and without limitation in combination with any one of Embodiments 1-27 the method comprising:

receiving, in response to user interaction from a second user associated with a second user data object, an indication that the subject data object is to be shared with the consumer, wherein the initiation of the custom onboarding message is attempted in response to receiving the indication that the subject data object is to be shared with the consumer.

Embodiment 29. A computer-implemented method, which may be performed independently or in combination with one or more embodiments herein, including and without limitation in combination with any one of Embodiments 1-28 the method comprising:

disassociating the subject data object with the second user data object

Embodiment 30. A computer-implemented method, which may be performed independently or in combination with one or more embodiments herein, including and without limitation in combination with any one of Embodiments 1-29 the method comprising:

receiving, from a first client device associated with a first user data object, first new subject information associated with the subject data object;

receiving, from a second client device associated with a second user data object, second new subject information associated with the subject data object;

generating merged subject information by resolving at least one data conflict between the first new subject information and the second new subject information; and storing the merged subject information associated with the subject data object Embodiment 31. A computer-implemented method, which may be performed independently or in combination with one or more embodiments herein, including and without limitation in combination with any one of Embodiments 1-30 the method comprising:

causing rendering of a provider user interface to a provider user device associated with a vehicle provider system, the provider user interface enabling input of offer data for the subject data object; and receiving an indication that the consumer accepted the offer data, and wherein initiation of the custom onboarding message is attempted in response to receiving the indication that the consumer accepted the offer data.

Embodiment 32. A computer-implemented method, which may be performed independently or in combination with one or more embodiments herein, including and without limitation in combination with any one of Embodiments 1-31 the method comprising:

receiving a file data object including a plurality of customer information associated with a plurality of customers; and batch generating and attempting initiation of a plurality of custom onboarding messages, the plurality of custom onboarding messages including a custom onboarding message for each particular customer of the plurality of customers Embodiment 33. A computer-implemented method, which may be performed independently or in combination with one or more embodiments herein, including and without limitation in combination with any one of Embodiments 1-32 the method comprising:

receiving, from the provider system, at least one file data object comprising the customer information;

extracting the customer information from the at least one file data object;

determining the customer information is not currently associated with any existing user data object, wherein initiation of the custom onboarding message is attempted in response to determining the customer information is not currently associated with any existing user data object.

Embodiment 34. A computer-implemented method, which may be performed independently or in combination with one or more embodiments herein, including and without limitation in combination with any one of Embodiments 1-33 the method comprising:

receiving, from a support system, the customer information in response to a support session established between the user device and the support system; and determining the customer information is not currently associated with any existing user data object, wherein initiation of the custom onboarding message is attempted in response to determining the customer information is not currently associated with any existing user data object.

Embodiment 35. A computer-implemented method, which may be performed independently or in combination with one or more embodiments herein, including and without limitation in combination with any one of Embodiments 1-34 the method comprising:
- causing rendering of a technical support interface to a support user device of a support system associated with a technical support representative; and
- receiving, in response to user input via the technical support interface, the customer information;
- determining the customer information is not currently associated with any existing user data object, wherein initiation of the custom onboarding message is attempted in response to determining the customer information is not currently associated with any existing user data object.

Embodiment 36. A computer-implemented method, which may be performed independently or in combination with one or more embodiments herein, including and without limitation in combination with any one of Embodiments 1-35 the method comprising:
- identifying initiation of a claim associated with the subject data object, wherein initiation of the custom onboarding message is attempted in response to determining the customer information is not currently associated with any existing user data object.

Embodiment 37. A computer-implemented method, which may be performed independently or in combination with one or more embodiments herein, including and without limitation in combination with any one of Embodiments 1-36 the method comprising:
- initiating a process enabling capture of an image data object or a video data object via a camera for association with the subject data object or the user data object; and
- in response to capturing the image data object or the video data object: storing the captured image data object or the captured video data object associated with the subject data object.

Embodiment 38. The computer-implemented method according to any one of Embodiments 1-37 wherein the user device accesses a user-facing service application, and the computer-implemented method further comprising:
- storing one or more user interactions with the user-facing service application;
- determining, based at least in part on the one or more user interactions, at least one external entity with which the consumer is likely to engage; and
- generating at least one user interface comprising at least one interface element indicating the at least one external entity with which the consumer is likely to engage Embodiment 39. A computer-implemented method, which may be performed independently or in combination with one or more embodiments herein, including and without limitation in combination with any one of Embodiments 1-38 the method comprising:
- identifying initiation of a claim associated with the subject data object;
- automatically generating a claim notification message in response to initiation of the claim associated with the subject data object;
- identifying at least one external system associated with the subject data object; and
- automatically transmitting the claim notification message to the at least one external system associated with the subject data object.

Embodiment 39. An apparatus comprising at least one processor and at least one memory having computer-coded instructions stored thereon, wherein the computer-coded instructions in execution with the at least one processor cause the apparatus to perform the computer-implemented method of any one of Embodiments 1-38.

Embodiment 40. An apparatus comprising means for performing each step of the computer-implemented method of any one of Embodiments 1-38.

Embodiment 41. A computer program product comprising at least one non-transitory computer-readable storage medium having computer program code stored thereon, wherein the computer program code in execution with at least one processor is configured for performing the computer-implemented method of any one of Embodiments 1-38.

Embodiment 42. A system comprising at least one computing device communicable with one another to perform the computer-implemented method of any one of Embodiments 1-38.

Embodiment 43. The system according to Embodiment 42, wherein the system comprises a vehicle service onboarding system and a vehicle provider system.

Embodiment 44. The system according to any one of Embodiments 41-42, the system further comprising a vehicle service application system.

Embodiment 45. The system according to any one of Embodiments 41-43, the system further comprising a user device.

Embodiment 46. The system according to any one of Embodiments 41-44, the system further comprising at least one external service system.

Embodiment 47. A computer-implemented method comprising:
- receiving, from a provider system, acquisition data comprising subject information and customer information associated with a customer;
- generating a subject data object comprising at least a portion of the subject information;
- associating the subject data object with a user data object generated comprising at least a portion of the customer information associated with the customer, wherein the subject data object is associated with an indication of pending onboarding;
- generating a machine-readable symbology associated with the subject data object;
- transmitting, to the provider system, a request to present a custom onboarding message comprising the machine-readable symbology;
- receiving an indication that the customer accessed the custom onboarding message via a user device; and
- updating data associated with the user data object to indicate has been fully onboarded.

Embodiment 48. An apparatus comprising at least one processor and at least one memory having computer-coded instructions stored thereon, wherein the computer-coded instructions in execution with the at least one processor cause the apparatus to perform the computer-implemented method of Embodiment 47.

Embodiment 49. An apparatus comprising means for performing each step of the computer-implemented method of Embodiment 47.

Embodiment 50. A computer program product comprising at least one non-transitory computer-readable storage medium having computer program code stored thereon, wherein the computer program code in execution with at least one processor is configured for performing the computer-implemented method of Embodiment 47.

Embodiment 51. A computer-implemented method comprising:
receiving, at a user device, a custom onboarding message via the user device, the custom onboarding message associated with a subject data object maintained by a service onboarding system;
accessing the custom onboarding message via the user device;
in response to accessing the custom onboarding message, rendering, via the user device, a user onboarding interface comprising a set of customer information input fields; and
in response to user input via the user onboarding interface, submitting user-inputted onboarding information to the service onboarding system to cause the service onboarding system to configure a user data object associated with the subject data object based on the user-inputted onboarding information.

Embodiment 52. An apparatus comprising at least one processor and at least one memory having computer-coded instructions stored thereon, wherein the computer-coded instructions in execution with the at least one processor cause the apparatus to perform the computer-implemented method of Embodiment 51.

Embodiment 53. An apparatus comprising means for performing each step of the computer-implemented method of Embodiment 51.

Embodiment 54. A computer program product comprising at least one non-transitory computer-readable storage medium having computer program code stored thereon, wherein the computer program code in execution with at least one processor is configured for performing the computer-implemented method of Embodiment 51.

Embodiment 55. A computer-implemented method comprising:
receiving, at a service onboarding system from a provider system, acquisition data comprising subject information;
generating, at the service onboarding system, a subject data object comprising at least a portion of the subject information, wherein the subject data object associated with an indication of pending onboarding;
generating a machine-readable symbology associated with the subject data object;
transmitting, from the service onboarding system to the provider system, the custom onboarding message comprising the machine-readable symbology to be presented via the provider system;
receiving, at the service onboarding system, an indication that the customer accessed the custom onboarding message via the user device, the indication associated with a user data object for the customer; and
updating, at the service onboarding system, data associated with the subject data object to indicate completion of onboarding.

Embodiment 56. An apparatus comprising at least one processor and at least one memory having computer-coded instructions stored thereon, wherein the computer-coded instructions in execution with the at least one processor cause the apparatus to perform the computer-implemented method of Embodiment 55.

Embodiment 57. An apparatus comprising means for performing each step of the computer-implemented method of Embodiment 55.

Embodiment 58. A computer program product comprising at least one non-transitory computer-readable storage medium having computer program code stored thereon, wherein the computer program code in execution with at least one processor is configured for performing the computer-implemented method of Embodiment 55.

The invention claimed is:

1. A computer-implemented method for pre-onboarding user access control to subject information, the computer-implemented method comprising:
receiving, at a service onboarding system from a provider system, acquisition data comprising:
(i) the subject information associated with a subject; and
(ii) customer information associated with a customer, the customer information comprising at least user communication channel data usable for transmitting information to a user device that is associated with the customer;
generating, at the service onboarding system, a subject data object comprising at least a portion of the subject information, wherein the subject data object is associated with an indication of pending onboarding;
receiving telematics data including diagnostic data directly or indirectly from the subject;
associating the telematics data with the subject data object;
attempting transmission of a custom onboarding message to the user device associated with the customer, wherein the transmission of the custom onboarding message is attempted to be transmitted via a first communication channel that is associated with the user communication channel data, wherein the custom onboarding message comprises a customized onboarding hyperlink;
causing rendering of a graphical user interface at the user device in response to receiving a first indication triggered by interaction with the customized onboarding hyperlink via the user device without further authentication of a user of the user device;
causing the graphical user interface to display at least a portion of the telematics data on the user device while the subject data object is pending onboarding, such that the acquisition data is configured to facilitate access to the telematics data on the user device while the subject data object is pending onboarding;
receiving, at the service onboarding system following displaying at least the portion of the telematics data on the user device, a second indication via the graphical user interface at the user device, wherein the second indication is associated with a user data object for the customer; and
updating, at the service onboarding system, data associated with the subject data object to remove the indication of pending onboarding to indicate completion of onboarding after receiving the second indication.

2. The computer-implemented method according to claim 1, further comprising:
in response to determining the first communication channel associated with the user communication channel data is currently inaccessible:
generating a machine-readable symbology associated with the subject data object; and transmitting, from the service onboarding system to the provider system via a second communication channel, the custom onboarding message comprising the machine-readable symbology to be presented via the provider system, wherein the first indication triggered by interaction with the customized onboarding hyperlink is received in response to the user device scanning the machine-readable symbology.

3. The computer-implemented method according to claim 2, wherein the machine-readable symbology is presented via the provider system by causing the provider system to render a user interface comprising the machine-readable symbology.

4. The computer-implemented method according to claim 2, wherein the machine-readable symbology is presented via the provider system by causing the provider system to print a physical medium comprising the machine-readable symbology.

5. The computer-implemented method according to claim 1, further comprising:
generating the customized onboarding hyperlink, wherein the customized onboarding hyperlink is associated with the subject data object; and
in response to determining the first communication channel that is associated with the user communication channel data is currently accessible, transmitting, from the service onboarding system to the user device via the communication channel, the custom onboarding message comprising the customized onboarding hyperlink associated with the subject data object,
wherein the first indication that is triggered by interaction with the customized onboarding hyperlink via the user device is received by the service onboarding system in response to customer interaction with the customized onboarding hyperlink via the user device.

6. The computer-implemented method according to claim 5, wherein the user communication channel data comprises a mobile phone number and the first communication channel comprises a cellular communication channel associated with the mobile phone number, and wherein the custom onboarding message comprises a cellular communication message comprising the customized onboarding hyperlink.

7. The computer-implemented method according to claim 1, further comprising:
causing rendering, via the user device in response to receiving the second indication, of a user onboarding interface comprising a set of customer information input fields.

8. The computer-implemented method according to claim 7, wherein at least one of the set of customer information input fields is automatically filled based on the customer information received from the service onboarding system.

9. The computer-implemented method according to claim 1, further comprising:
associating the subject data object with a provider based on the acquisition data received from the provider system.

10. The computer-implemented method according to claim 1, further comprising causing, in response to receiving the first indication triggered by interaction with the customized onboarding hyperlink, the user device to:
determine whether a service application associated with the service onboarding system is installed to the user device;
in a circumstance where the service application is determined not to be installed to the user device, access at least one application distribution platform to install the service application to the user device; and
in a circumstance where the service application is determined to be installed to the user device, initiating the service application based on the subject data object.

11. The computer-implemented method according to claim 1, further comprising causing, in response to receiving the first indication triggered by interaction with the customized onboarding hyperlink, the user device to:
initiate a web-based service application associated with the service onboarding system, wherein the web-based service application is initiated based on the subject data object.

12. The computer-implemented method according to claim 1, further comprising generating a data slug and associating the data slug with the subject data object to cause the subject data object to be associated with the indication of pending onboarding, wherein removing the indication of pending onboarding comprises removing the data slug following completion of onboarding.

13. The computer-implemented method according to claim 1, wherein the service onboarding system and the provider system communicate via a first set of application programming interfaces, and the service onboarding system and the user device communicate via a second set of application programming interfaces.

14. An apparatus for pre-onboarding user access control to subject information, the apparatus comprising at least one processor and at least one non-transitory memory, the at least one non-transitory memory having computer-coded instructions stored thereon, the computer-coded instructions in execution with the at least one processor configured to:
receive, from a provider system, acquisition data comprising:
(i) the subject information associated with a subject; and
(ii) customer information associated with a customer, the customer information comprising at least user communication channel data usable for transmitting information to a user device that is associated with the customer;
generate a subject data object comprising at least a portion of the subject information, wherein the subject data object is associated with an indication of pending onboarding;
receive telematics data including diagnostic data directly or indirectly from the subject;
associating the telematics data with the subject data object;
attempt transmission of a custom onboarding message to the user device associated with the customer, wherein the transmission of the custom onboarding message is attempted to be transmitted via a first communication channel that is associated with the user communication channel data, wherein the custom onboarding message comprises a customized onboarding hyperlink;
cause rendering of a graphical user interface at the user device in response to a first indication triggered by interaction with the customized onboarding hyperlink via the user device without further authentication of a user of the user device;
cause the graphical user interface to display at least a portion of the telematics data on the user device while the subject data object is pending onboarding, such that the acquisition data is configured to facilitate access to the telematics data on the user device while the subject data object is pending onboarding;

receive following displaying at least the portion of the telematics data on the user device, a second indication via the graphical user interface at the user device, wherein the second indication is associated with a user data object for the customer; and update data associated with the subject data object to remove the indication of pending onboarding to indicate completion of onboarding after receiving the second indication.

15. The apparatus according to claim 14, further configured to:

in response to determining the first communication channel associated with the user communication channel data is currently inaccessible:

generate a machine-readable symbology associated with the subject data object; and transmit, to the provider system via a second communication channel, the custom onboarding message comprising the machine-readable symbology to be presented via the provider system, wherein the first indication triggered by interaction with the customized onboarding hyperlink is received in response to the user device scanning the machine-readable symbology.

16. The apparatus according to claim 15, wherein the machine-readable symbology is presented via the provider system by causing the provider system to render a user interface comprising the machine-readable symbology.

17. The apparatus according to claim 15, wherein the machine-readable symbology is presented via the provider system by causing the provider system to print a physical medium comprising the machine-readable symbology.

18. The apparatus according to claim 14, further configured to:

generate the customized onboarding hyperlink, wherein the customized onboarding hyperlink is associated with the subject data object; and in response to determining the first communication channel that is associated with the user communication channel data is currently accessible, transmit, to the user device via the communication channel, the custom onboarding message comprising the customized onboarding hyperlink associated with the subject data object, wherein the first indication that is triggered by interaction with the customized onboarding hyperlink via the user device is received by the service onboarding system in response to customer interaction with the customized onboarding hyperlink via the user device.

19. The apparatus according to claim 18, wherein the user communication channel data comprises a mobile phone number and the first communication channel comprises a cellular communication channel associated with the mobile phone number, and wherein the custom onboarding message comprises a cellular communication message comprising the customized onboarding hyperlink.

20. The apparatus according to claim 14, further configured to:

cause rendering, via the user device in response to receiving the second indication, of a user onboarding interface comprising a set of customer information input fields.

21. The apparatus according to claim 20, wherein at least one of the set of customer information input fields is automatically filled based on the customer information received from the apparatus.

22. The apparatus according to claim 14, further configured to:

associate the subject data object with a provider based on the acquisition data received from the provider system.

23. The apparatus according to claim 14, further configured to cause, in response to receiving the first indication triggered by interaction with the customized onboarding hyperlink, the user device to:

determine whether a service application associated with the apparatus is installed to the user device;

in a circumstance where the service application is determined not to be installed to the user device, access at least one application distribution platform to install the service application to the user device; and in a circumstance where the service application is determined to be installed to the user device, initiating the service application based on the subject data object.

24. The apparatus according to claim 14, further configured to cause, in response to receiving the first indication triggered by interaction with the customized onboarding hyperlink, the user device to:

initiate a web-based service application associated with the apparatus, wherein the web-based service application is initiated based on the subject data object.

25. The apparatus according to claim 14, further configured to generate a data slug and associate the data slug with the subject data object to cause the subject data object to be associated with the indication of pending onboarding, wherein removing the indication of pending onboarding comprises removing the data slug following completion of onboarding.

26. A computer program product for pre-onboarding user access control to subject information, the computer-implemented method, the computer program product comprising at least one non-transitory computer-readable storage medium, the at least one non-transitory computer-readable storage medium comprising computer program code configured, in execution with at least one processor, for:

receiving, from a provider system, acquisition data comprising:

(i) subject information associated with a subject; and (ii) customer information associated with a customer, the customer information comprising at least user communication channel data usable for transmitting information to a user device that is associated with the customer;

generating a subject data object comprising at least a portion of the subject information, wherein the subject data object is associated with an indication of pending onboarding;

receiving telematics data including diagnostic data directly or indirectly from the subject;

associating the telematics data with the subject data object;

attempting transmission of a custom onboarding message to the user device associated with the customer, wherein the transmission of the custom onboarding message is attempted to be transmitted via a first communication channel that is associated with the user communication channel data, wherein the custom onboarding message comprises a customized onboarding hyperlink;

causing rendering of a graphical user interface at the user device in response to receiving a first indication triggered by interaction with the customized onboarding hyperlink via the user device without further authentication of a user of the user device;

causing the graphical user interface to display at least a portion of the telematics data on the user device while the subject data object is pending onboarding, such that the acquisition data is configured to facilitate access to the telematics data on the user device while the subject data object is pending onboarding;

receiving, following displaying at least the portion of the telematics data on the user device, a second indication via the graphical user interface at the user device, wherein the second indication is associated with a user data object for the customer; and updating data associated with the subject data object to remove the indication of pending onboarding to indicate completion of onboarding after receiving the second indication.

27. The computer-implemented method according to claim 1, further comprising:

generating a temporary user data object and associating the temporary user data object with the subject data object while the subject data object is pending onboarding; and associating the temporary user data object with the user device while the subject data object is pending onboarding, wherein the user data object is generated based on assigning the temporary user data object to the customer.

* * * * *